US008286889B2

(12) United States Patent
Poidomani et al.

(10) Patent No.: US 8,286,889 B2
(45) Date of Patent: Oct. 16, 2012

(54) ELECTRONIC FINANCIAL TRANSACTION CARDS AND METHODS

(75) Inventors: Mark Poidomani, Windemere, FL (US); Lawrence Routhenstein, Ocoee, FL (US); Charles McGuire, Newbury Park, CA (US); Ziv Alon, Newbury Park, CA (US)

(73) Assignee: Privasys, Inc, Tiburon, CA (US)

( * ) Notice: Subject to any disclaimer, the term of this patent is extended or adjusted under 35 U.S.C. 154(b) by 0 days.

(21) Appl. No.: 13/453,882

(22) Filed: Apr. 23, 2012
(Under 37 CFR 1.47)

(65) Prior Publication Data
US 2012/0205451 A1    Aug. 16, 2012

Related U.S. Application Data

(63) Continuation of application No. 13/102,991, filed on May 6, 2011, now Pat. No. 8,231,063, which is a continuation of application No. 12/726,868, filed on Mar. 18, 2010, now Pat. No. 7,954,724, which is a continuation of application No. 11/413,595, filed on Apr. 27, 2006, now abandoned, application No. 13/453,882, which is a continuation of application No. 11/391,719, filed on Mar. 27, 2006, now abandoned.

(60) Provisional application No. 60/675,388, filed on Apr. 27, 2005, provisional application No. 60/594,300, filed on Mar. 26, 2005.

(51) Int. Cl.
*G06K 19/06* (2006.01)

(52) U.S. Cl. ......... 235/492; 235/449; 235/451; 235/493

(58) Field of Classification Search .................. 235/375, 235/380, 382.5, 451, 492, 449, 493
See application file for complete search history.

(56) References Cited

U.S. PATENT DOCUMENTS

| 4,353,064 A | 10/1982 | Stamm |
| 4,394,654 A | 7/1983 | Hofmann-Cerfontaine |
| 4,529,870 A | 7/1985 | Chaum |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |

(Continued)

FOREIGN PATENT DOCUMENTS
WO    WO9852735    11/1998
(Continued)

*Primary Examiner* — Tuyen K Vo
(74) *Attorney, Agent, or Firm* — Roy L. Anderson; Wagner, Anderson & Bright, P.C.

(57) ABSTRACT

An electronic card has a card body with a power source electrically coupled to a general processor which is electrically coupled to a secure processor and a broadcaster. At least one sensor sends a signal to the general broadcaster when a physical act of swiping the card body through a legacy magnetic stripe reader having a magnetic read head commences. The card is usable as a legacy mode Smart card, the broadcaster is operable to broadcast a transaction specific data packet so that it is read by the magnetic stripe reader, and the secure processor is an ISO 7816 compliant processor.

20 Claims, 42 Drawing Sheets

U.S. PATENT DOCUMENTS

| | | | |
|---|---|---|---|
| 5,272,596 A | 12/1993 | Honore | |
| 5,276,311 A | 1/1994 | Hennige | |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,478,994 A | 12/1995 | Rahman et al. | |
| 5,479,512 A | 12/1995 | Weiss | |
| 5,484,997 A | 1/1996 | Haynes | |
| 5,485,519 A | 1/1996 | Weiss | |
| 5,585,787 A | 12/1996 | Wallerstein | |
| 5,590,038 A * | 12/1996 | Pitroda | 705/41 |
| 5,591,949 A | 1/1997 | Bernstein | |
| 5,608,203 A | 3/1997 | Finkelstein et al. | |
| 5,623,552 A | 4/1997 | Lane | |
| 5,657,388 A | 8/1997 | Weiss | |
| 5,748,737 A | 5/1998 | Daggar | |
| 5,834,756 A | 11/1998 | Gutman et al. | |
| 5,856,661 A | 1/1999 | Finkelstein et al. | |
| 5,864,623 A | 1/1999 | Messina et al. | |
| 5,907,142 A | 5/1999 | Kelsey | |
| 5,913,203 A | 6/1999 | Wong et al. | |
| 5,937,394 A | 8/1999 | Wong et al. | |
| 5,955,021 A | 9/1999 | Tiffany, III | |
| 5,956,699 A | 9/1999 | Wong et al. | |
| 6,025,054 A | 2/2000 | Tiffany, III | |
| 6,045,043 A | 4/2000 | Bashan et al. | |
| 6,076,163 A | 6/2000 | Hoffstein et al. | |
| 6,085,320 A | 7/2000 | Kaliski | |
| 6,095,416 A | 8/2000 | Grant et al. | |
| 6,130,621 A | 10/2000 | Weiss | |
| 6,145,079 A | 11/2000 | Mitty et al. | |
| 6,157,920 A | 12/2000 | Jakobsson et al. | |
| 6,161,181 A | 12/2000 | Haynes, III et al. | |
| 6,163,771 A | 12/2000 | Walker et al. | |
| 6,176,430 B1 | 1/2001 | Finkelstein et al. | |
| 6,182,894 B1 | 2/2001 | Hackett et al. | |
| 6,189,098 B1 | 2/2001 | Kaliski, Jr. | |
| 6,199,052 B1 | 3/2001 | Mitty et al. | |
| 6,206,293 B1 | 3/2001 | Gutman et al. | |
| 6,240,184 B1 | 5/2001 | Huynh et al. | |
| 6,241,153 B1 | 6/2001 | Tiffany, III | |
| 6,256,873 B1 | 7/2001 | Tiffany, III | |
| 6,269,163 B1 | 7/2001 | Rivest et al. | |
| 6,286,022 B1 | 9/2001 | Kaliski, Jr. et al. | |
| 6,313,724 B1 | 11/2001 | Osterweil | |
| 6,323,770 B1 | 11/2001 | Dames | |
| 6,389,442 B1 | 5/2002 | Yin et al. | |
| 6,393,447 B1 | 5/2002 | Jakobsson et al. | |
| 6,411,715 B1 | 6/2002 | Liskov et al. | |
| 6,446,052 B1 | 9/2002 | Fuels | |
| 6,460,141 B1 | 10/2002 | Olden | |
| 6,592,044 B1 | 7/2003 | Wong et al. | |
| 6,607,127 B2 | 8/2003 | Wong | |
| 6,609,654 B1 | 8/2003 | Anderson et al. | |
| 6,631,849 B2 | 10/2003 | Blossom | |
| 6,641,050 B2 | 11/2003 | Kelley et al. | |
| 6,655,585 B2 | 12/2003 | Shinn | |
| 6,681,988 B2 | 1/2004 | Stack et al. | |
| 6,705,520 B1 | 3/2004 | Pitroda et al. | |
| 6,726,108 B1 * | 4/2004 | Guion | 235/492 |
| 6,755,341 B1 | 6/2004 | Wong et al. | |
| 6,769,618 B1 | 8/2004 | Finkelstein | |
| 6,776,332 B2 | 8/2004 | Allen et al. | |
| 6,805,288 B2 | 10/2004 | Routhenstein et al. | |
| 6,811,082 B2 | 11/2004 | Wong | |
| 6,813,354 B1 | 11/2004 | Jakobsson et al. | |
| 6,817,532 B2 | 11/2004 | Finkelstein | |
| 6,853,412 B2 | 2/2005 | Stephenson | |
| 6,873,974 B1 | 3/2005 | Schutzer | |
| 6,902,116 B2 | 6/2005 | Finkelstein | |
| 6,970,070 B2 | 11/2005 | Fuels et al. | |
| 6,980,969 B1 | 12/2005 | Tuchler et al. | |
| 6,985,583 B1 | 1/2006 | Brainard et al. | |
| 6,991,155 B2 | 1/2006 | Burchette, Jr. | |
| 7,013,030 B2 | 3/2006 | Wong et al. | |
| 7,035,443 B2 | 4/2006 | Wong | |
| 7,039,223 B2 | 5/2006 | Wong | |
| 7,044,394 B2 | 5/2006 | Brown | |
| 7,051,929 B2 | 5/2006 | Li | |
| RE39,166 E * | 7/2006 | Gammie | 380/228 |
| 7,100,049 B2 | 8/2006 | Gasparini et al. | |
| 7,100,821 B2 | 9/2006 | Rasti | |
| 7,111,172 B1 | 9/2006 | Duane et al. | |
| 7,114,652 B2 | 10/2006 | Moulette et al. | |
| 7,136,514 B1 | 11/2006 | Wong | |
| 7,140,550 B2 | 11/2006 | Ramachandran | |
| 7,143,953 B2 | 12/2006 | Takahashi et al. | |
| 7,163,153 B2 | 1/2007 | Blossom | |
| 7,195,154 B2 | 3/2007 | Routhenstein | |
| 7,197,639 B1 | 3/2007 | Fuels et al. | |
| 7,219,368 B2 | 5/2007 | Fuels et al. | |
| 7,225,537 B2 | 6/2007 | Reed | |
| 7,225,994 B2 | 6/2007 | Finkelstein | |
| 7,237,724 B2 | 7/2007 | Singleton | |
| 7,246,752 B2 | 7/2007 | Brown | |
| 7,278,586 B2 | 10/2007 | Takahashi et al. | |
| 7,298,243 B2 | 11/2007 | Fuels et al. | |
| 7,337,326 B2 | 2/2008 | Palmer et al. | |
| 7,346,775 B2 | 3/2008 | Gasparini et al. | |
| 7,356,696 B1 | 4/2008 | Jakobsson et al. | |
| 7,357,319 B1 | 4/2008 | Liu et al. | |
| 7,359,507 B2 | 4/2008 | Kaliski, Jr. | |
| 7,360,688 B1 | 4/2008 | Harris | |
| 7,363,494 B2 | 4/2008 | Brainard et al. | |
| 7,380,710 B2 | 6/2008 | Brown | |
| 7,389,425 B2 | 6/2008 | Hasbun | |
| 7,398,253 B1 | 7/2008 | Pinnell | |
| 7,404,087 B2 | 7/2008 | Teunen | |
| 7,424,570 B2 | 9/2008 | D'Albore et al. | |
| 7,427,033 B1 | 9/2008 | Roskind | |
| 7,454,349 B2 | 11/2008 | Teunen et al. | |
| 7,461,250 B1 | 12/2008 | Duane et al. | |
| 7,461,399 B2 | 12/2008 | Juels et al. | |
| 7,472,093 B2 | 12/2008 | Juels | |
| 7,472,829 B2 | 1/2009 | Brown | |
| 7,494,055 B2 | 2/2009 | Fernandes et al. | |
| 7,502,467 B2 | 3/2009 | Brainard et al. | |
| 7,502,933 B2 | 3/2009 | Jakobsson et al. | |
| 7,503,485 B1 | 3/2009 | Routhenstein | |
| 7,516,492 B1 | 4/2009 | Nisbet et al. | |
| 7,523,301 B2 | 4/2009 | Nisbet et al. | |
| 7,532,104 B2 | 5/2009 | Juels | |
| 7,543,739 B2 | 6/2009 | Brown et al. | |
| 7,562,222 B2 | 7/2009 | Gasparini et al. | |
| 7,580,898 B2 | 8/2009 | Brown et al. | |
| 7,584,153 B2 | 9/2009 | Brown et al. | |
| 7,591,426 B2 | 9/2009 | Osterweil et al. | |
| 7,591,427 B2 | 9/2009 | Osterweil | |
| 7,602,904 B2 | 10/2009 | Juels et al. | |
| 7,641,124 B2 | 1/2010 | Brown et al. | |
| 7,660,902 B2 | 2/2010 | Graham et al. | |
| 7,673,171 B2 * | 3/2010 | Barlow et al. | 714/6.32 |
| 2001/0034702 A1 | 10/2001 | Mockett et al. | |
| 2001/0047335 A1 | 11/2001 | Arndt et al. | |
| 2002/0059114 A1 | 5/2002 | Cockrill et al. | |
| 2002/0082989 A1 | 6/2002 | Fife et al. | |
| 2002/0096570 A1 | 7/2002 | Wong et al. | |
| 2002/0120583 A1 | 8/2002 | Keresman, III et al. | |
| 2003/0034388 A1 | 2/2003 | Routhenstein et al. | |
| 2003/0052168 A1 | 3/2003 | Wong | |
| 2003/0057278 A1 | 3/2003 | Wong | |
| 2003/0105964 A1 | 6/2003 | Brainard et al. | |
| 2003/0116635 A1 | 6/2003 | Taban | |
| 2003/0152253 A1 | 8/2003 | Wong | |
| 2003/0173409 A1 | 9/2003 | Vogt et al. | |
| 2003/0179909 A1 | 9/2003 | Wong et al. | |
| 2003/0179910 A1 | 9/2003 | Wong | |
| 2003/0226899 A1 | 12/2003 | Finkelstein | |
| 2004/0035942 A1 * | 2/2004 | Silverman | 235/493 |
| 2004/0129787 A1 * | 7/2004 | Saito et al. | 235/492 |
| 2004/0133787 A1 | 7/2004 | Doughty et al. | |
| 2004/0162732 A1 | 8/2004 | Rahim et al. | |
| 2004/0172535 A1 | 9/2004 | Jakobsson et al. | |
| 2004/0177045 A1 | 9/2004 | Brown | |
| 2005/0043997 A1 | 2/2005 | Sahota et al. | |

| | | |
|---|---|---|
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Fuels et al. |
| 2006/0041759 A1 | 2/2006 | Kaliski et al. |
| 2006/0085328 A1 | 4/2006 | Cohen et al. |
| 2006/0091223 A1 | 5/2006 | Zellner et al. |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0186209 A1 | 8/2006 | Narendra et al. |
| 2006/0256961 A1 | 11/2006 | Brainard et al. |
| 2007/0114274 A1 | 5/2007 | Gibbs et al. |
| 2007/0174614 A1 | 7/2007 | Duane et al. |
| 2007/0192249 A1 | 8/2007 | Biffle et al. |
| 2007/0241201 A1 | 10/2007 | Brown et al. |
| 2008/0040271 A1 | 2/2008 | Hammad et al. |
| 2008/0040276 A1 | 2/2008 | Hammad et al. |
| 2008/0096326 A1 | 4/2008 | Reed |
| 2008/0148394 A1 | 6/2008 | Poidomani et al. |
| 2009/0108064 A1 | 4/2009 | Fernandes et al. |
| 2009/0255996 A1 | 10/2009 | Brown et al. |

FOREIGN PATENT DOCUMENTS

| | | |
|---|---|---|
| WO | WO0247019 A1 | 6/2002 |
| WO | WO2006105092 | 10/2006 |
| WO | WO2006116772 | 11/2006 |

* cited by examiner

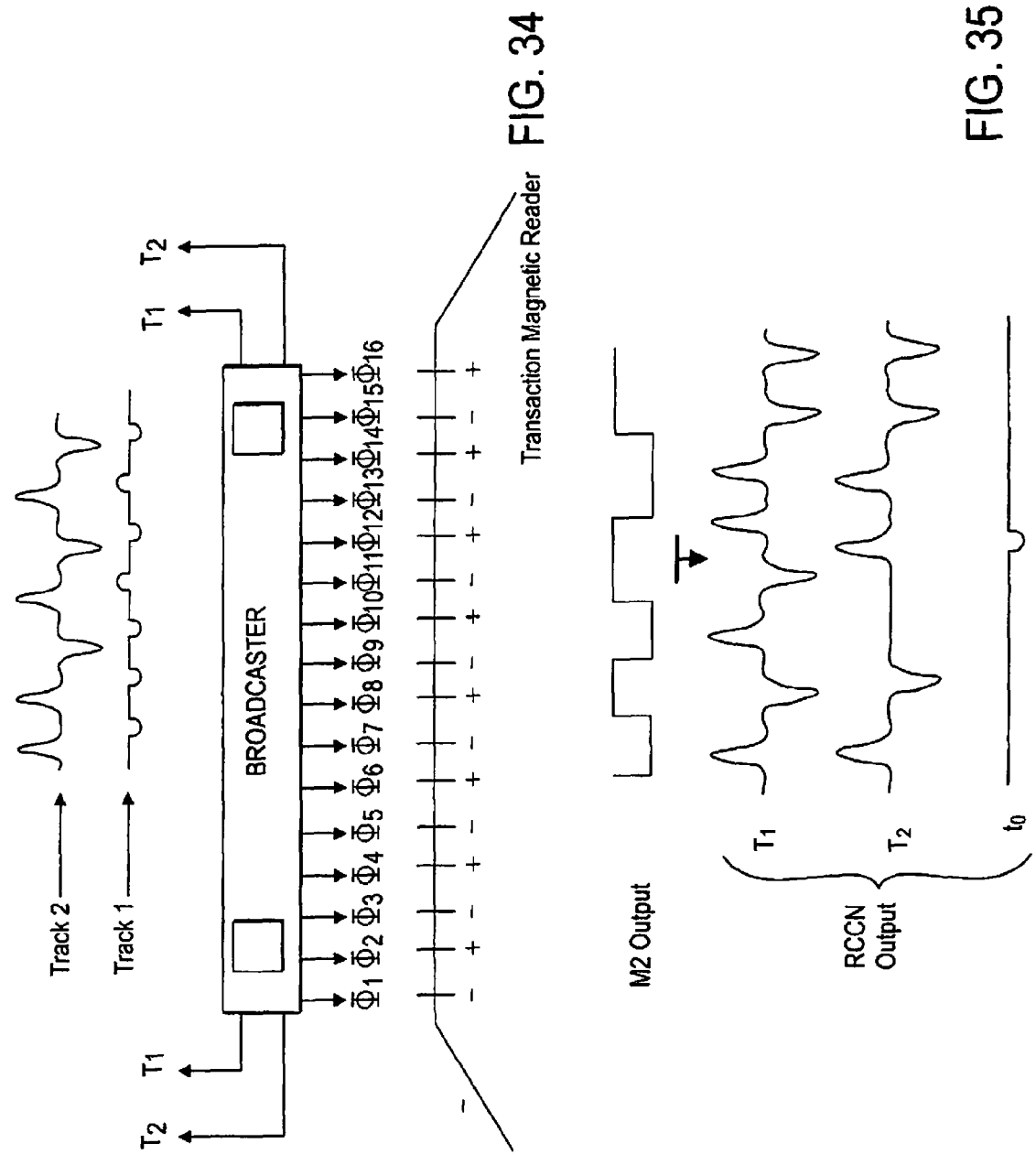

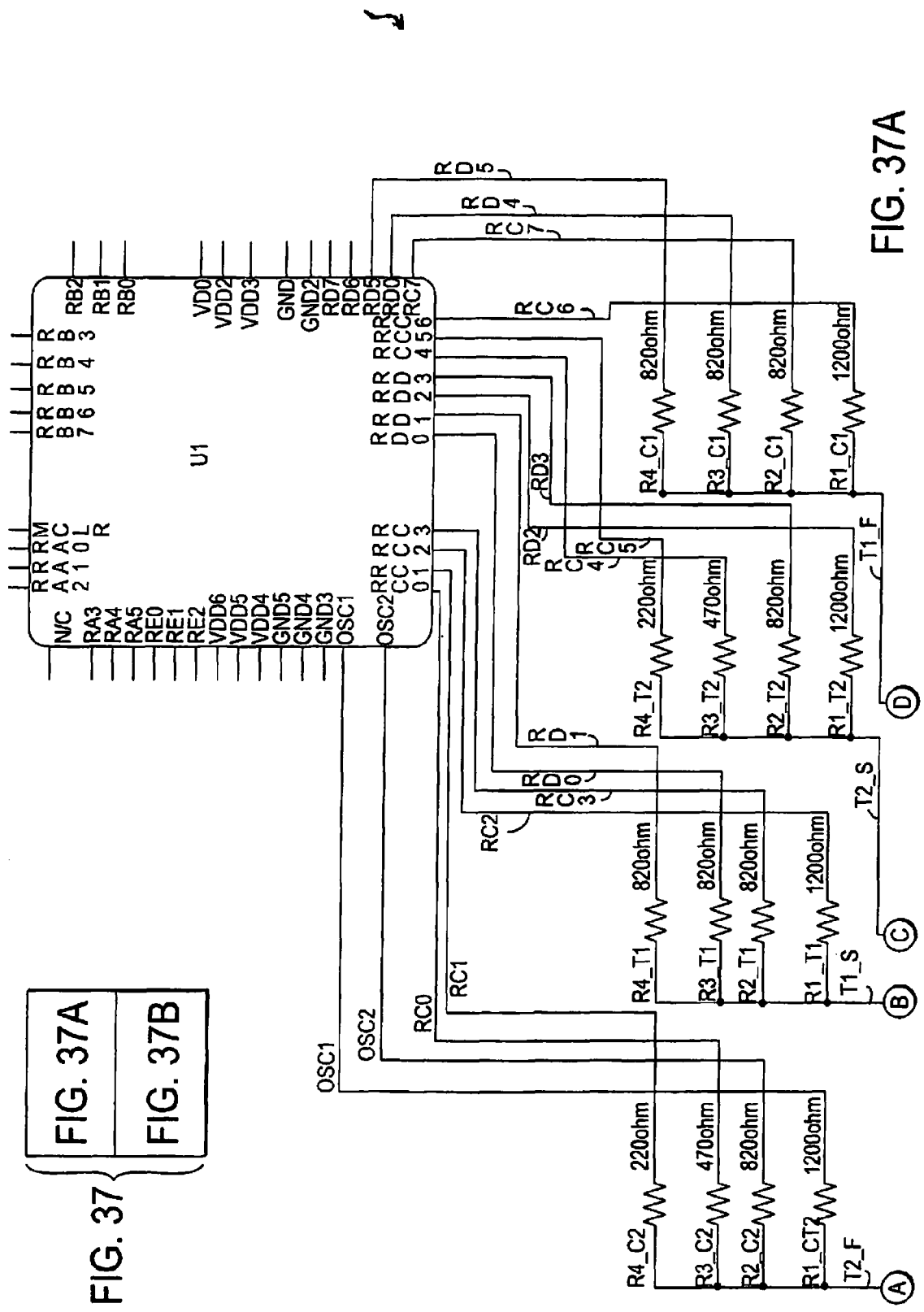

ELECTRONIC FINANCIAL TRANSACTION CARDS AND METHODS

CROSS REFERENCE TO RELATED APPLICATIONS

The present application is a continuation application of U.S. patent application Ser. No. 13/102,991, filed May 6, 2011 now U.S. Pat. No. 8,231,063, which is a continuation of U.S. Ser. No. 12/726,868, filed Mar. 18, 2010, now issued as U.S. Pat. No. 7,954,724, which was a continuation application of U.S. Ser. No. 11/413,595, filed Apr. 27, 2006 now abandoned, which claimed the priority benefit of U.S. Ser. No. 60/675,388, filed Apr. 27, 2005, all of which are specifically incorporated herein by reference. This application is also a continuation application of U.S. Ser. No. 11/391,719, filed Mar. 27, 2006 now abandoned, which claimed the priority benefit of U.S. Ser. No. 60/594,300 filed Mar. 26, 2005, both of which are specifically incorporated herein by reference. This application sets forth the disclosure of U.S. Ser. No. 11/391,719.

BACKGROUND

Exemplary embodiments disclosed herein pertain to electronic security. More particularly, exemplary embodiments disclosed herein pertain to electronic cards implementing security protocols.

There are a great many applications for electronic security. For example, security is desirable or required for financial transactions, or for providing access to various physical and non-physical resources. One area of great concern for electronic security is in the field of financial transaction cards, e.g. credit and debit cards.

Conventional credit cards, debit cards and other financial transaction cards hereafter "transaction card" have a typically plastic body upon which is embossed a 16 digit account number and other data. A magnetic strip, usually referred to as a "stripe", is adhered to the back of the card, and also includes the account number and other data. The stripe allows the transaction card to be read by a card reader, hereafter referred to as a "legacy card reader."

There are many security problems with conventional transaction cards. For one, the stripe is static and is not encrypted, allowing transaction card thieves to "steal", in the virtual sense, the data from the stripe and use it for unauthorized transactions. Also, a stolen conventional card can be freely used by the thief unless until it is cancelled.

In addition to a lack of security, conventional transaction cards are also quite limited in storage capacity. To address this problem, the "Smart Card", i.e. a transaction card including an on-board processor and digital memory, has been developed. By providing an on-board processor and digital memory, a transaction card can implement security protocols such as encryption, store user information, etc.

A common standard for Smart Cards is referred to as the ISO 7816 standard. With this protocol, a Smart Card is provided with an electrical interface including a number of electrically conductive and externally accessible contact pads which are coupled to an embedded secure processor. The Smart Card is inserted into a Smart Card reader which makes electrical contact with the contact pads to provide power to and communications with the secure processor. Smart cards can also include a conventional stripe, which does not in any way interact with the secure processor.

While broadly adopted abroad, Smart Cards have not been extensively adopted in the U.S. A major reason for this is the investment made by millions of merchants in legacy card readers, which cannot communicate with the secure processors of Smart Cards. Also, Smart Cards conforming to the ISO 7816 standard suffer from their own limitations, including severely restricted I/O, an inability to provide "smart" transactions with legacy card readers, etc.

A third approach, not yet in use, uses a general processor and a stripe emulator which work with legacy card readers. As used here, the term "stripe emulator" will refer to a transaction card where data transmitted to a legacy card reader can be changed under the control of the general processor. This third approach will be referred to herein as an "emulator card."

Emulator cards potentially have a number of distinct advantages over conventional credit cards. For one, a single card can emulate a number of different transaction cards, greatly reducing the bulk in one's wallet. For example, an emulator card can emulate a Visa card, a MasterCard, and an ATM card. Also, since the emulator card includes a processor, it is possible to implement additional functionality, such as security functions.

However, emulator cards, too, have their limitations. For one, since general processors are used the security level of the card is reduced. For example, a hacker could potentially obtain data stored in unsecured electronic memory. Also, emulator cards do not address Smart Card protocols, as they are designed to work with legacy card readers. For example, as with conventional credit cards, data flows from the emulator card to the legacy card reader, and not vice versa. Still further, the information that can be provided by the emulator card is limited to the amount of information that a conventional stripe can hold and that a legacy card reader can read.

These and other limitations of the prior art will become apparent to those of skill in the art upon a reading of the following descriptions and a study of the several figures of the drawing.

SUMMARY OF THE INVENTION

The present invention is generally directed to an electronic card having a card body that has a power source electrically coupled to a general processor which is electrically coupled to a secure processor. A broadcaster is electrically coupled to the general processor. At least one sensor sends a signal to the general broadcaster when a physical act of swiping the card body through a legacy magnetic stripe reader having a magnetic read head commences. The card is usable as a legacy mode Smart card, the broadcaster is operable to broadcast a transaction specific data packet so that it is read by the magnetic stripe reader, and the secure processor is an ISO 7816 compliant processor.

The general processor can be an ASIC chip. An on/off button can be provided for turning the general processor from an off state to an on state and activation of the on/off button without activating the secure processor to a secure processor on state. Power to the secure processor can be turned on either by the general processor or by a Smart Card reader device. A unique serial number and a cryptographic component can be stored in the secure processor. The secure processor can be connected to an RC conversion circuit through at least two transmission lines and at least two broadcasting lines can be connected to output from the RC conversion circuit. Power to the secure processor can be turned off when the card is in an operation mode and an error is detected.

A display can indicate which of multiple account selections has been made for a transaction. Buttons on the card can produce a chord, by activation of a combination of the buttons, and the chord can be used to alter functionality of the electronic card, such as instructing the card to enter a self-diagnostic mode.

A Smart Card reader device can be used to program and personalize the secure processor with an initialization data packet so that the secure processor can function in an operational mode which no longer requires use of the Smart Card reader device.

The card can include a built-in self testing operation mode which is operable to generate an error code if an error is detected. The card is operable to render itself unusable in response to a self-destruct command, which can be passed from the general processor to the secure processor, and generated by use of a fraud detection mechanism.

The broadcaster is comprised of a core of material chosen for its magnetic permeability and is surrounded by at least one waveform circuit configuration made of another type of specialty material chosen for its electrical and magnetic properties. The signal from the at least one sensor is used to effect the broadcast in a proper temporal and spatial alignment to the read head.

Accordingly, it is a primary object of the present invention to provide an improved electronic card useful in financial transactions.

This and further objects and advantages will be apparent to those skilled in the art in connection with the drawings and the detailed description of the preferred embodiment set forth below.

BRIEF DESCRIPTION OF THE DRAWINGS

Several exemplary embodiments will now be described with reference to the drawings, wherein like components are provided with like reference numerals. The exemplary embodiments are intended to illustrate, but not to limit, the invention. The drawings include the following figures:

FIG. 34 is a diagram of an exemplary broadcaster 68 interface;

FIG. 35 is a diagram showing the various waveforms of an exemplary signal conversion;

DETAILED DESCRIPTION OF EXEMPLARY EMBODIMENTS

Figure 1:
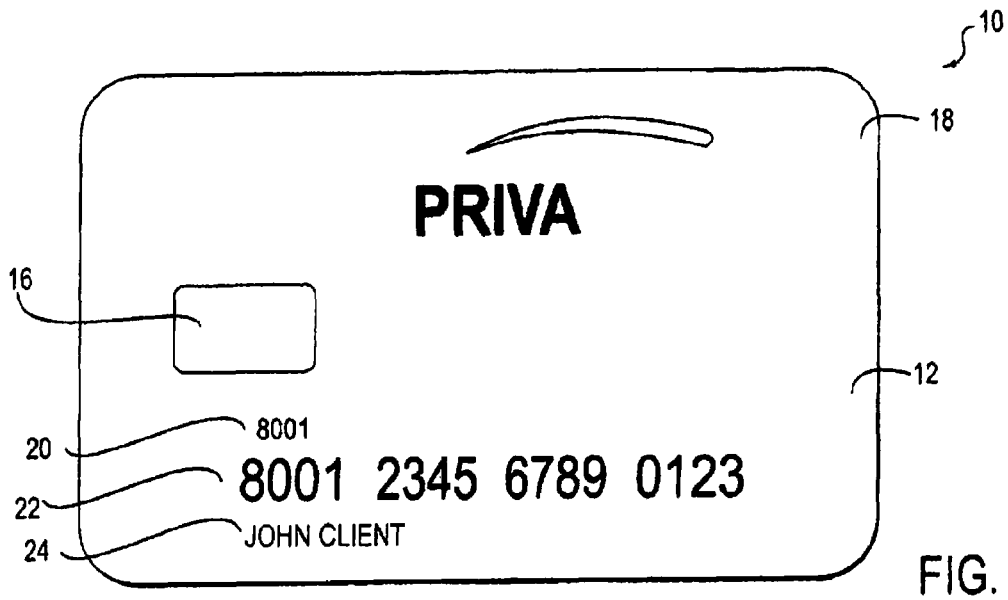
FIG. 1 is a top plan view of an exemplary transaction card.

Embodiments are disclosed which provide examples of enhanced electronic security. A number of non-limiting examples of transaction cards which address aforementioned problems and limitations of prior transaction cards are presented. As will be apparent to those skilled in the art, the methods and apparatus as disclosed herein are applicable to a wide variety of problems which require or could be improved with electronic security measures.

In one embodiment presented by way of example and not limitation, an enhanced Smart Card includes a card body, a secure processor and a general processor. The card body may be provided with an externally accessible card interface including a signal port, a power port, and a ground port. The secure processor is carried by the card body and is coupled to the signal port, the power port, and the ground port. The general processor is also carried by the card body, the general processor being coupled to a power source and being operative to provide power to and communicate with the secure processor when the secure processor is being used in an enhanced Smart Card mode.

In an exemplary embodiment, the secure processor is a Smart Chip processor compliant with the ISO 7816 standard. In other embodiments, the secure processor is compliant with other standards, or is proprietary in nature. In another exemplary embodiment, the general processor has a plurality of I/O ports. These ports can provide I/O for such devices as displays, switches and stripe emulators.

In another embodiment, set forth by way of example and not limitation, a secure transaction card includes a card body carrying a secure processor, a strip emulator and a general processor. The general processor is interposed between the secure processor and the stripe emulator such that there is not a direct connection between the stripe emulator and the secure processor.

In one embodiment, the general processor selectively powers the secure processor. For example, the general processor may directly power the secure processor or may cause the secure processor to be powered. In an alternative embodiment, the secure processor is ISO 7816 compliant. In another alternative embodiment, the secure transaction card may be provided with inputs such as switches or keypads, and outputs such as LEDs and flat panel displays.

In another embodiment which is generally applicable electronic security applications in addition to transaction card security application, a companion processor system is provided. The companion processor system pairs a secure processor with a general processor. The secure processor can, for example, include a signal port, a power port and a ground port. The general processor is, in this example, operative to power up the secure processor by applying, directly or indirectly, at least one of power and ground to the power port and ground port, respectively of the secure processor when it wishes to communicate with the secure processor via the signal port.

In another embodiment which is generally applicable electronic security applications in addition to transaction card security applications, a method for providing secure transactions is disclosed. The method, by way of example and not limitation, includes: detecting an input with a general processor of the initiation of a desired transaction; powering up a secure processor under the direction of the general processor; and communicating between the general processor and the secure processor to provide at least one secure transaction.

These and other embodiments and advantages will become apparent to those of skill in the art upon a reading of the following descriptions and a study of the several figures of the drawing.

As noted, there are a great many applications for enhanced electronic security. One of many applications is to provide security for financial transactions, e.g. financial transactions using transactions cards such as credit cards and debit cards. In the following exemplary embodiments, particular emphasis will be place on transaction card security, with the understanding that other uses for enhanced electronic security are within the true spirit and scope of the invention.

FIG. 1 is an exemplary embodiment of a transaction card 10 which includes a card body 11 typically including thermoplastic material in an exemplary embodiment; other materials are also contemplated. The transaction card 10 of this non-limiting example has a front surface 12 which is provided with an electrical interface 16. The illustrated electrical interface includes a number of contact pads, preferably formed in a configuration which is compliant with the International Standards Organization "Smart Card" standard ISO 7816, incorporated herein by reference. In this exemplary embodiment, the transaction card is usable as a legacy mode Smart Card. In an alternative exemplary embodiment, the interface 16 may be omitted. Also shown on the front surface 12 is an institution identifier 18, an institution number 20, an account number 22, and a client name 24. The account number is preferably embossed on the transaction card 10 to provide raised numerals for credit card imprint machines.

Figure 2:
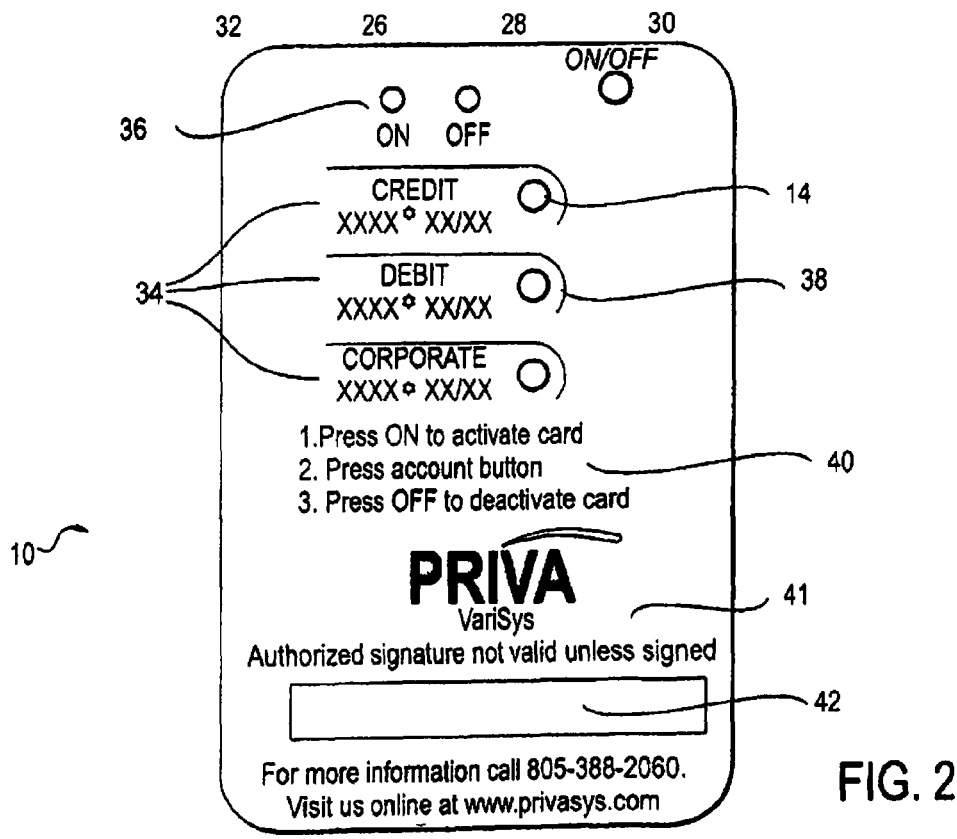
FIG. 2 is a bottom plan view of the exemplary transaction card of FIG. 1.

FIG. 2 illustrates a back surface 14 of the exemplary transaction card 10. In this exemplary embodiment, a magnetic stripe emulator 26 is provided on the back surface 14 which can communicate with legacy magnetic stripe readers of the prior art. The card back 14 may also have an on/off button 28, an "on" indicator 30, and an "off" indicator 32. In this exemplary embodiment, "on" indicator 30 may be a green LED and the "off" indicator 32 may be a red LED. Also placed on the card back 14 may be a plurality of account interfaces 34. Each account interface 34 preferably has account indicator LED 36 and an account selector switch 38. Each account interface 34 may also have, for example, printed information identifying the account and expiration date. Back surface 14 also has, in this example, instructions 40, an institution identifier 41, a signature box 42, various other optional printed information.

Figure 3:
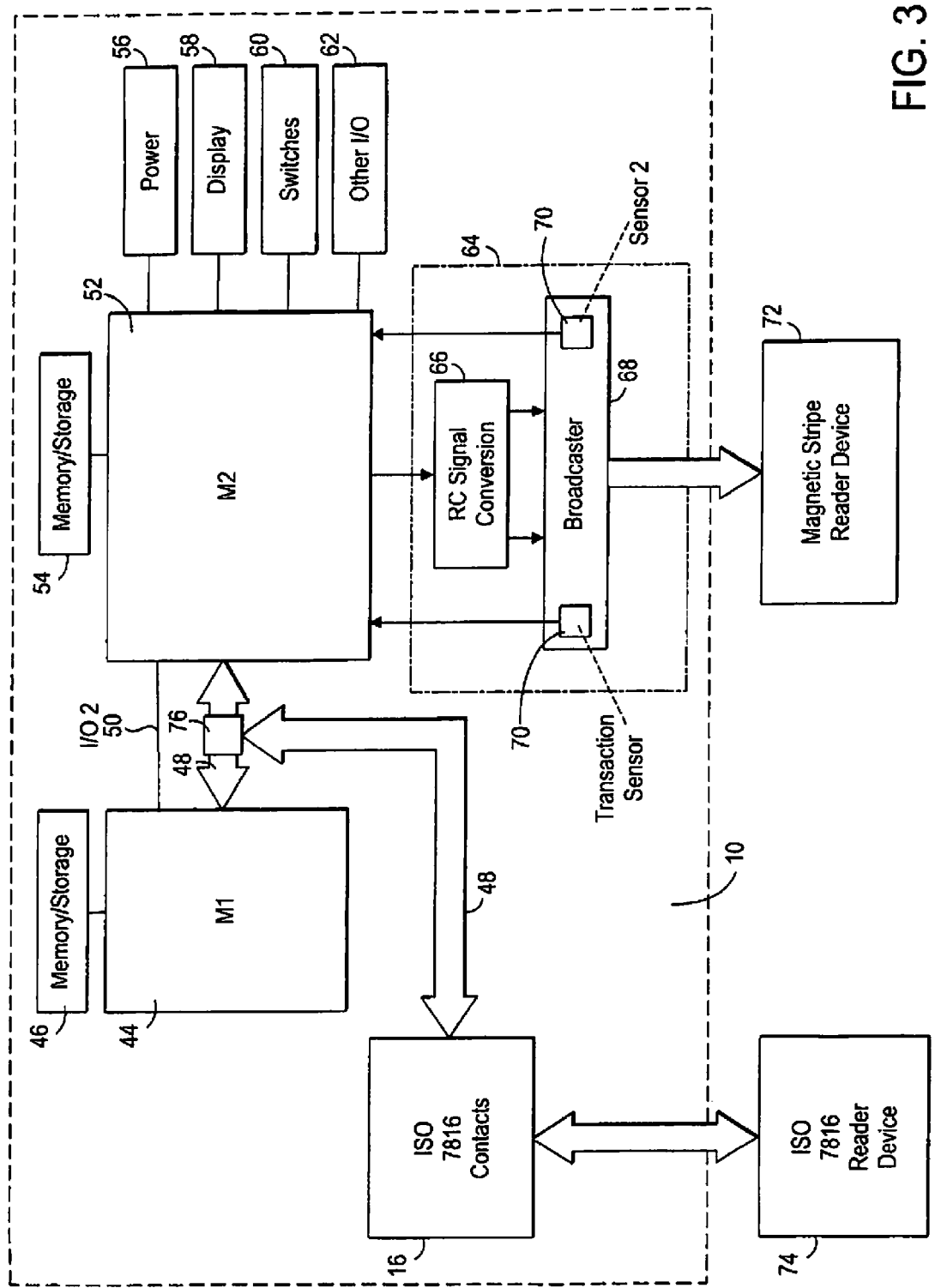
FIG. 3 is a block diagram of an exemplary circuit for the transaction card illustrated in FIGS. 1 and 2.

FIG. 3 is a block diagram of an embodiment of exemplary circuitry, presented by way of example but not limitation, of the transaction card 10. In this example, the transaction card 10 includes a secure processor 44, a general processor 52, and a magnetic stripe emulator 64. In this embodiment, both the secure processor 44 and the general processor 52 are coupled to the ISO 7816 interface 16 by a bus 48.

Secure processor 44 is preferably a commercially available Smart Card chip which has various tamper resistant properties such as a secure cryptographic function and tamper resistant storage 46. An exemplary embodiment of secure processor 44, given by way of example and not limitation, is a P8WE6032 processor manufactured by Phillips of Germany. Similar devices are manufactured by Hitachi, Infineon, Toshiba, ST and others. As noted previously, in this example secure processor 44 is connected electrically to the interface 16 a bus 48. This bus is therefore preferably ISO 7816 compliant.

General processor 52 is, in this example, also connected to the bus 48 and, therefore, to both the secure processor 44 and the interface 16. Additionally, in this example, the general processor 52 is coupled to the secure processor 44 by an 1/0 2 line 50. In the currently exemplary embodiment, memory 54 is coupled to the general processor 52. General processor 52 is also coupled, in this example, to power source 56, display 58, switches 60, and other I/O 62. Power source 56 is preferably a battery disposed within the card body 10. Alternative exemplary embodiments include a battery operable to be a primary (non-rechargeable) and a battery operable to be a secondary (rechargeable). The exemplary rechargeable battery may, for example, be recharged through electrical interface 16, or through magnetic induction, a solar cell, another electrical connector, or other means. These exemplary embodiments are given by way of example and not limitation. Other alternative power sources will be apparent to those of skill in the art.

General processor 52 may be, for example, a PIC 16 micro controller. In an alternative embodiment, general processor 52 may comprise an ASIC chip. In still further embodiments, general processor may be any form of logic (e.g. a state machine) which performs the desired functions.

Display 58 may be, for example, LED devices as disclosed previously. As another non-limiting example, display 58 is may comprise a flexible LCD display. Switches 60 can be any form of electrical switches to allow for configuring the operation of general processor 52 and associated UO apparatus. The processor 52 may provide software debouncing algorithms with respect to such switches. Other UO 62 may comprise any number of alternative I/O subsystems. These may include, by way of example and not limitation, audio, tactile, RF, IR, optical, keyboard, biometric UO or other I/O.

Also coupled to general processor 52 is magnetic stripe emulator 64, which allows the card body 10 to be used in a mode which emulates the magnetic stripe card of the prior art. Magnetic stripe emulator 64, in this non-limiting example, is comprised of a buffering circuit 66, which converts digital output from general processor 52 into a wave form appropriate for magnetic stripe emulation. In this exemplary embodiment, buffering circuit 66 includes an RC signal conversion circuit which is typically implemented as an RC network. RC networks are well known to those skilled in the art.

In this example, magnetic stripe emulator 64 is further comprised of a broadcaster 68. Broadcaster 68 may be electrically coupled to buffering circuit 66 and preferably receives two tracks of signal which are converted by broadcaster 68 into magnetic impulses for magnetic stripe emulation. Alternative embodiments include a single track embodiment, and three or more tracks. Broadcaster 68 may include one or more electrical coils to convert electrical signal into magnetic impulses. Broadcaster 68 of this example may further include one or more sensors 70, which are electrically coupled to general processor 52. These sensors are used to signal to general processor 52 that the physical act of swiping the card body 10 through a legacy card reader has commenced. Sensors 70 also communicate to general processor 52 when contact is lost with the magnetic stripe reader 72, which receives and interprets magnetic flux impulses from the broadcaster.

As noted previously, the transaction card 10 of this example includes an electrical interface 16. In this example, electrical connectors 16 are used in a manner compliant with ISO 7816 to communicate with an ISO 7816 reader device 74.

When used in a legacy Smart Card mode, secure processor 44 is powered by bus 48 from a Smart Card reader device 74. The reader device 74 can be used to program and personalize secure processor 44 with various information including, by way of example and not limitation, firmware code, account numbers, cryptographic keys, PIN numbers, etc. This information, once loaded into secure processor 44, prepares secure processor 44 for an operational mode which no longer requires the use of reader device 74.

In this "independent" mode, secure processor 44 communicates with general processor 52 and provides services such as cryptographic functions and the dynamic generation of authentication information which is used to communicate via general processor 52 and magnetic stripe emulator 64 with magnetic stripe reader 72. Also in this example, the authentication code may be used only once for a single transaction. Subsequent transactions require new authentication codes to be generated.

In an alternative embodiment, the card body 10 continues to be used with reader device 74 and also with magnetic stripe reader device 72. In this alternate embodiment, the card detects the mode in which it is being used and automatically switches the usage of bus 48 appropriately for the detected mode of operation. This is achieved in optional bus arbitrator 76. Optional bus arbitrator 76 can detect when it is being used with reader device 74 because power is provided by reader device 74 via electrical connectors 16 to bus 48. Similarly, optional bus arbitrator 76 can detect that power is being provided by general processor 52 and switch to the corresponding mode of operation, which services general processor 52 and the various I/O devices connected thereto. In yet another alternative embodiment, optional bus arbitrator 76 allows for the dynamic communication of both general processor 52 and secure processor 44 with each other respectively, and with reader device 74. This requires bus arbitration logic which is well known to those skilled in the art. In a further alternative embodiment, general processor 52 is interposed between secure processor 44 and electrical connectors 16. In this alternative embodiment, general processor 52 acts as a "go-between" or a "front end" for secure processor 44.

Figure 4:
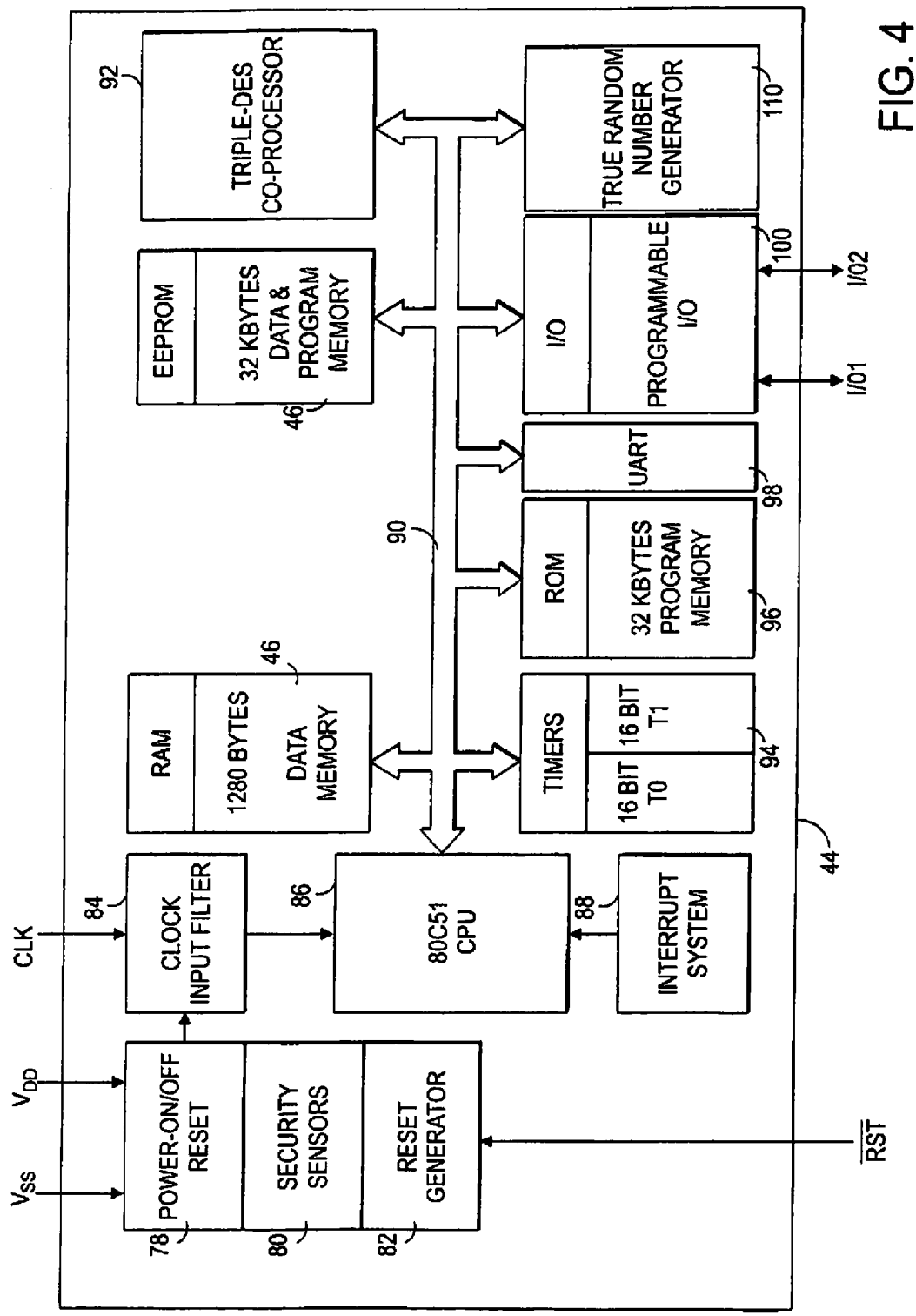
FIG. 4 is a block diagram of an exemplary secure processor of FIG. 3.

FIG. 4 shows an exemplary secure processor 44 of FIG. 3 in greater detail. Secure processor 44 of this example is an ISO 7816 compliant micro controller comprising power apparatus 78, security sensors 80, reset generator 82, clock input filter 84, CPU 86, interrupt system 88, and internal bus 90. Coupled to internal bus 90 is tamper resistant storage 46, which may be comprised of RAM 91, EEPROM 93, or both. Both RAM 91 and EEPROM 93 are coupled to internal bus 90, in a preferred embodiment. Also coupled to bus 90 is crypto processor 92, which handles encryption and decryption. Also coupled of bus 90 are timers 94 and ROM 96, which is used for storing the firmware necessary for secure processor 44 to operate, UART 98, which is used for serial communications via bus 48 and electrical connectors 16 with reader device 74. Also connected to bus 90 is I/O subsystem 100 and random number generator 102. Secure processors 44 as described above are commercially available from a variety of sources including Philips, Hitachi, Infineon, Toshiba, ST, and others. A suitable secure processor 44 for use in the disclosed exemplary embodiment is the model P8WE6032 processor made by Philips of Germany.

Figure 5:
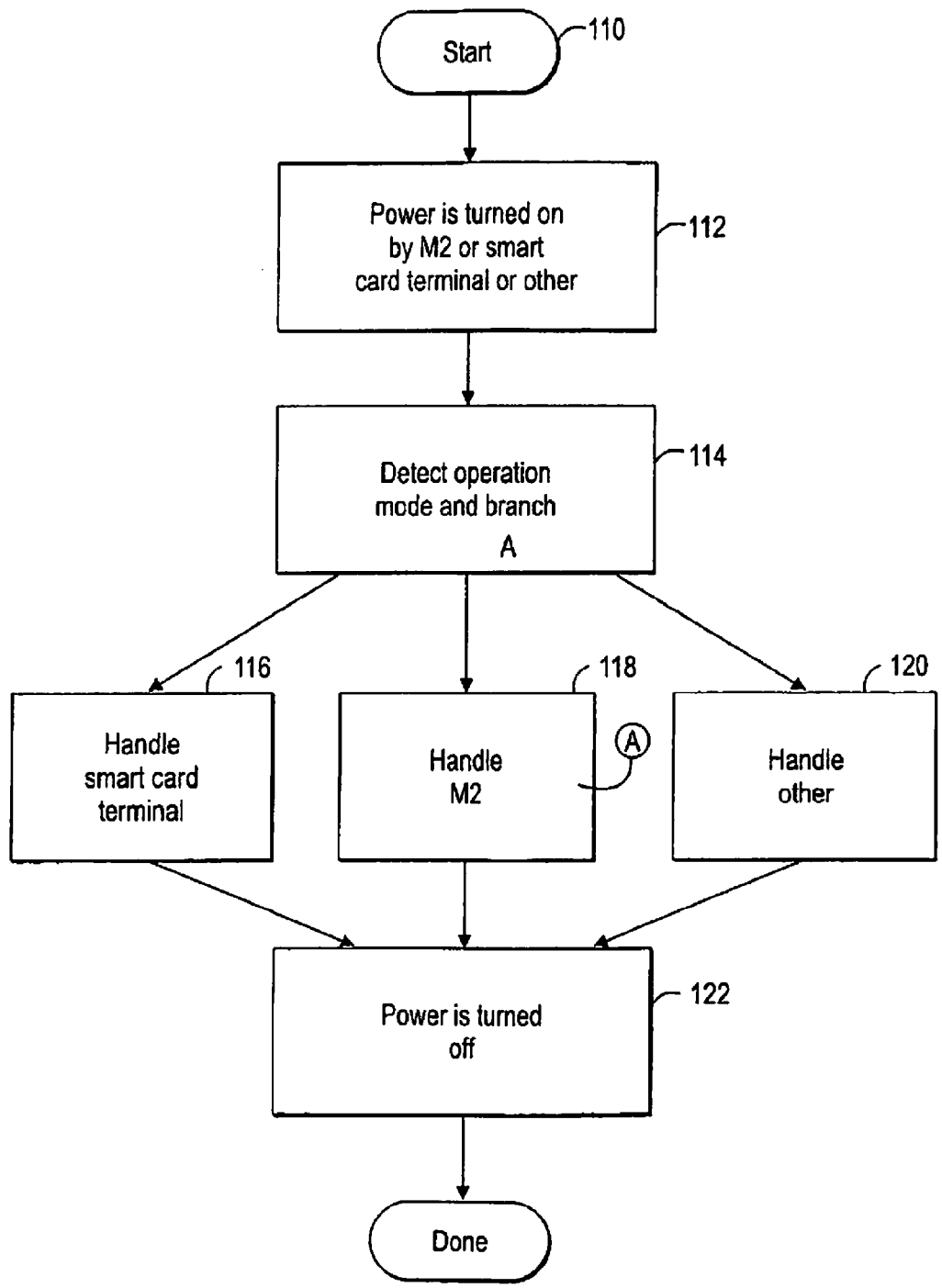
FIG. 5 is a flow diagram of an exemplary main process running on the secure processor of FIG. 3.

FIG. 5 illustrates by way of example and not limitation a main process to be implemented by secure processor 44. This main process can be, for example, encoded into either the ROM 96 or EEPROM 93 of secure processor 44. The process begins in operation 110 which passes control to operation 112 wherein the power to secure processor 44 is turned on by the general processor 52 or by reader device 74. As used herein, an "operation" is a specified act performed by a processor. Then, in operation 114, secure processor 44 detects its mode of operation and branches to an appropriate handler for the detected mode. One of the operation modes handles operation with reader device 74. Operation 116 passes control to a handler which handles this mode of operation. Operation 118 passes control to a handler which handles communication with general processor 52. Operation 120 handles other modes of operation. For example, this handler could handle a mode of operation involving both secure processor 44 and general processor 52 communicating cooperatively with each other respectively, and with reader device 74. This alternative embodiment is given by way of example and not limitation. Once the communication is handled, the power is turned off in operation 122, which completes the process.

Figure 6:
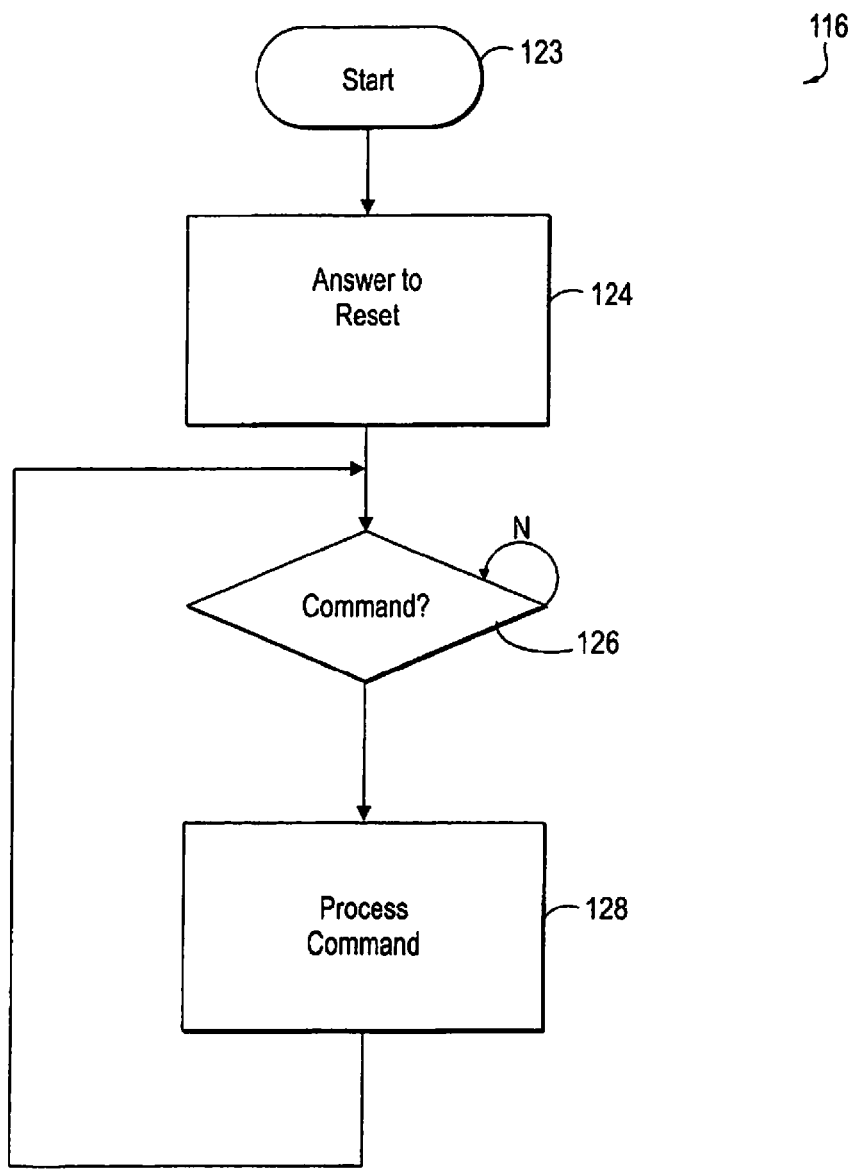
FIG. 6 is a flow diagram of an exemplary operation 116 "Handle Smart Card Terminal" of FIG. 5.

FIG. 6 illustrates, by way of example, one embodiment for operation 116 of FIG. 5 in more detail. The process begins in operation 123, and continues in operation 124 with secure processor 44 sending a signal called "answer to reset," which indicates that secure processor 44 is online and ready to communicate, preferably via asynchronous serial communications utilizing UART 98. Then, in operation 126, secure processor 44 waits for a command to be received. If a command is not received, it continues waiting. In an alternative embodiment, this period of waiting could be used to perform some computational task in the background, such as authentication code generation based on a pseudo random sequence. When a command is received, control is passed to operation 128, which processes the command. Once the command is processed, control is passed back to operation 126 which waits for another command. Commands are processed in the above described manner until this process is interrupted by the power being turned off.

Figure 7:
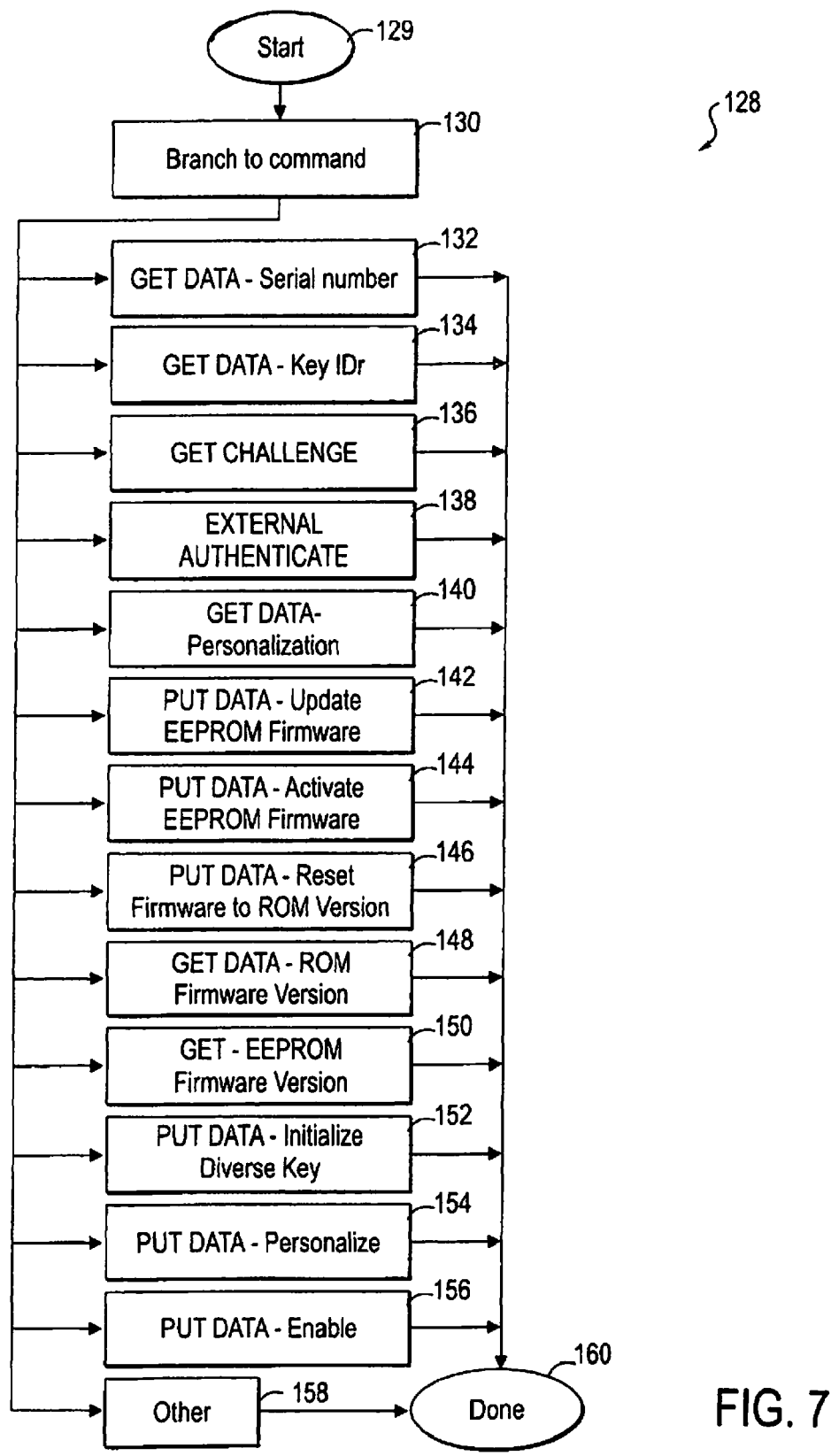
FIG. 7 is a flow diagram of an exemplary operation 128 "Process Command" of FIG. 6.

FIG. 7 shows an exemplary operation 128 of FIG. 6 in more detail. The process begins with operation 129 which passes control to a branching operation 130. Operation 130 dispatches control to one of several handlers for the various messages that may be received. Operation 130 passes control to only one of the handlers shown in FIG. 7.

The selection of which handler to which to branch is determined by an examination of the message received. In a preferred embodiment, the message received contains a selector code which identifies the handler to be used. Operation 132 is a handler which processes the message "GET DATA—Serial Number" Operation 134 handles a command called "GET DATA—Key ID." Operation 136 is a handler which handles the "GET CHALLENGE." Operation 138 is a handler for "EXTERNAL AUTHENTICATE." Operation 140 is a handler for "GET DATA—Personalization." Operation 142 is a handler for "PUT DATA—Update EEPROM Firmware." Operation 144 is a handler for "PUT DATA—Activate EEPROM Firmware." Operation 146 is a handler for "PUT DATA—Reset Firmware to ROM Version." Operation 148 is a handler for "GET DATA—ROM Firmware Version." Operation 150 is a handler for "GET DATA—EEPROM Firmware Version." Operation 152 is a handler for "PUT DATA—Initialize Diverse Key." Operation 154 is a handler for "PUT DATA—Personalize." Operation 156 is a handler for "PUT DATA—Enable." Operation 158 is a handler for "Other."

Operation 158 is shown to represent any additional handler that one may wish to introduce to enhance communication with or the internal processes of secure processor 44. An example of such a command is to initiate a background task to perform authentication code generation in the background. Another example of such a command would be a self-destruct command which would render the card unusable. This embodiment would be used in the event that it was clear that fraud was taking place. These embodiments are given by way of example and not limitation.

Figure 8:
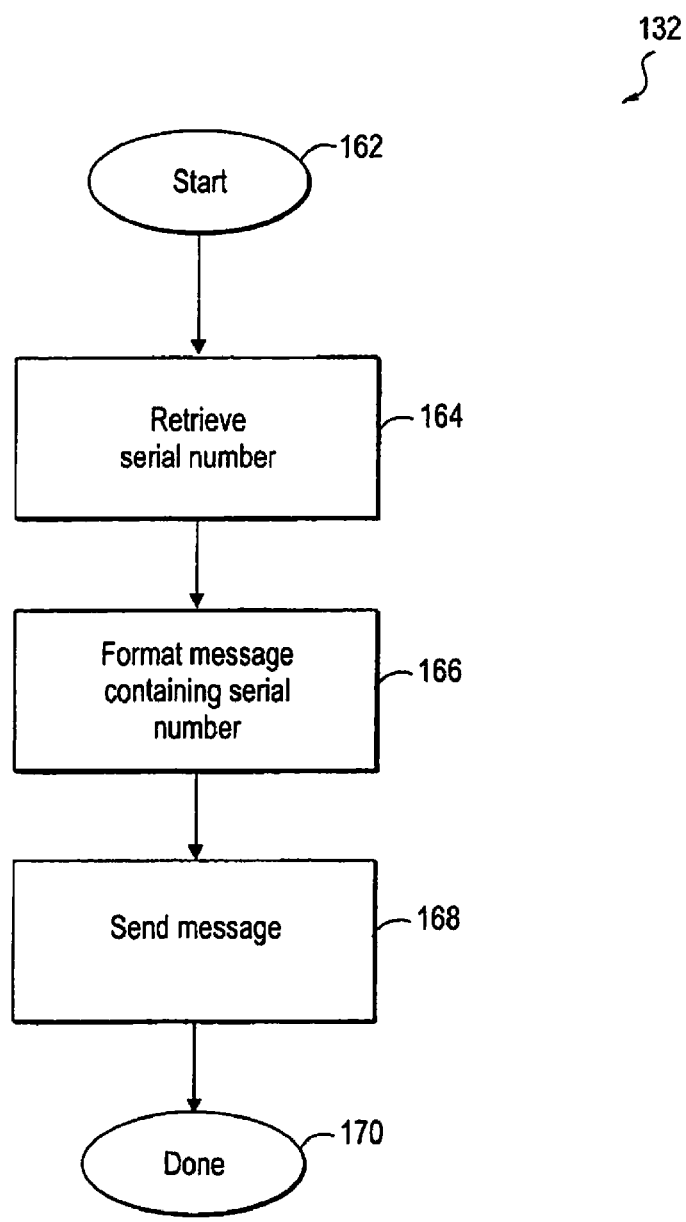
FIG. 8 is a flow diagram of an exemplary operation 132 "GET DATA—Serial Number" of FIG. 7.

FIG. 8 shows an exemplary operation 132 of FIG. 7 in more detail. The purpose of this process is to allow the retrieval of a unique serial number from secure processor 44. The process begins with operation 162; control is passed to operation 164 which retrieves the unique serial number which is stored within the secure processor 44 and its associated storage. In one embodiment, this serial number is encoded into EEPROM 93. In another embodiment, the serial number is encoded into ROM 96. Once the unique serial number has been retrieved control is passed to operation 166, which formats a message containing the serial number. Control is then passed to operation 168, which sends the message back to the source which requested it. It should be noted that this information may be either encrypted or unencrypted and both embodiments are contemplated. The process is completed in operation 170.

Figure 9:
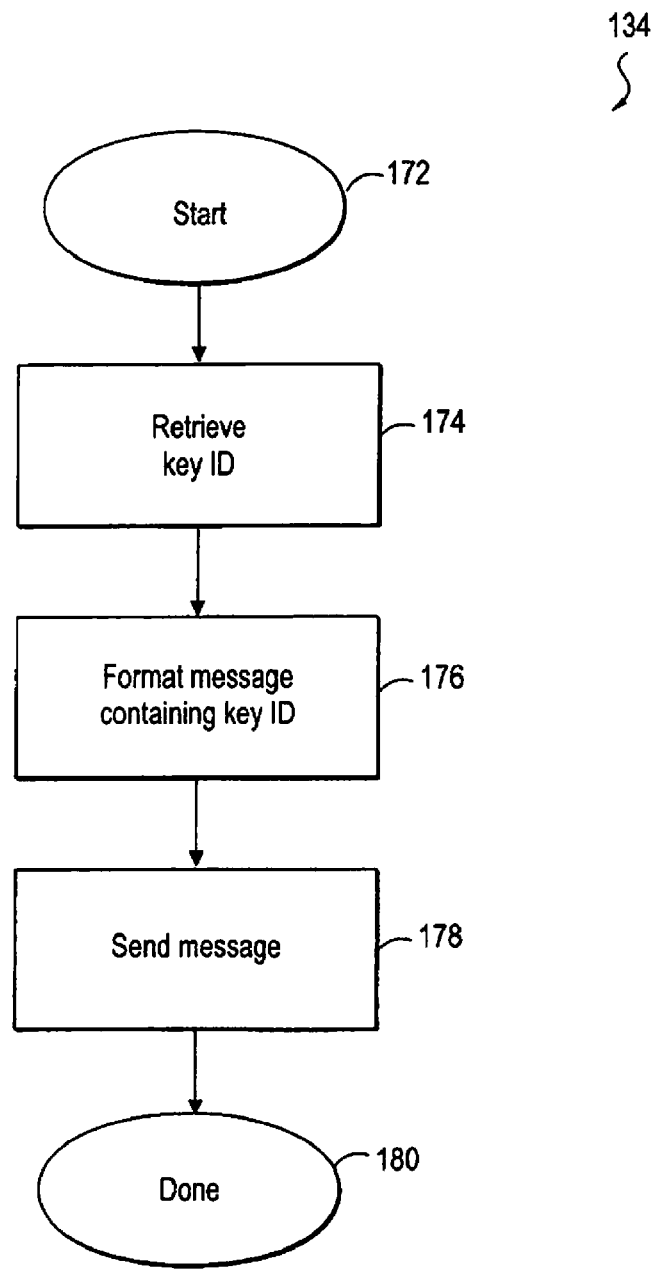
FIG. 9 is a flow diagram of an exemplary operation 134 "GET DATA—Key ID" of FIG. 7.

FIG. 9 shows an exemplary operation 134 of FIG. 7 in greater detail. The process begins in operation 172, control is passed to operation 174 which retrieves a key ID from secure processor 44 and its associated storage. Control is passed to operation 176, which formats a message containing the key ID. The message is then sent in operation 178. The entire message or parts of the message may be encrypted. The process is completed in operation 180.

Figure 10:
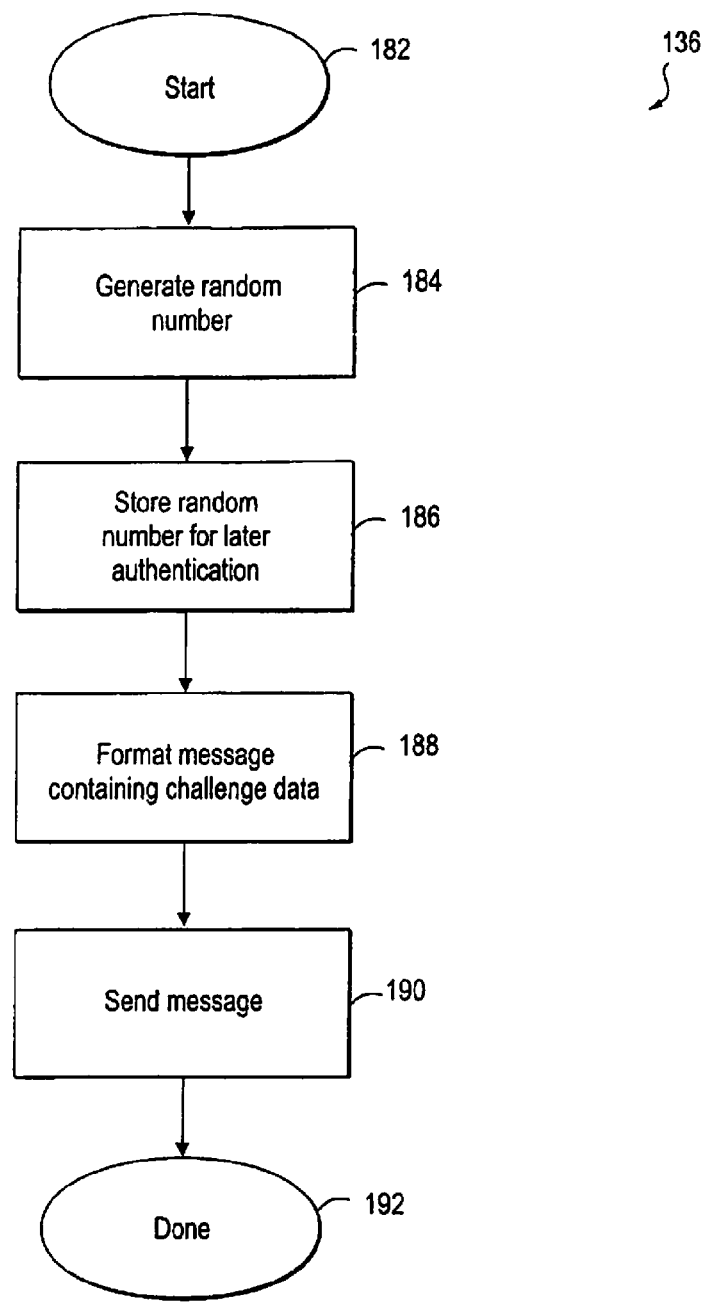
FIG. 10 is a flow diagram of an exemplary operation 136 "GET CHALLENGE" of FIG. 7.

FIG. 10 shows an exemplary operation 136 of FIG. 7 in greater detail. The process begins in operation 182; control is passed to operation 184 which generates a random number using random number generator 110. This random number is used as part of an authentication sequence in connection with operation 138 of FIG. 7. The random number is stored within secure processor 44 and its associated storage, preferably in RAM 91. Later, during authentication, this number is recalled and compared to a message generated externally. After the random number is stored in operation 186 control is passed to operation 188, which formats a message containing the random number. In operation 190, this random number is sent back to the client that requested it. The process is completed in operation 192.

Figure 11:
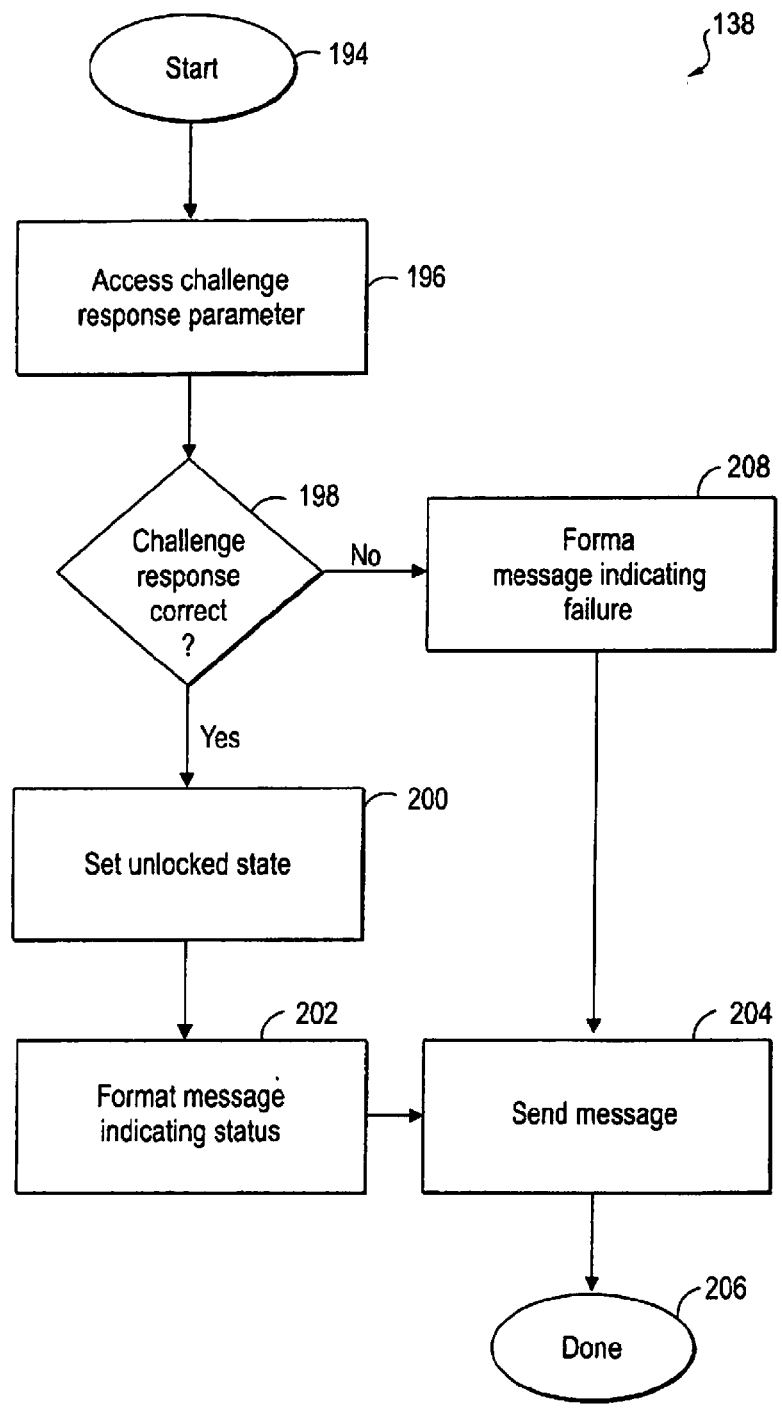
FIG. 11 is a flow diagram of an exemplary operation 138 "EXTERNAL AUTHENTICATE" of FIG. 7.

FIG. 11 shows an exemplary operation 138 of FIG. 7 in greater detail. The process begins with operation 194. Operation 196 accesses a challenge response parameter in the incoming message from the client. The challenge response parameter represents the client's attempt to replicate in encrypted form the random number that it has previously received. Control is then passed to operation 198, which compares the challenge response parameter to the previously stored random number. If these two numbers match, it means that the client has successfully replicated the number in encrypted form and returned it to secure processor 44 in an effort to authenticate itself to the secure processor 44. If the challenge response is correct, control is passed to operation 200, which sets an unlocked state in secure processor 44, preferably, in RAM 91. Once this unlocked state has been set, subsequent commands requiring authentication will be able to detect that authentication has occurred. Any subsequent reset or power cycle of secure processor 44 resets the chip to a locked condition, requiring the client to authenticate anew. After the unlocked state is set in operation 200, control is passed to operation 202, which formats a message indicating the status of secure processor 44 as well as the status of the present process. This message is then sent in operation 204 and the process is completed with operation 206. If, in operation 198, the challenge response was incorrect, then control is passed to operation 208, which formats a message indicating failure. This message is subsequently sent in operation 204 to the client and the process terminates with operation 206.

Figure 12:
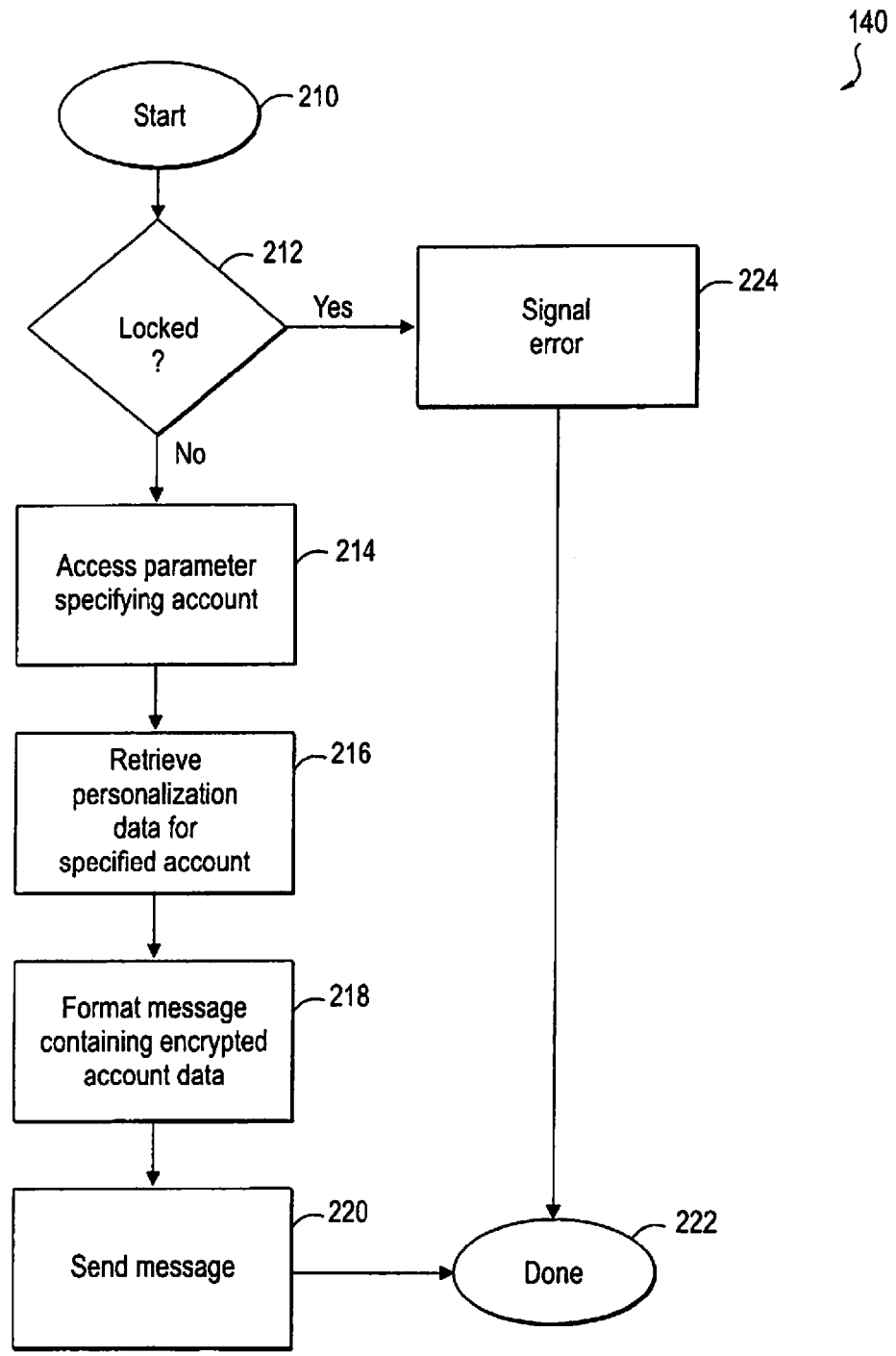
FIG. 12 is a flow diagram of an exemplary operation 140 "GET DATA—Personalization" of FIG. 7.

FIG. 12 shows an exemplary operation 140 of FIG. 7 in greater detail. The process begins in operation 210; control is passed to operation 212 which determines whether or not the secure processor 44 is locked. Secure processor 44 can only be unlocked if a previous authentication during the present communication session was successful. If secure processor 44 is unlocked, control is passed to operation 214, which accesses a parameter in the incoming message specifying the account to be accessed. Control is passed to operation 216, which retrieves personalization data for the specified account. This data is retrieved from the storage associated with secure processor 44. In operation 218, the message is formatted containing the encrypted account data that was requested. This account data pertains to the account specified in the message. This encrypted account data is then sent to the client in operation 220. The process is then completed in operation 222. If, in operation 212, it is found that secure processor 44 is locked, then, control is passed to operation 224, which formats and sends a message specifying that secure processor 44 is locked and, therefore refuses to provide the requested information. Control is then passed to operation 222, which completes the process.

Figure 13:
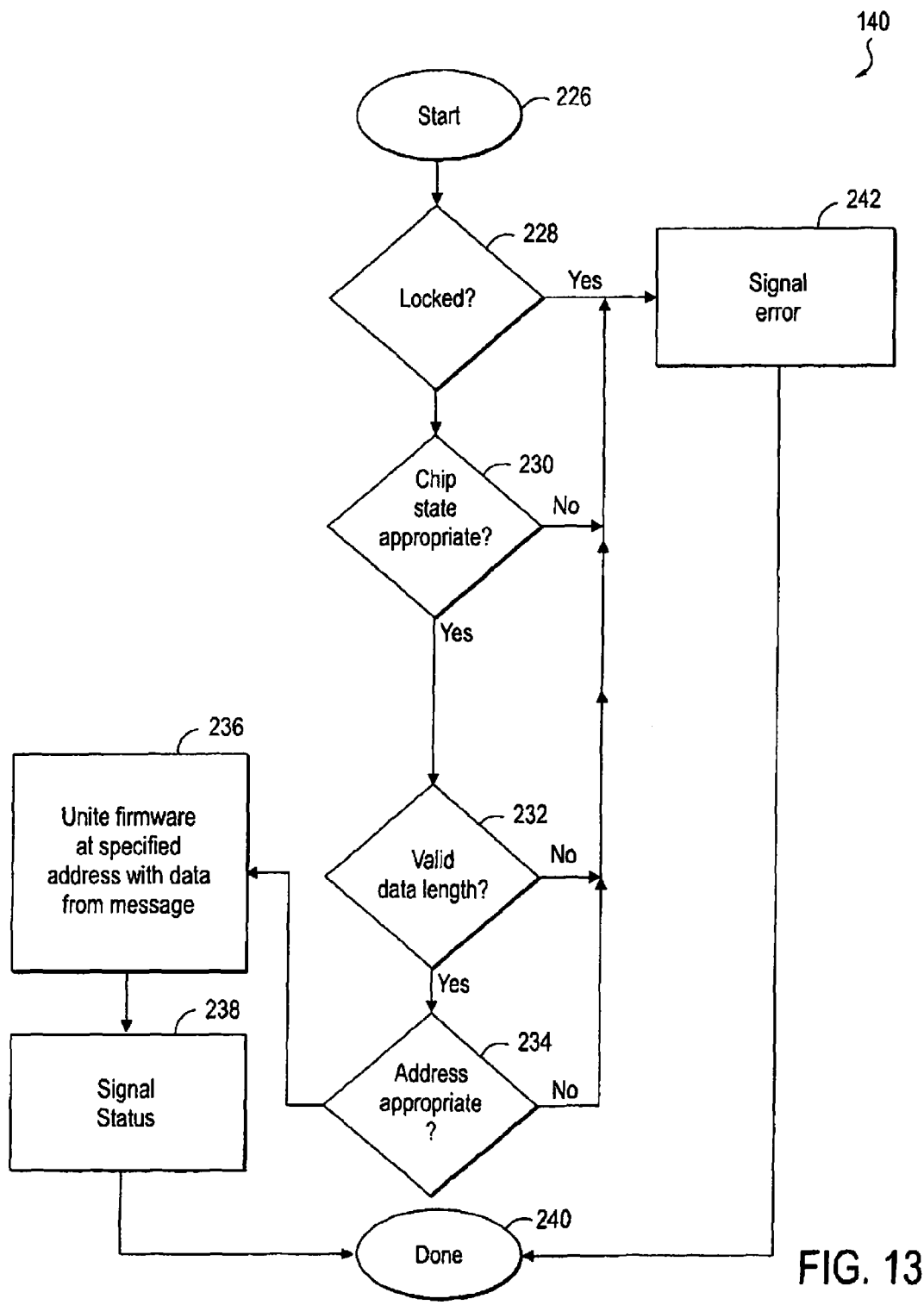
FIG. 13 is a flow diagram of an exemplary operation 142 "PUT DATA—Update EEPROM Firmware" of FIG. 7.

FIG. 13 shows an exemplary operation 142 of FIG. 7 in greater detail. The process begins in operation 226, control is then passed to operation 228 which determines whether or not secure processor 44 is locked. If secure processor 44 is not locked, control is passed to operation 230, which determines whether or not the secure processor 44 is in an appropriate state for the firmware to be updated. If secure processor 44 is in an appropriate state for the firmware to be updated, control is passed to operation 232, which verifies that the data length of the incoming firmware update is valid. If it is determined in operation 232 that the data length is valid, control is passed to operation 234, which examines a parameter in the message identifying the address to be updated in the firmware of EEPROM 91. If the address is found to be in a range of addresses that is suitable to store firmware updates, control is passed to operation 236, which updates the firmware at the specified address in EEPROM 91 with data from the message. Control is then passed to operation 238, which formats and sends to the client, a message indicating the status of secure processor 44 and the present process. Control is then passed to operation 240, which completes the process. If, in operation 228, it is determined that secure processor 44 is locked, control is passed to operation 242, which formats and sends a message to the client indicating failure and the reason for the failure. Similarly, if it is found in operation 230 that secure processor 44 is not in an appropriate state for the firmware to be updated, control is passed to operation 242, which signals an error. Likewise, if, in operation 232, it is found that the data length is not valid, control is passed to operation 242, which signals an error by formatting a message to contain error status information and sending it. Finally, if, in operation 234, it is found that the address for the firmware update is not appropriate, control is passed to operation 242, which signals an error. Once the error is signaled in operation 242, control is passed to operation 240 and the process is completed.

Figure 14:
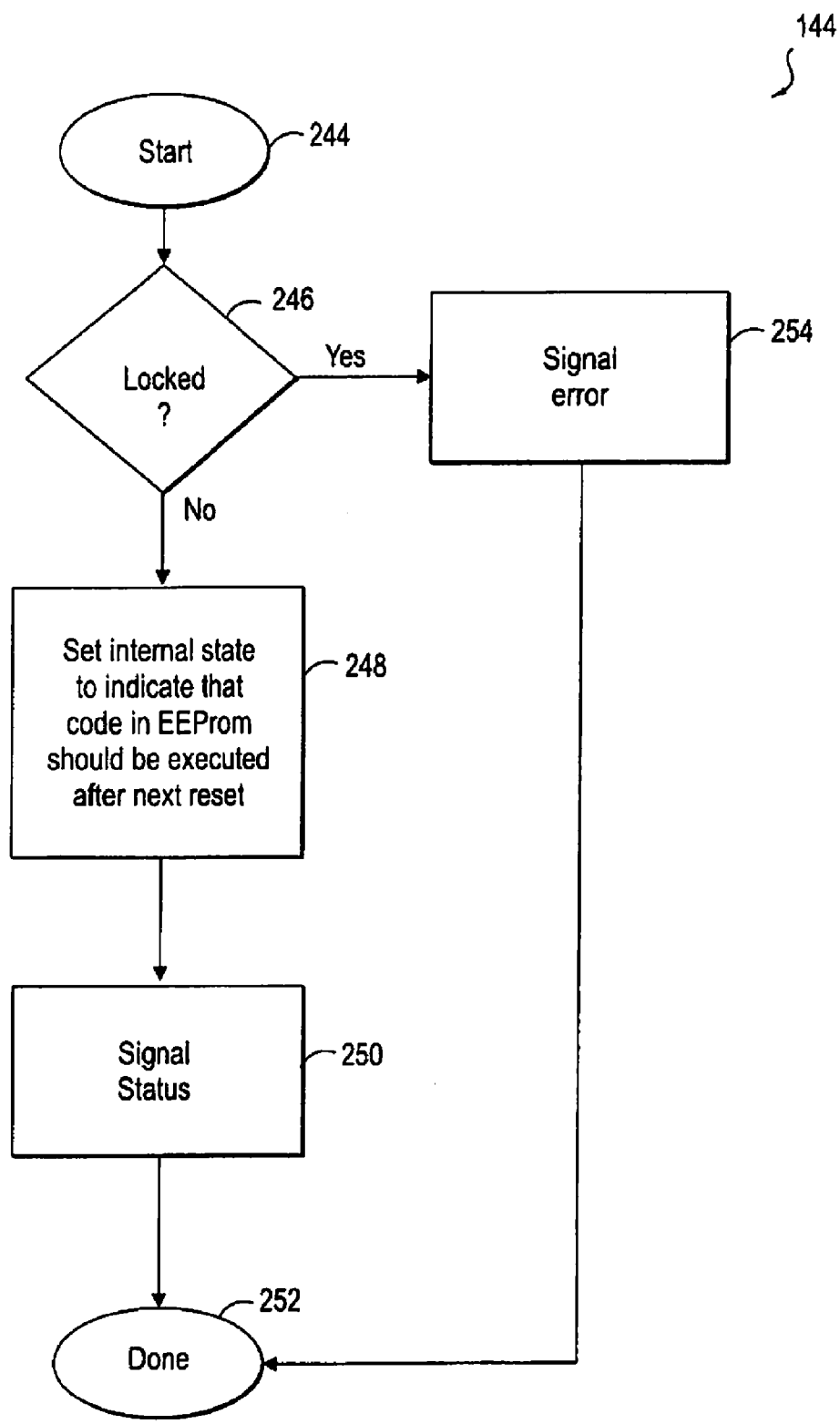
FIG. 14 is a flow diagram of an exemplary operation 144 "PUT DATA—Activate EEPROM Firmware" of FIG. 7.

FIG. 14 shows an exemplary operation 144 of FIG. 7 in greater detail. The process begins with operation 244; control is passed to operation 246, which determines whether or not the secure processor 44 is in a locked condition. If it is determined that secure processor 44 is not locked, control is then passed to operation 248, which sets the internal state of secure processor 44 to indicate that the software that has been loaded into the EEPROM 93 should be executed after the next reset. This allows secure processor 44 to transition from a state where it automatically executes the firmware stored in the ROM 96 to a state where it is executing the firmware that has been loaded into the EEPROM 93. In operation 250 a message which indicates the status of secure processor 44 and the present process is formatted and sent to the client. The process is then completed in operation 252. If it is determined in operation 246 that the secure processor 44 is in a locked condition, control is passed to operation 254 which formats and sends to the client a message indicating failure of the present process and the reason for the failure. Control is then passed to operation 252 which ends the process.

Figure 15:
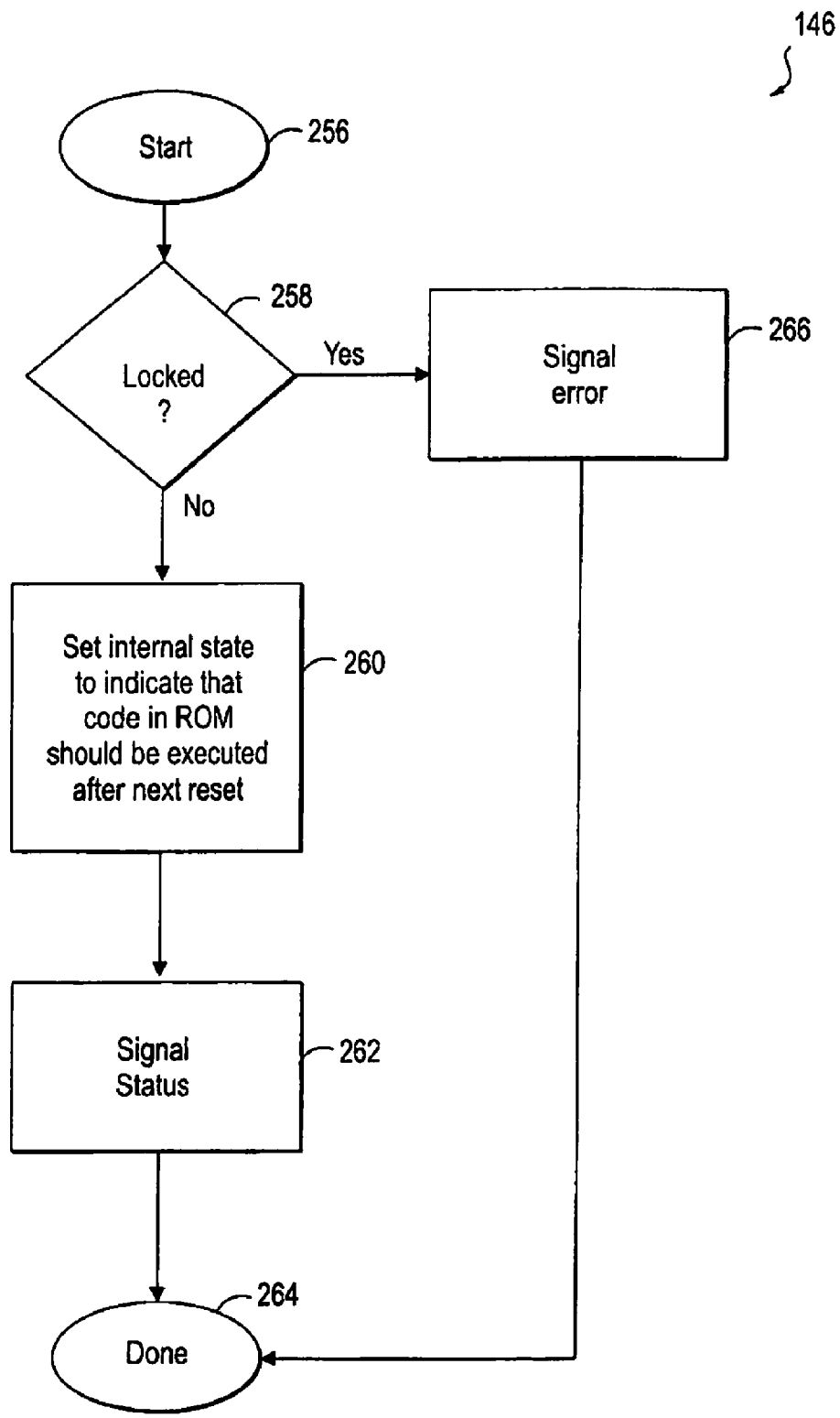
FIG. 15 is a flow diagram of an exemplary operation 146 "PUT DATA—Reset Firmware to ROM Version" of FIG. 7.

FIG. 15 shows an exemplary operation 146 of FIG. 7 in greater detail. The process is started in operation 256; control is passed to operation 258, which determines whether or not secure processor 44 is in a locked condition. If it is determined in operation 258 that the secure processor 44 is not in a locked condition, control is passed to operation 260 which sets the internal state of secure processor 44 to indicate that the firmware in ROM 96 should be executed after the next reset. This allows the secure processor 44 to transition to a state where it executes the firmware stored in ROM 96 which is known to be storing the original firmware of secure processor 44. Control is then passed to operation 262, which signals the status of secure processor 44 as well as the status of the present process. This status message is formatted and sent to the client. The process then terminates in operation 264. If it is determined in operation 258 that the secure processor 44 is in a locked condition, control is passed to operation 266 which formats and sends a message to the client indicating failure and the reason for the failure.

Figure 16:
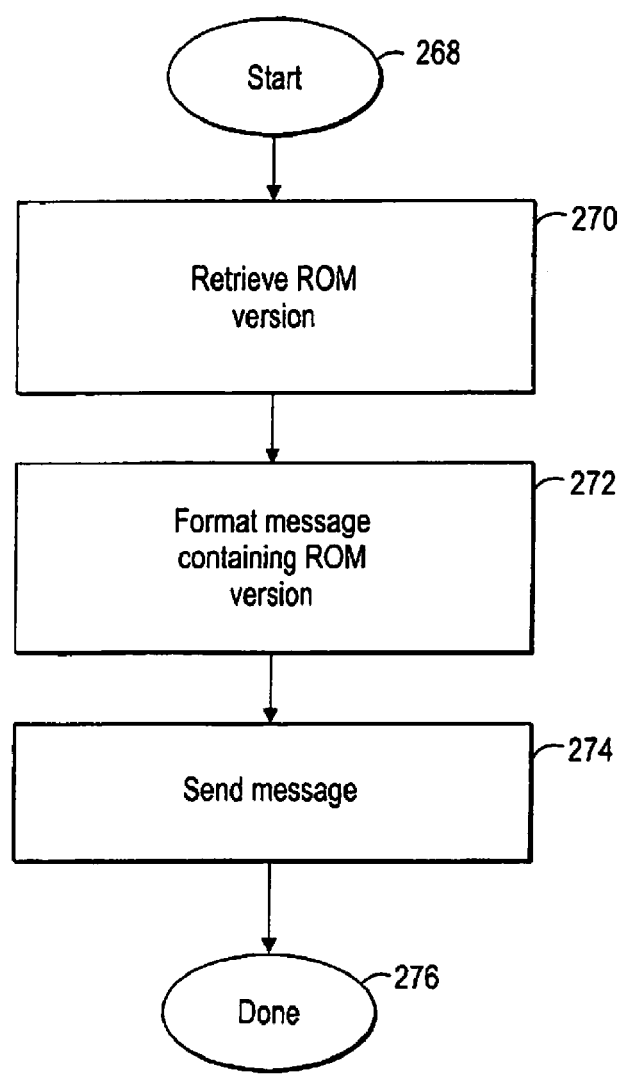
FIG. 16 is a flow diagram of an exemplary operation 148 "GET DATA—ROM Firmware" of FIG. 7.

FIG. 16 shows an exemplary operation 148 of FIG. 7 in greater detail. The process begins in operation 268, control is passed to operation 270, which retrieves from ROM 96 the version number of the information stored in ROM 96. Control is then passed to operation 272, which formats a message containing the ROM 96 version number. Preferably, this information is in unencrypted form. Operation 274, then, sends the message to the client and the process terminates with operation 276. In an alternate embodiment, this information is encrypted.

Figure 17:
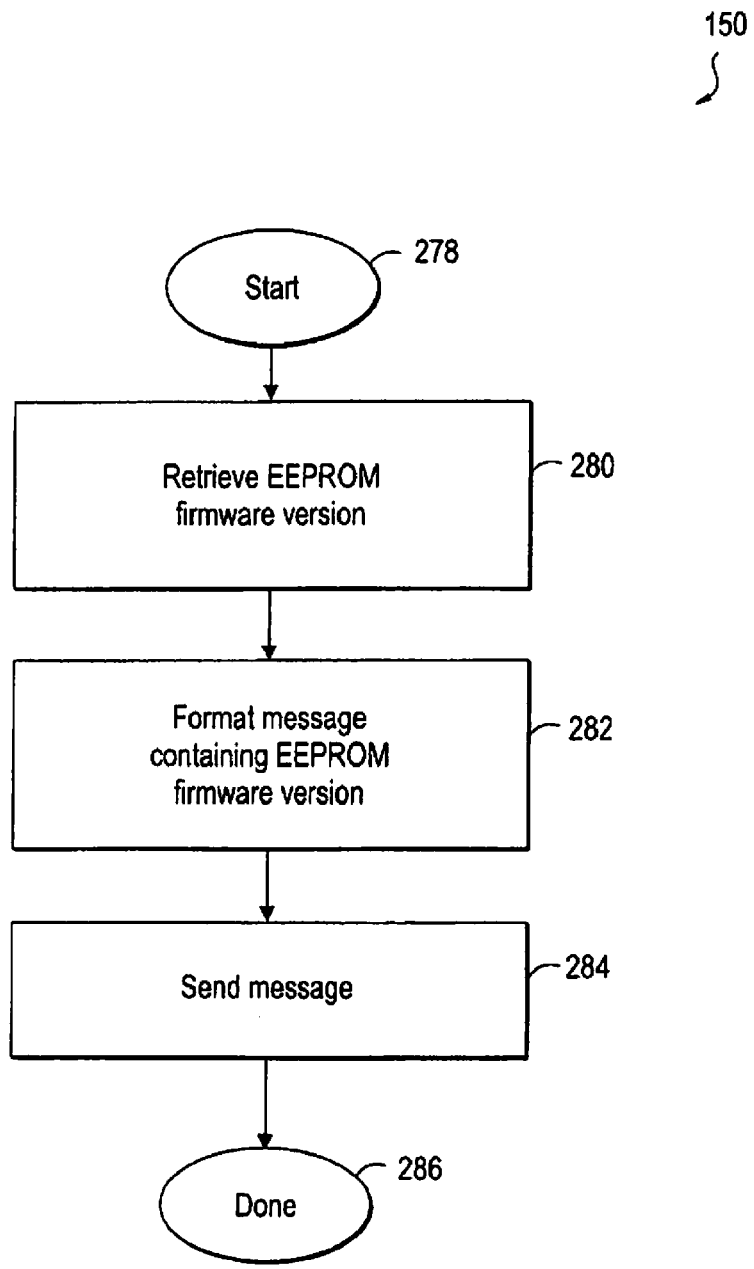
FIG. 17 is a flow diagram of an exemplary operation 150 "GET DATA—EEPROM Firmware Version" of FIG. 7.

FIG. 17 shows an exemplary operation 150 of FIG. 7 in greater detail. The process begins in operation 278; control is passed to operation 280, which retrieves the firmware version of EEPROM 93. This information is preferably stored in EEPROM 93. Control is then passed to operation 282, which formats a message containing the EEPROM 93 firmware version. Preferably, this version information is in unencrypted form. Control is then passed to operation 284, which sends the message to the client. The process is then terminated in operation 286. In an alternate embodiment, this information is encrypted.

Figure 18:
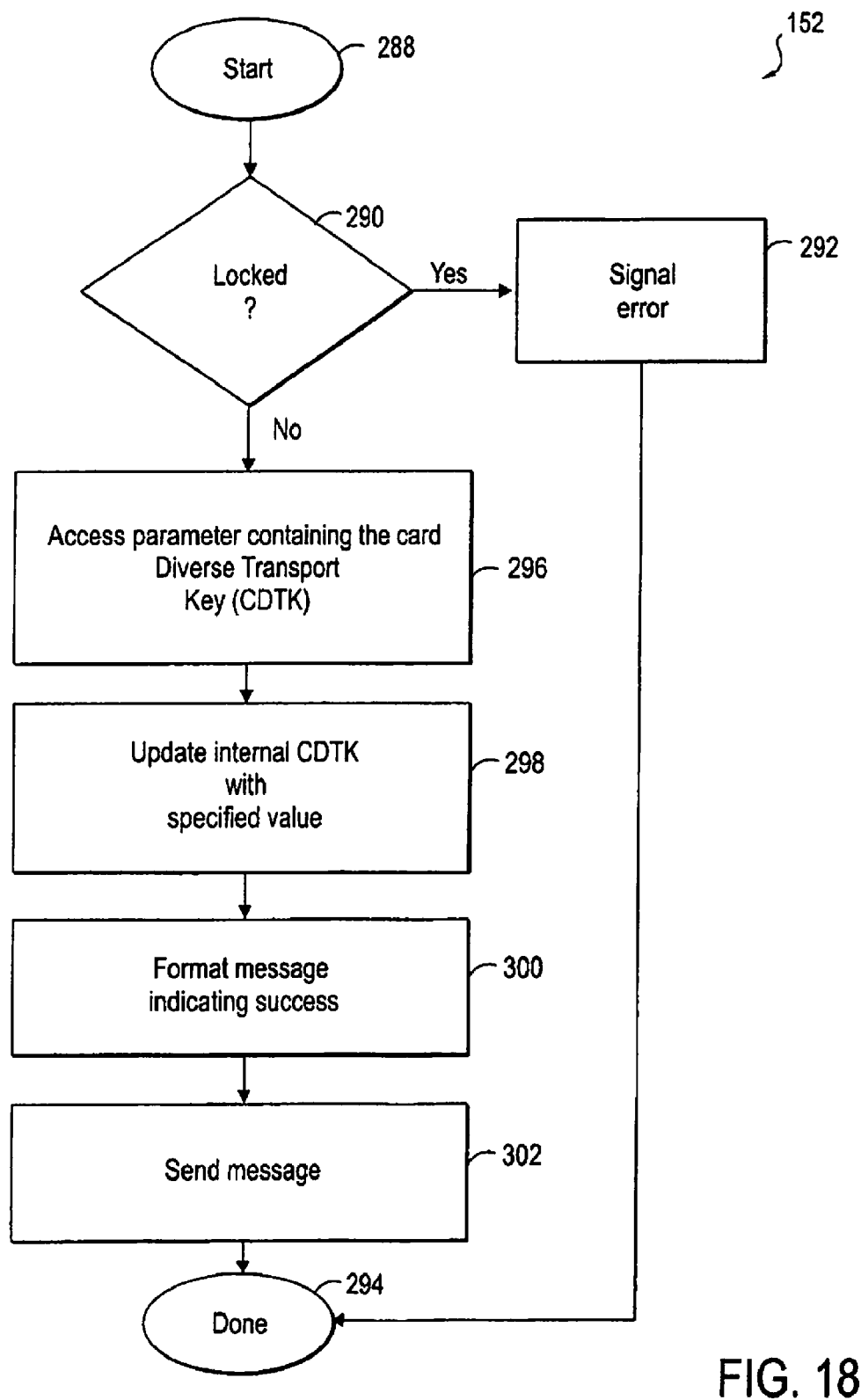
FIG. 18 is a flow diagram of an exemplary operation 152 "PUT DATA—Initialize Diverse Key" of FIG. 7.

In FIG. 18, an exemplary operation 152 of FIG. 7 is explained in greater detail. The process 152 begins with at 288, and, in a decision operation 290 it is determined whether it is locked. If it is locked, operation 292 signals an error by formatting a message containing error status information and sending it to the client, and the process is completed at 294. If decision operation 290 determines that it is not locked, operation 296 accesses a parameter containing the card diverse transport key (CDTK) which must be decrypted since it is transmitted by the client in encrypted form using the transpork key of secure processor 44. Next, in operation 298, the process updates the internal CDTK with a specified value. Next, in an operation 300, a message is formatted to indicate the status of secure processor 44 and the present process. The message is then sent in an operation 302 and the process 152 is completed at operation 294.

Figure 19:
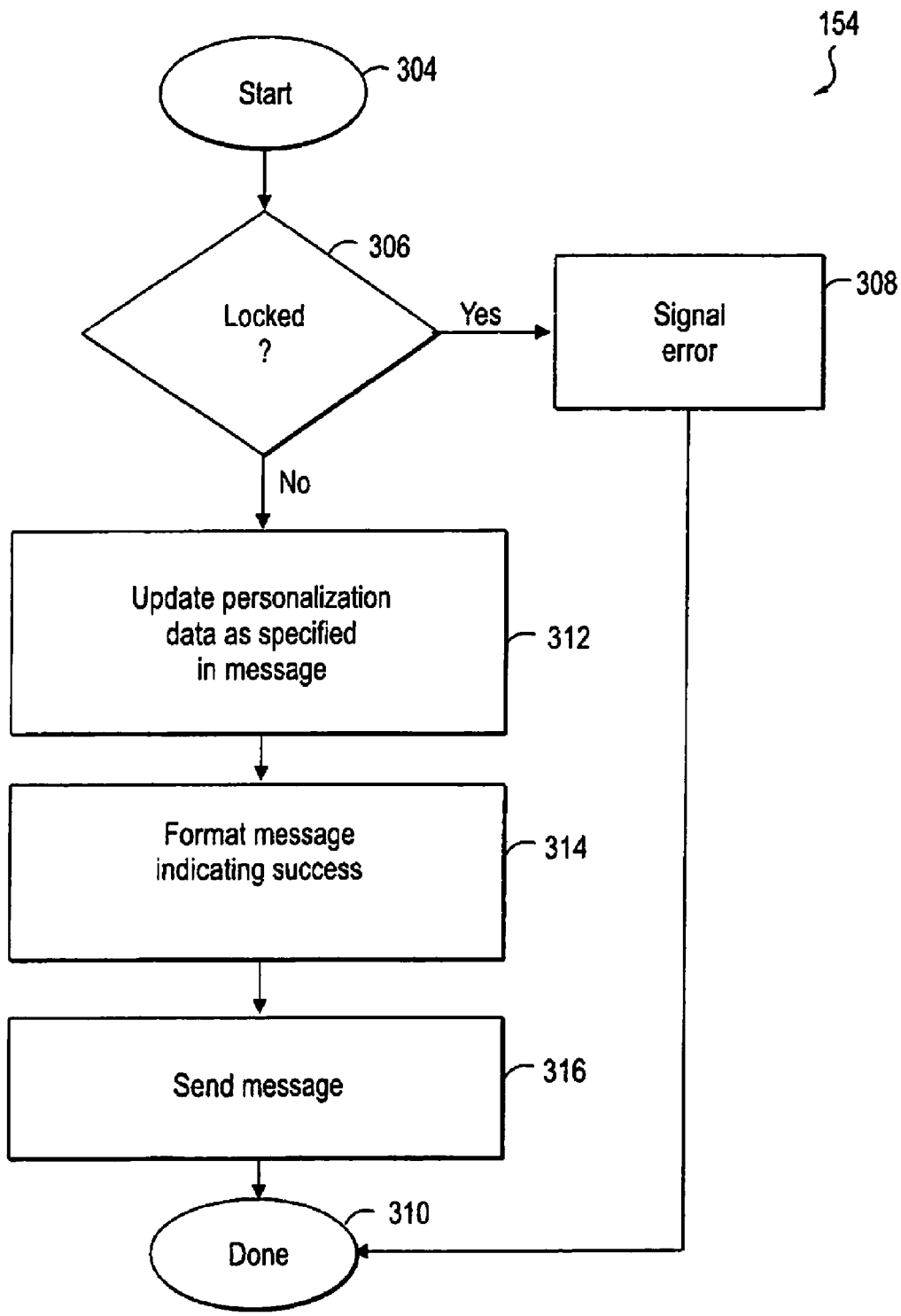
FIG. 19 is a flow diagram of an exemplary operation 154 "PUT DATA—Personalize" of FIG. 7.

In FIG. 19, an exemplary operation 154 PUT DATA-Personalize of FIG. 7 is described in greater detail. The process 154 begins at 304 and, in a decision operation 306 it is determined whether it is locked. If it is locked, an operation 308 signals an error by formatting and sending a message indicating error status to the client and the process 154 is completed at 310. If operation 306 determines that it is not locked, operation 312 decrypts and updates the personalization data stored in EEPROM as specified in the message. Next, in an operation 314, a message is formatted to indicate the status of secure processor 44 and the present process. Finally, in operation 316, the message is sent and the process 154 is complete at 310.

Figure 20:
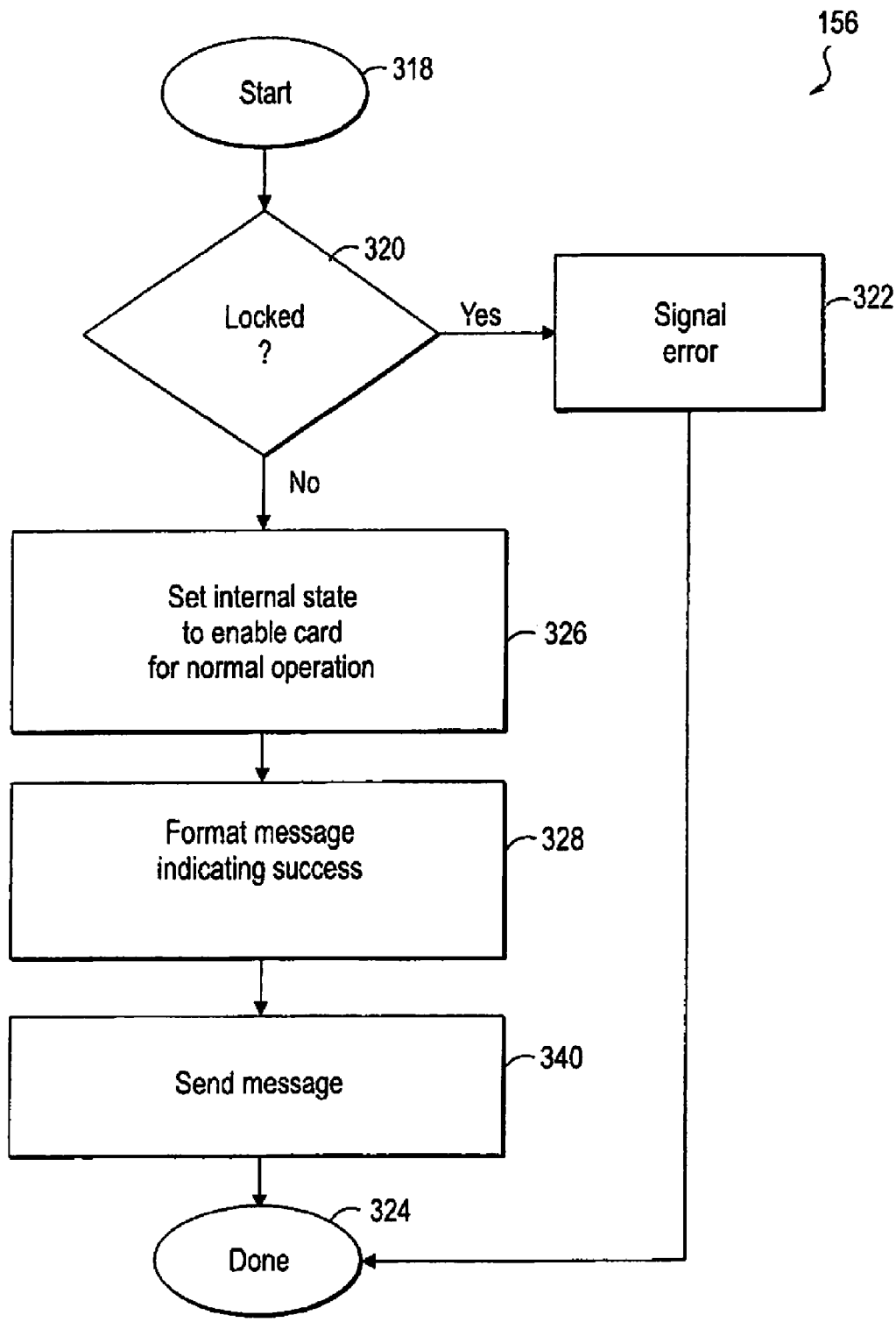
FIG. 20 is a flow diagram of an exemplary operation 156 "PUT DATA—Enable" of FIG. 7.

FIG. 20 describes an exemplary process of operation 156 of FIG. 7 in greater detail. The process begins at operation 318; control is then passed to decision operation 320 which determines whether or not secure processor 44 is in a locked condition. If secure processor 44 is locked, then control is passed to operation 322 which formats and sends a message containing error information to the client. Control is then passed to operation 324 which terminates the process. If in operation 320 it is determined that secure processor 44 is not locked, control passes to operation 326 which sets the internal state of secure processor 44 to indicate that the card is enabled for normal operation. In a preferred embodiment, this internal state is stored in EEPROM 93. Control is then passed to operation 328 which formats a message indicating the status of processor 44 and of the present process. The message is then sent in operation 340. The process then ends in operation 324.

Figure 21:
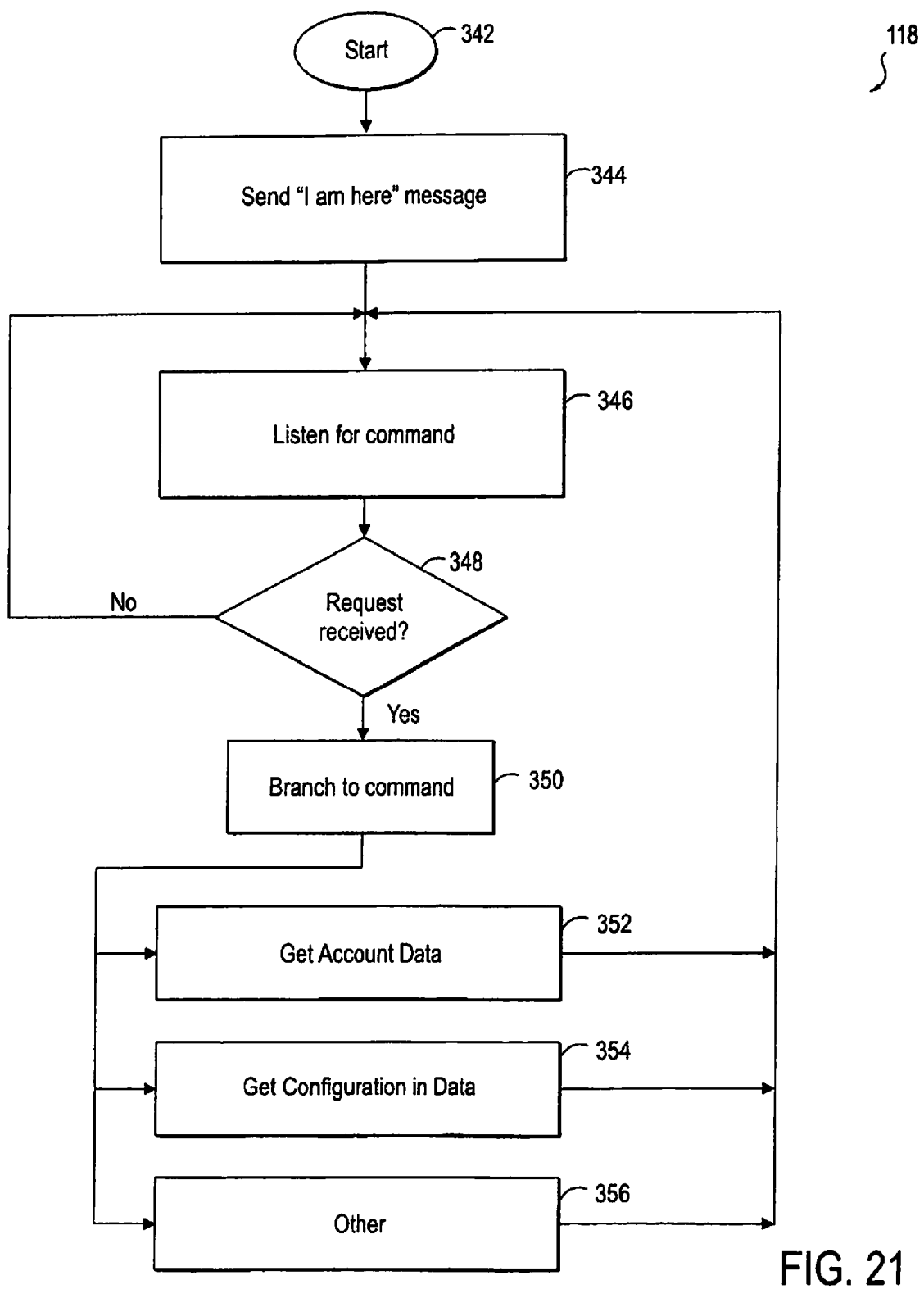
FIG. 21 is a flow diagram of an exemplary operation 118 "Handle M2" of FIG. 5.

FIG. 21 shows an exemplary process of operation 118 of FIG. 5 in greater detail. The process begins with operation 342, control is then passed to operation 344, which sends an "I am here" message to general processor 52. At this point, secure processor 44 begins listening for a command to be sent from the client, general processor 52. This is handled in operation 346. Then, in a decision operation 348, it is determined whether or not a request has been received. If not, control is passed back to operation 346.

If a request has been received from the client, control is passed to operation 350. In operation 350, the incoming request or command is examined for a selector code that is used to dispatch the message to an appropriate handler. One such handler is operation 352, which retrieves account data specified in the command and returns it to the client. Another such handler is operation 354, which retrieves configuration data for secure processor 44 and returns it to the client. Operation 356 could be used to handle any other kind of communication between general processor 52 and secure processor 44. By way of example, and not limitation, this command could be used to allow the general processor to access the random number generator 102 on secure processor 44. Similarly, such a handler could be disposed to provide access to the other functions that are unique to secure processor 44 such as crypto processor 92. Steps 352, 354, and 356, when completed, return control to operation 346, which listens for a subsequent command. This process continues until the power is interrupted.

In an alternative embodiment an external event other than a power interruption event, would cause the loop of the present process to terminate. It should be noted that communications between general processor 52 and secure processor 44 may optionally use additional connections such as auxiliary connector 50. One exemplary embodiment of this communication uses one communication line on bus 48 in concert with auxiliary connector 50, to establish synchronous serial communications between general processor 52 and secure processor 44. This is especially useful in situations where general processor 52 does not have a UART for asynchronous serial communications. Auxiliary connector 50 and the UO communications line of bus 48 can be used in a wide variety of ways to achieve synchronous communication. In one exemplary embodiment, one of the two processors 52 and 44 will send a message to the other processor which uses one of the two communication lines to signal the receipt of each bit by transitioning the state of said communication line from one to zero or from zero to one.

Figure 22:
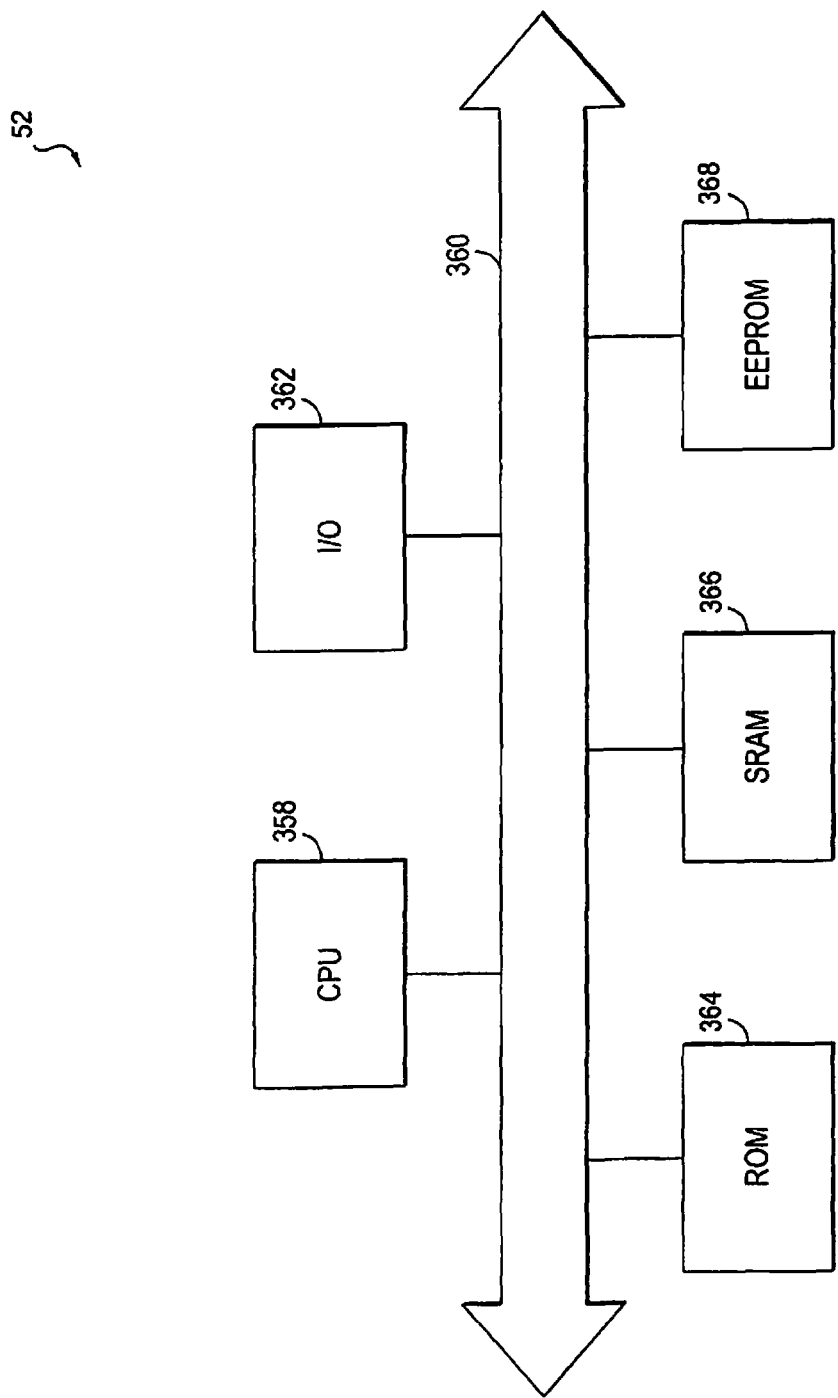
FIG. 22 is an exemplary and highly simplified block diagram of the general processor of FIG. 3.

FIG. 22 is an exemplary and highly simplified block diagram of general processor 52 on FIG. 3. General processor 52 is comprised of a CPU 358, a bus 360, an I/O subsystem 362, ROM 364, SRAM 366, and EEPROM 368. I/O subsystem 362 drives display 58, switches 60, other I/O 62, and the interface with magnetic stripe emulator 64, which sends signal data to the broadcaster and receives sensor data from the broadcaster. Switches 60 include on/off button 28, and account selector 38, of FIG. 2.

Figure 23:
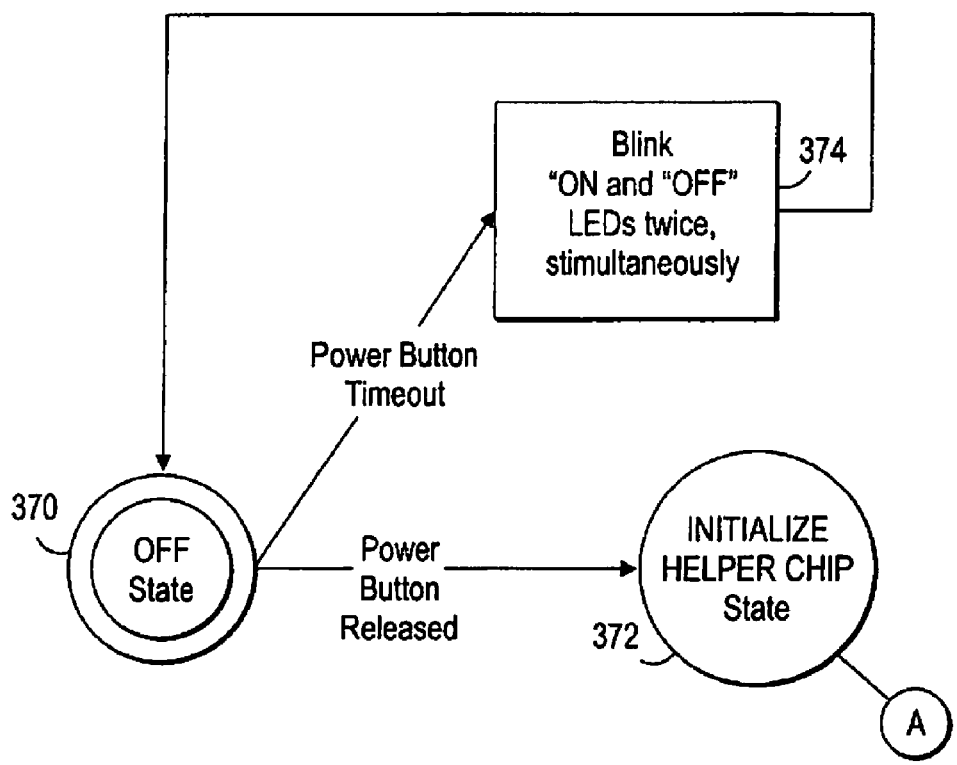
FIG. 23 is a flow diagram which illustrates an example of a main process of the general processor of FIG. 3.

FIG. 23 illustrates, by way of example and not limitation, a main process of general processor 52. General processor 52 is initially in an off state when the on/off button 28 is pressed. When the on/off button 28 is released, control is passed from operation 370 to operation 372. If the amount of time that the on/off button 28 remains pressed exceeds a certain threshold, general processor 52 passes control to operation 374, which blinks on indicator 30 and off indicator 32, twice, simultaneously. Control is then passed to operation 370. At the moment on/off button 28 is pressed, general processor 52 receives power so that it can perform these operations. If on/off button 28 is not released, the on indicator 30 and off indicator 32 continue to blink twice, simultaneously, every two seconds until on/off button 28 is released.

Figure 24:
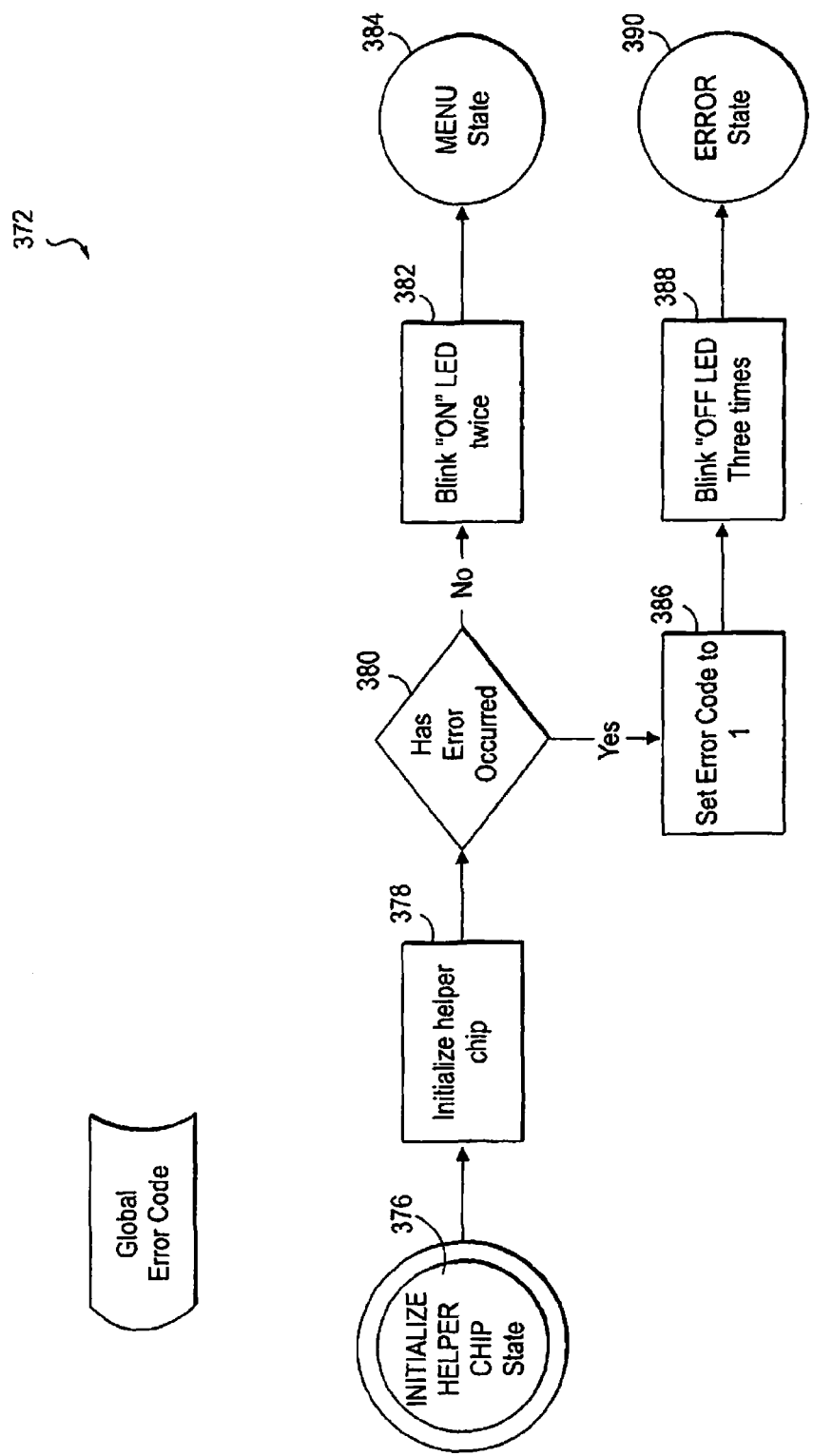
FIG. 24 is a flow diagram of an exemplary operation 372 "INITIALIZE HELPER CHIP State" of FIG. 23.

FIG. 24 shows an exemplary process of operation 372 of FIG. 23 in greater detail. The process begins with the operation 376 and continues with operation 378, which initializes the general processor 52. Then, in a decision operation 380, a determination is made whether an error has occurred during said initialization operation. If no error has occurred, control is passed to operation 382, which blinks on indicator 30 twice, and passes control to operation 384, which enters the menu state. If in operation 380, an error has occurred, control is passed to operation 386, which sets an error code to one and blinks off indicator 32 three times. In subsequent operation 388, control is then passed to operation 390, which enters an error state.

Figure 25:
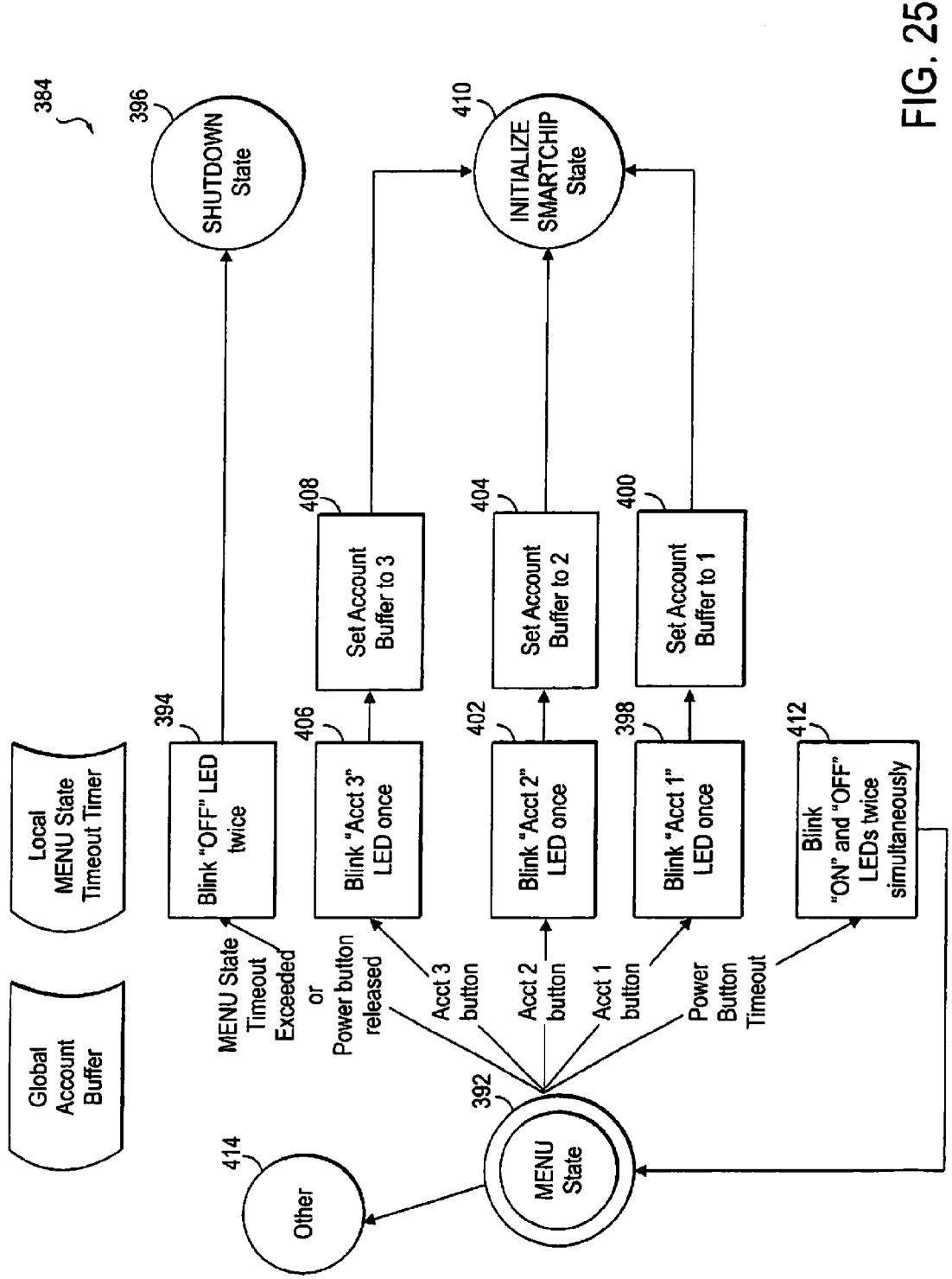
FIG. 25 is a flow diagram of an exemplary operation 384 "MENU State" of FIG. 24.

FIG. 25 illustrates an exemplary operation 384 of FIG. 24 in greater detail. The process begins in operation 392, which discriminates between a number of different events that are induced externally.

For example, if the on/off button 28 is released or a timeout threshold is exceeded, control is passed to operation 394, which blinks off indicator 32 twice. Control is, then passed to operation 396, which enters a shut down state. If, on the other hand, in operation 392, it is determined that account button one has been pressed, control is passed to operation 398, which blinks account indicator 36 for account one once. Control is, then, passed to operation 400, which sets an internal account buffer to one, indicating that the data for account one is to be accessed subsequently.

Similarly, if it is determined in operation 392 that account selector 38 for account number two has been pressed, control is passed to operation 402, which blinks the account indicator 36 for account two once. Control is, then passed to operation 404, which sets an internal account buffer to two, indicating that subsequent account activity should pertain to account two. Likewise, if it is determined in operation 392 that the account selector 38 for account three has been selected, control is passed to operation 406, which blinks the account indicator 36 for account three once, and passes control to operation 408, which sets the account buffer to three, indicating that the account data for account three is to be accessed subsequently. Control is, then passed to operation 410. Steps 400 and 404 also transition to operation 410 upon completion.

If it is determined in operation 392 that the power button timeout has been detected, control is passed to operation 412, which blinks on indicator 30 and off indicator 32 twice, simultaneously. Control is, then passed back to operation 392, which continues to monitor external events. It is contemplated that additional events and event handlers could be added to the present process, such as operation 414, which could, for example, detect a chord which would be produced by a combination of buttons on card back 14. Such a chord could be used, for example, to instruct the card to enter a self diagnostic mode, or a demonstration mode which flashes various LEDs, or a game mode. In another embodiment, operation 414 could render the card unusable for a period of time or until a special code is entered. Such an embodiment would be useful if, for example, the card were temporarily not in one's possession. These various alternative embodiments are given by way of example and not limitation.

Figure 26A:
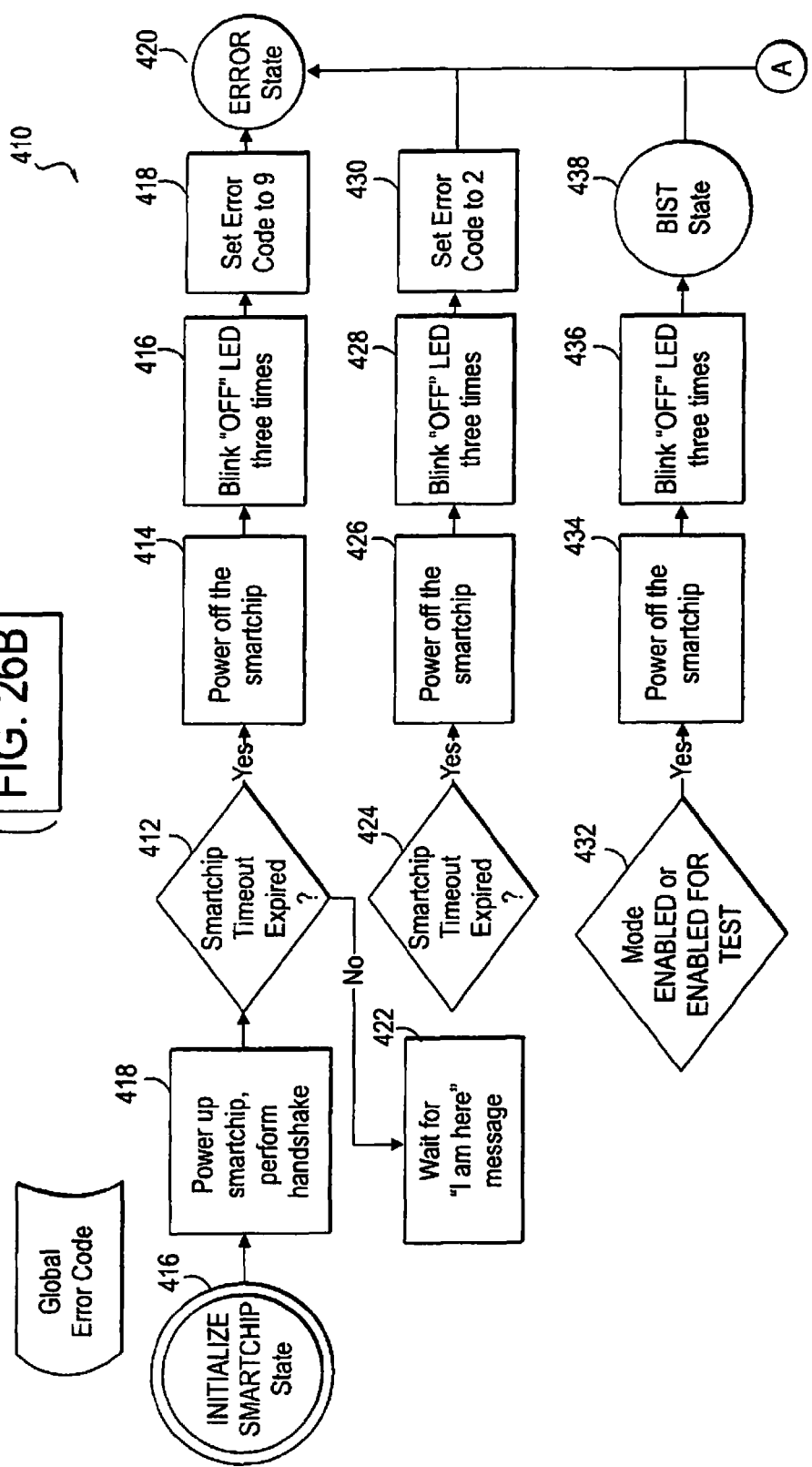
FIG. 26 is a flow diagram of an exemplary operation 410 "INITIALIZE SMARTCHIP State" of FIG. 25.
Figure 26B:
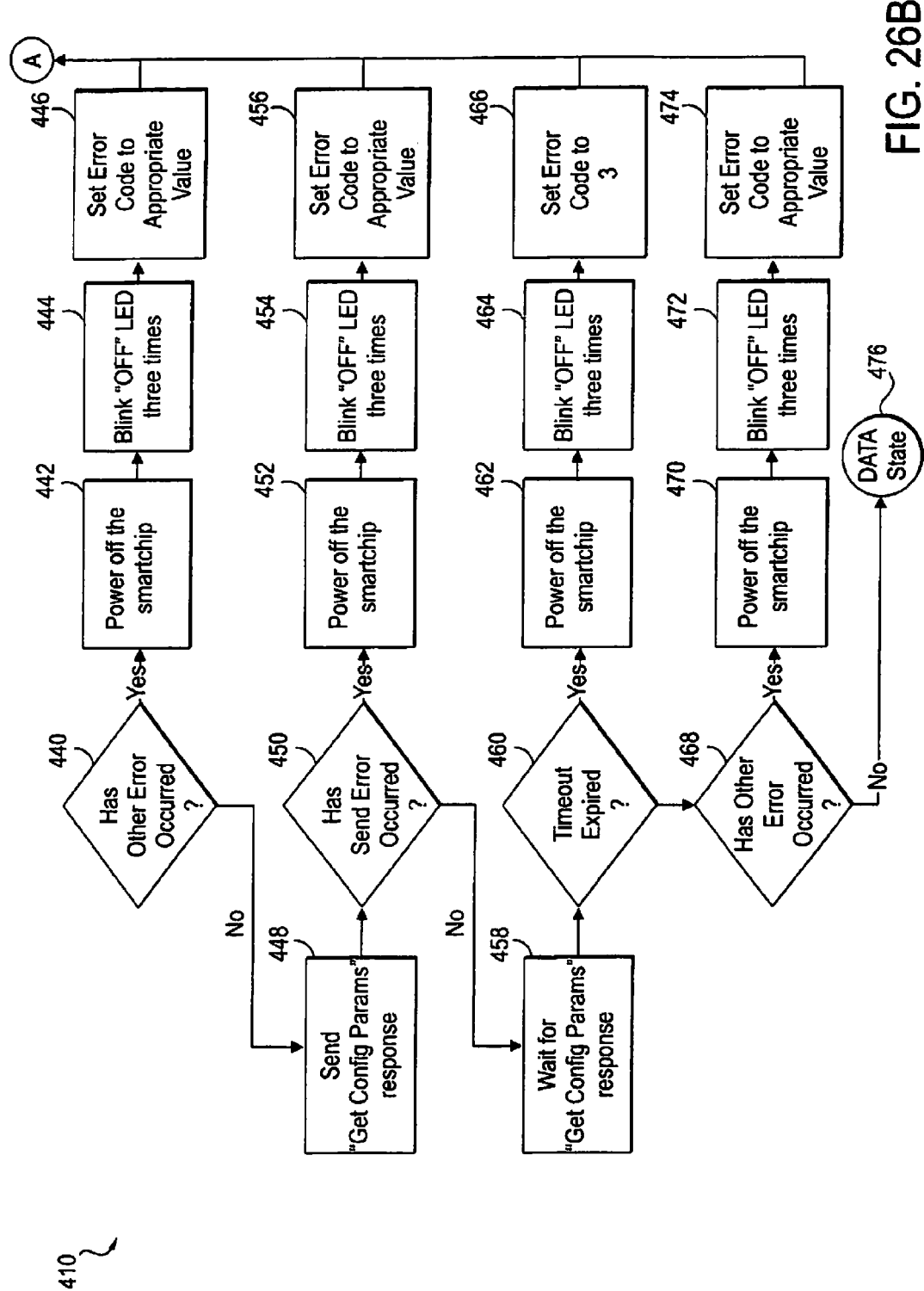

FIG. 26 shows an exemplary operation 410 of FIG. 25 in greater detail. The process begins with operation 416; control is passed to operation 418, which powers up secure processor 44 and performs a handshake to verify that secure processor 44 is operating properly. In decision operation 420, it is determined whether or not a timeout has expired while waiting for the handshake to be completed. If a timeout does occur, control is passed to operation 414, which powers off the secure processor 44. Control is, then passed to operation 416, which blinks off indicator 32 three times. Control is, then passed to operation 418, which sets an error code to nine. Once this is completed, control is passed to error operation 420. If it is determined in operation 412 that a timeout has not expired, control is passed to operation 422 which waits for an "I am here" message from secure processor 44. Then, in decision operation 424, it is determined whether or not a timeout has expired while waiting for the "I am here" message. If a timeout has expired, control is passed to operation 426 which powers off secure processor 44. Control is then passed to operation 428, which blinks off indicator 32 three times. Then in operation 430, an error code is set to two and then control passes to error operation 420. If in operation 424 it is determined that a timeout has not expired, control is passed to decision operation 432, which determines whether or not a mode is enabled or enabled for self-test. If it is not then control is passed to operation 434, which powers off secure processor 44. Control is then passed to operation 436, which blinks the off indicator 32 three times. Control is then passed to operation 438, which enters a BIST state. If, in operation 432, it is determined that mode is enabled or enabled for test, control is passed to operation 440, which determines whether or not some other error has occurred. If so, control is passed to operation 442, which powers off secure processor 44. At this point control is passed to operation 444, which blinks off indicator 32 three times. Then control passes to operation 446, which sets an error code. Control is then passed to 420, which processes the error. If in operation 440 it is determined that no other error has occurred, control is passed to operation 448, which sends a message to secure processor 44 requesting configuration parameters. Then, in decision operation 450, it is determined whether or not an error has occurred. If so, control passes to operation 452 which powers off secure processor 44. Control is then passed to operation 454, which blinks off indicator 32 three times. Control then passes to operation 456, which sets an error code and passes control to operation 420, which processes the error.

If it is determined in operation 450 that no error has occurred in sending the request for configuration parameters to secure processor 44, control is passed to operation 458, which waits for a response from secure processor 44 regarding the request of operation 448. Then, in a decision operation 460, it is determined whether or not a timeout has expired. If so, control is passed to operation 462, which powers off secure processor 44. Control is then passed to operation 464, which blinks off indicator 32 three times. Then, in operation 466, an error code is set to three and control is passed to operation 420, which processes the error.

If, in operation 460, it is determined that the timeout has not expired, control is passed to a decision operation 468, which determines whether or not another error has occurred. If an error has occurred, control is passed to operation 470, which powers off secure processor 44. Then, in operation 472, off indicator 32 is blinked three times and control is passed to operation 474 which sets an error control and passes control to operation 420, which processes the error. If, in operation 468, it is determined that no error has occurred, control is passed to operation 476, which enters a data state.

Figure 27:
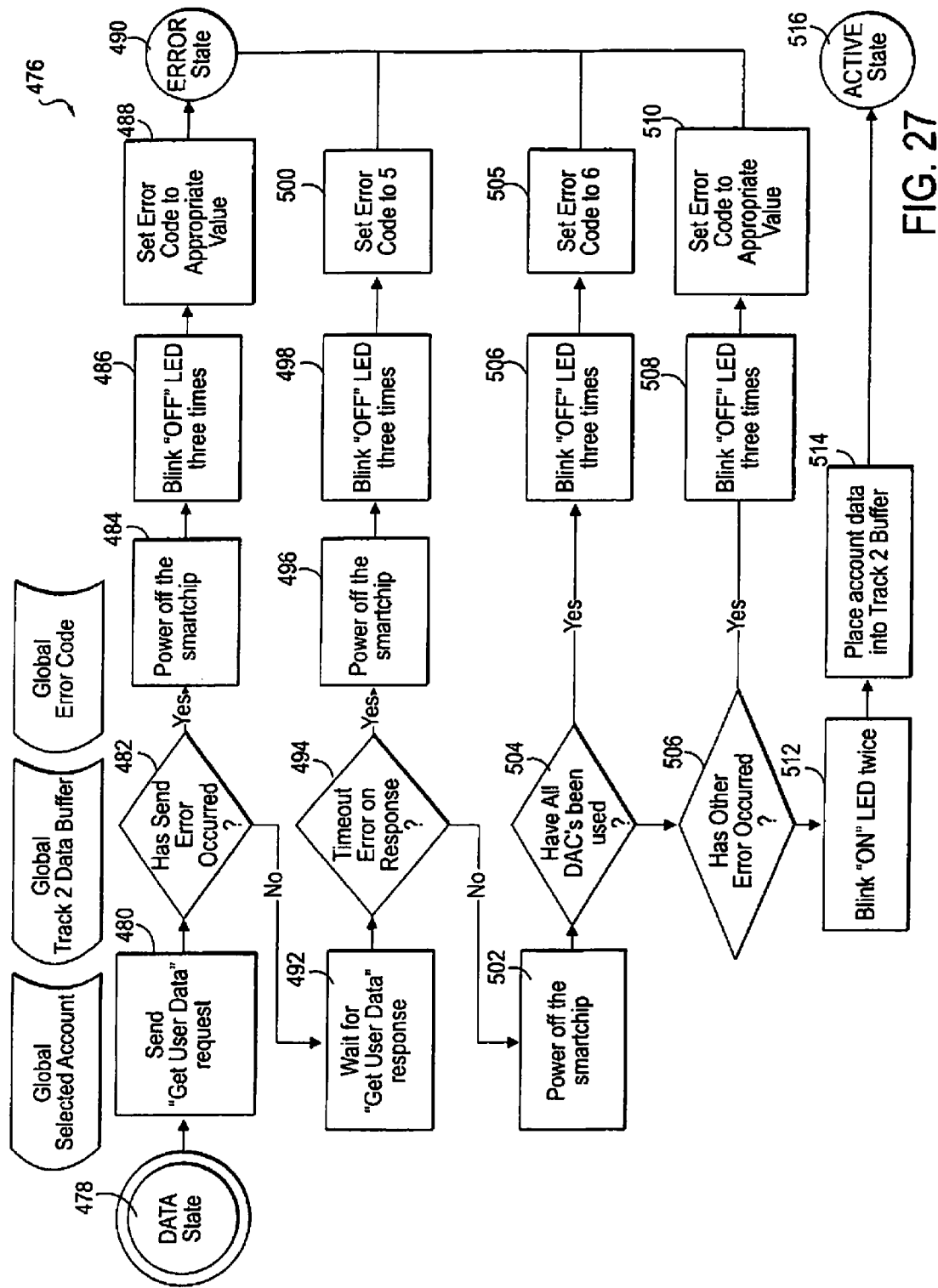
FIG. 27 is a flow diagram of an exemplary operation 476 "DATA State" of FIG. 26.

FIG. 27 illustrates an exemplary operation 476 of FIG. 26 in greater detail. The process begins with operation 478; control is then passed to operation 480, which sends a "Get user data" request to secure processor 44. Then, in a decision operation 482, it is determined whether or not an error has occurred while sending the request. If it is determined that an error has occurred, control is passed to operation 484, which powers off secure processor 44. Control is, then, passed to operation 486, which blinks off indicator 32 three times. Then, in operation 488, an error code is set and in operation 490, an error state is entered which processes the error.

If, in operation 482, it is determined that no error has occurred while sending the request, control is passed to operation 492, which waits for a response to the request of operation 480. Then, in a decision operation 494, it is determined whether or not there has been a timeout while waiting for the response from secure processor 44. If it is determined that there has been a timeout, control is passed to operation 496, which powers off secure processor 44. Control is then passed to operation 498, which blinks off indicator 32 three times and passes control to operation 500, which sets an error code to five and passes control to operation 490, which processes the error.

If, in operation 494, it is determined that no timeout has occurred while waiting for the response from secure processor 44, then, operation 502 powers off secure processor 44. Then, in decision operation 504, it is determined whether or not all dynamic authentication codes have been used. If so, control is passed to operation 506, which blinks off indicator 32 three times and passes control to operation 508, which sets an error code to six and, then, an error state 490 is entered, which processes the error.

If, in operation 504 it is determined that not all dynamic authentication codes have been used, control is passed to decision operation 506, which determines whether or not another error has occurred. If so, control is passed to operation 508 which blinks off indicator 32 three times. Control is, then, passed to operation 510 which sets an error code and control is passed to operation 490, which processes the error.

If, in operation 506, it is determined that no error has occurred, control is passed to operation 512, which blinks on indicator 30 twice. Then, in operation 514, the account data which was received from secure processor 44 is placed into the track two buffer. Control is, then, passed to operation 516, which enters an active state.

Figure 28:
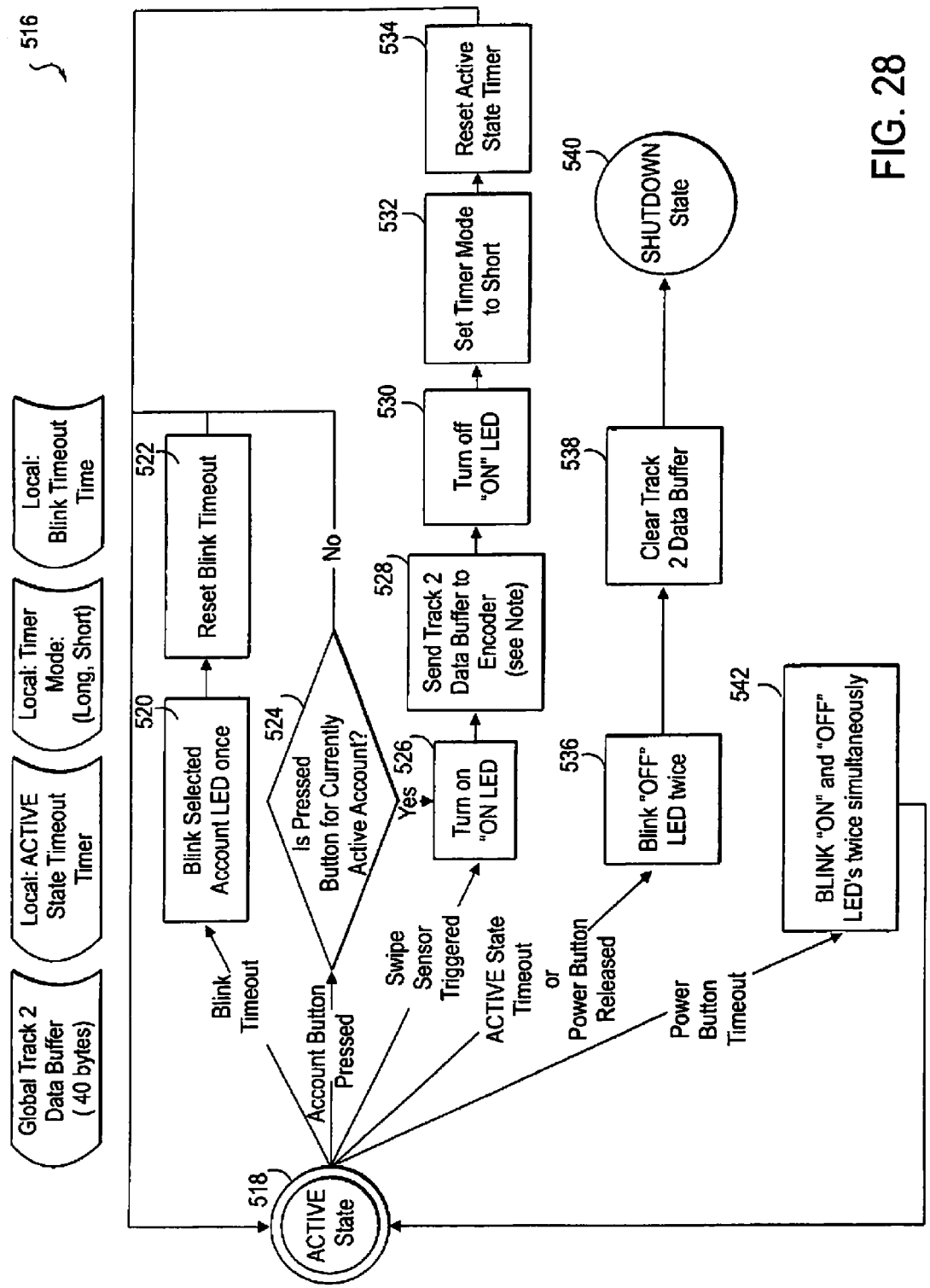
FIG. 28 is a flow diagram of an exemplary operation 516 "ACTIVE State" of FIG. 27.

FIG. 28 shows exemplary operation 516 of FIG. 27 in greater detail. The process begins with operation 518, which detects various events and dispatches them. If it is determined that a blink timeout has occurred, control is passed to operation 520, which blinks the account indicator 36 for the selected account once. Then, in operation 522, the blink timeout is reset and control is passed back to operation 518.

If it is determined in operation 518 that an account selector 38 has been selected, control is passed to operation 524. In decision operation 524, it is determined whether or not account selector 38 for the currently selected account has been selected. If not, control is passed back to operation 518. On the other hand, if the account selector 38 for the currently selected account is selected, control is passed to operation 526, which turns on the on indicator 30. Then, in operation 528, the track two data buffer, or alternatively data from the data buffers of multiple tracks is sent to the encoder. Then, in operation 530, on indicator 30 is turned off. Then, in operation 532, the timer mode is set to short. Then, in operation 534, the active state timer is reset and control is passed back to operation 518. If, in operation 518, it is determined that a swipe sensor has been triggered, control is passed to operation 526, which processes the event as previously described in the discussion of operation 526 above.

If it is determined in operation 518, that an active state timeout has occurred or on/off button 28 has been released, control is passed to operation 536, which blinks off indicator 32 twice. Control is, then, passed to operation 538, which clears the track two data buffer and, then, passes control to operation 540, which enters a shutdown state. If it is determined in operation 518 that there has been a power button timeout, control is passed to operation 542, which blinks on indicator 30 and off indicator 32 twice, simultaneously. Control is, then, passed to operation 518.

Figure 29:
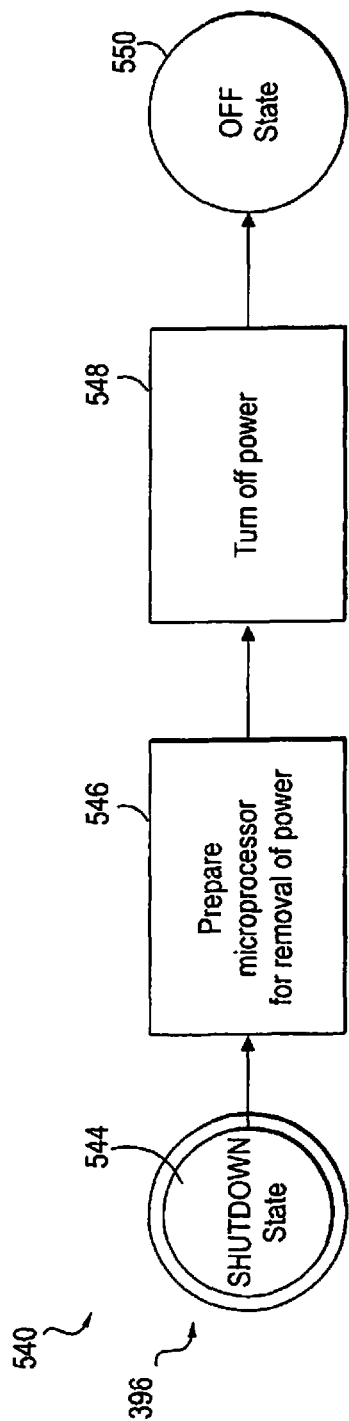
FIG. 29 is a flow diagram of an exemplary operation 540 "SHUTDOWN State" of FIG. 28 as well as exemplary operation 396 of FIG. 25.

FIG. 29 shows exemplary operation 540 of FIG. 28, as well as exemplary operation 396 of FIG. 25. It also describes the process labeled as "A" on FIGS. 30 and 31. The process begins with operation 544; control is passed to operation 546, which prepares general processor 52 for removal of power. Then, in operation 548, the power is turned off. At this point, the process enters operation 550, wherein the card is deprived of power until power is reintroduced. The diagram for this stage is shown on FIG. 23, as previously discussed.

Figure 30:
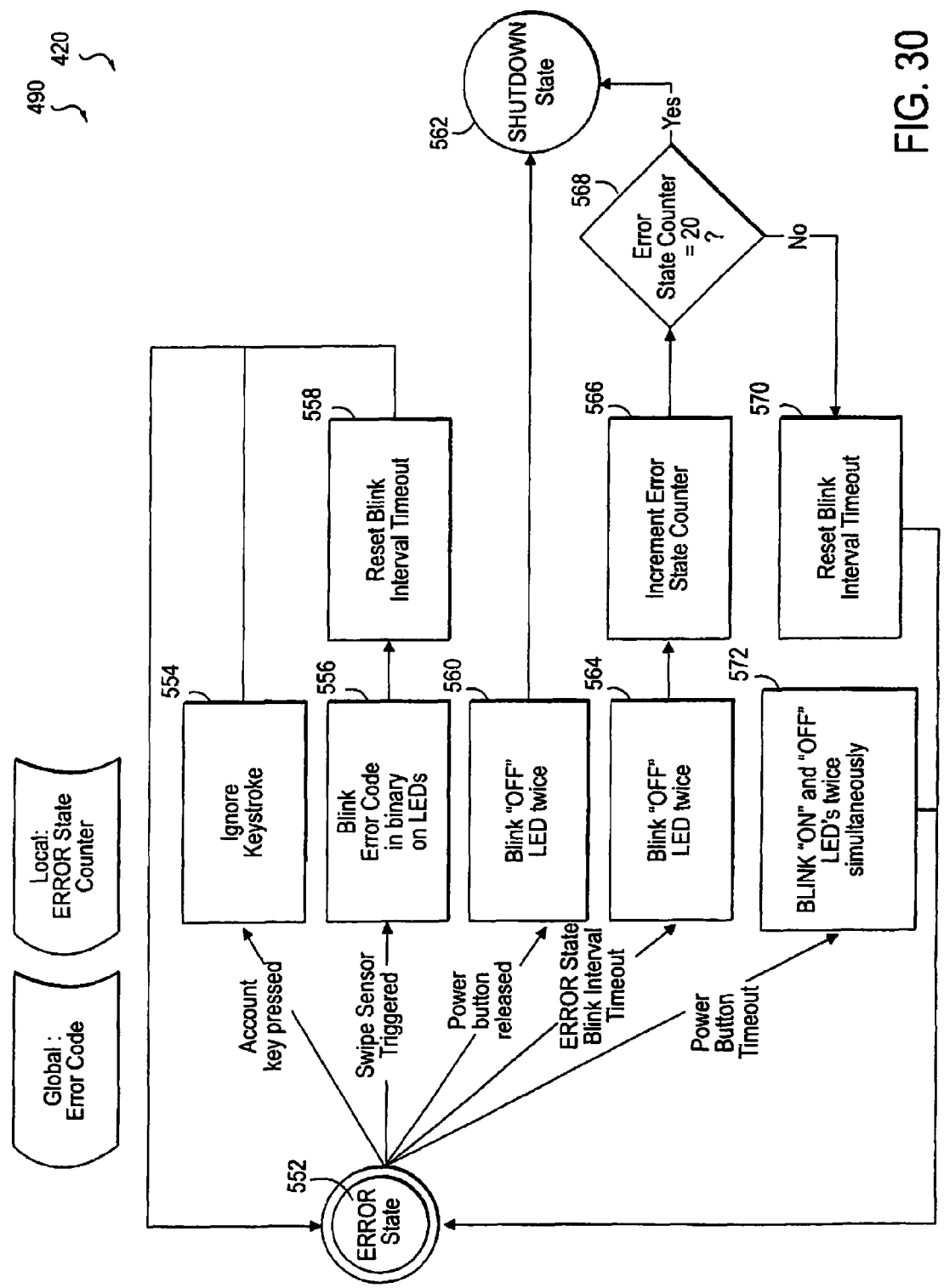
FIG. 30 is a flow diagram of an exemplary operation 420 "ERROR State" of FIG. 26 also referenced as operation 490 "ERROR State" of FIG. 27.

FIG. 30 shows exemplary operation 420 of FIG. 26 and operation 490 of FIG. 27 in greater detail. The process starts with operation 552, which is entered when an error has occurred. Operation 552 waits for various events to occur and dispatches them appropriately. If an account indicator 36 is pressed, control is passed to operation 554, which ignores the press and controls pass back to operation 552. If a swipe sensor is triggered, control is passed to operation 556, which blinks an error code in binary on the various LEDs of card back 14. Then, control is passed to operation 558, which resets the blink interval timeout. Control is, then, passed back to operation 552. If, in operation 552 it is determined that on/off button 28 has been released, control is passed to operation 560, which blinks off indicator 32 twice. At this point, control is passed to operation 562, which enters a shutdown state. If it is determined in operation 552 that an error state blink interval timeout has occurred, control is passed to operation 564, which blinks off indicator 32 once and passes control to operation 566. In operation 566, the error state counter is incremented and control is passed to decision operation 568, which determines whether or not the error state counter is equal to 20. If so, control is passed to operation 562, which enters a shutdown state. If it is determined in operation 568 that the error state counter is not equal to 20, control is passed to operation 570, which resets the blink interval timeout and passes control back to operation 552. If it is determined in operation 552, that a power button timeout has occurred, control is passed to operation 572, which blinks on indicator 30 and off indicator 32 twice, simultaneously.

Figure 31:
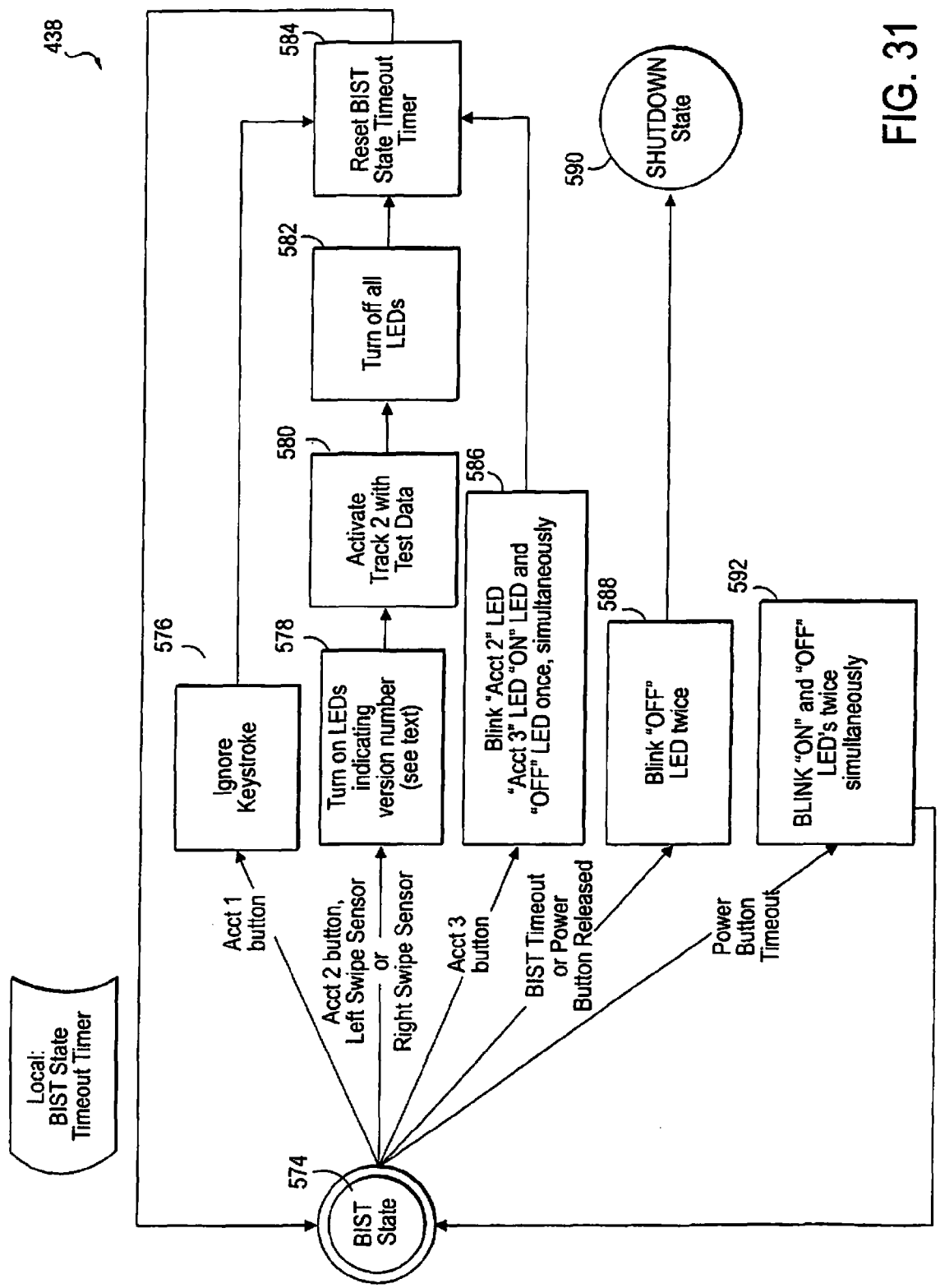
FIG. 31 is a flow diagram of an exemplary operation 438 "GIST State" of FIG. 26.

FIG. 31 shows exemplary operation 438 of FIG. 26 in greater detail. The process begins with operation 574 which waits for various events to occur and dispatches them accordingly. If, in state 574, it is determined that account selector 38 corresponding to account one has been selected, account indicator 36 for account one is blinked along with the account indicator 36 for account two, on indicator 30, off indicator 32, all simultaneously. This is accomplished in operation 576. If it is determined in operation 574 that the account selector 38 for account two has been selected, or the left swipe sensor, or the right swipe sensor, has been activated, control is passed to operation 578, which turns on selected LEDs on card back 14 to indicate a version number. Control is, then, passed to operation 580, which activates track two with test data. At this point, control is passed to operation 582, which turns off all LEDs. Then, in operation 584, a timer associated with the BIST state is reset and control is passed back to operation 574. Likewise, upon completion of operation 576, operation 584 is entered, which resets this timer and control is likewise passed subsequently passed to operation 574.

If it is determined in operation 574 that account selector 38 corresponding to account three is selected, account indicator 36 for account two, along with account indicator 36 for account three, on indicator 30, and off indicator 32, are all blinked once simultaneously in operation 586. Control is then passed to operation 584, which resets the timer as previously discussed and passes control to operation 574. If it is determined in operation 574 that there has been a BIST timeout or on/off button 28 has been released, control is passed to operation 588, which blinks off indicator 32 twice. Control is, then, passed to operation 590, which enters a shutdown state. If, in operation 574 it is determined that there has been a power button timeout associated with on/off button 28, control is passed to operation 592, which blinks on indicator 30 and off indicator 32 twice simultaneously. At this point, control is passed to operation 574.

Figure 32:
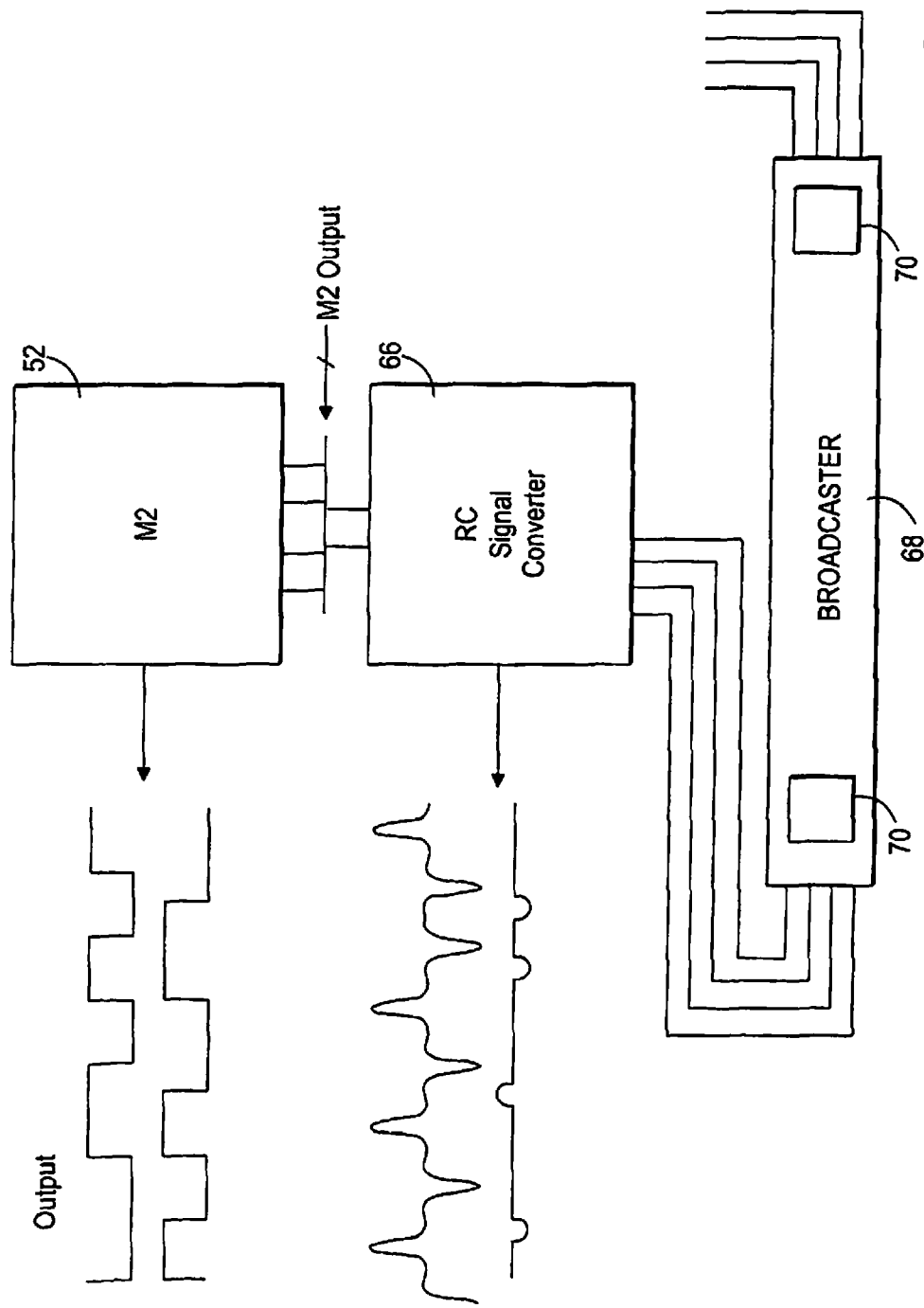
FIG. 32 is a block diagram of an exemplary process for signal conversion.

FIG. 32 shows an exemplary process for signal conversion which is used to transform the digital square wave output of general processor 52 into the custom waveforms needed to drive broadcaster 68. The digital square wave output of general processor 52 is used to drive the RC network of buffering circuit 66 which produces an analog waveform as output. This is, in turn, used to drive broadcaster 68 which produces magnetic impulses to be received by a magnetic stripe reader.

Figure 33:
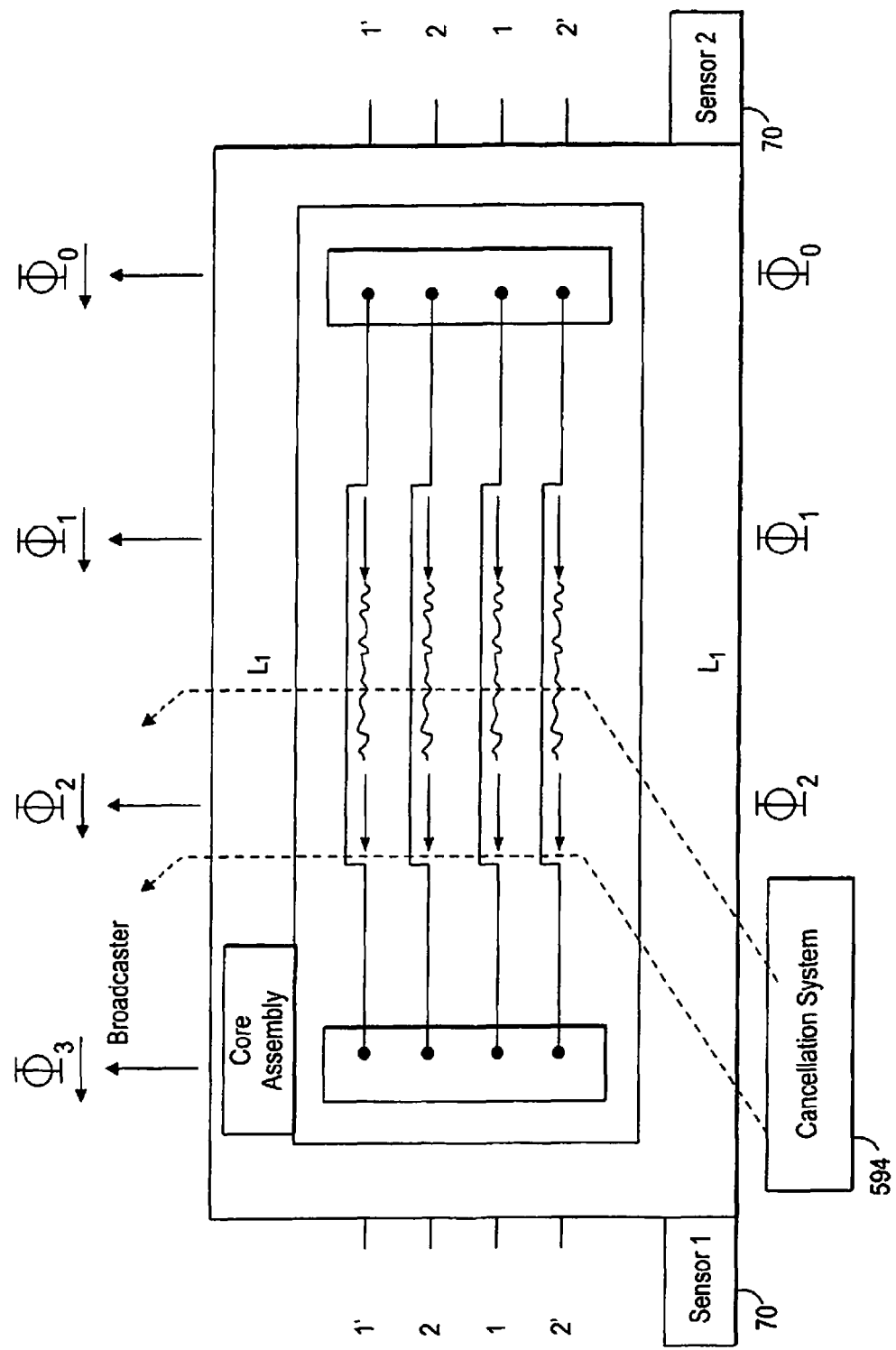
FIG. 33 is a diagram of an exemplary broadcaster 68 of FIG. 3.

FIG. 33 shows the exemplary broadcaster 68 of FIG. 3 in greater detail. In this exemplary embodiment, the broadcaster dynamically creates the magnetic signals which can be read by a conventional magnetic stripe reader. The output waveform is converted herein to compliant magnetic flux reversal broadcast in broadcaster 68. Broadcaster 68 includes a core of specialty material chosen for its magnetic permeability as well as other chemically related properties. The core is surrounded by the multiple waveform circuit configurations made of another type of specialty material chosen for its electrical and magnetic properties. Cancellation system 594 is shown here which reduces crosstalk of the magnetic field that is broadcast. An advantage of this exemplary embodiment is reduced cross talk in cases where multiple tracks are used. The broadcaster is also comprised of sensors 70 which indicate when a transaction has begun and when the transaction has ended. In the exemplary embodiment shown in FIG. 33, the various tracks are labeled "1" and "2". This example should not be construed as a limitation to the number of tracks which can be broadcast by broadcaster 68. The cancellation tracks are labeled "1" and "2" to provide cancellation for tracks 1 and 2 respectively.

FIG. 34 describes an emulated magnetic stripe signal created by the exemplary broadcaster 68 interface. The diagram indicates the temporal and spatial orientation of the broadcaster 68 to the magnetic stripe reader 72 to detect and use the magnetic stripe data.

FIG. 35 shows a sample of exemplary waveforms generated. These exemplary wave forms are representative only, and demonstrate the relationship between the square wave output of general processor 52 and the analog output of buffer circuit 66. In an exemplary embodiment, the RCCN takes the output from general processor 52 and uses the Integrated Circuit including its capacitors and resistors to convert the magnetic stripe data that is readable by a conventional magnetic stripe reader.

Figure 36:
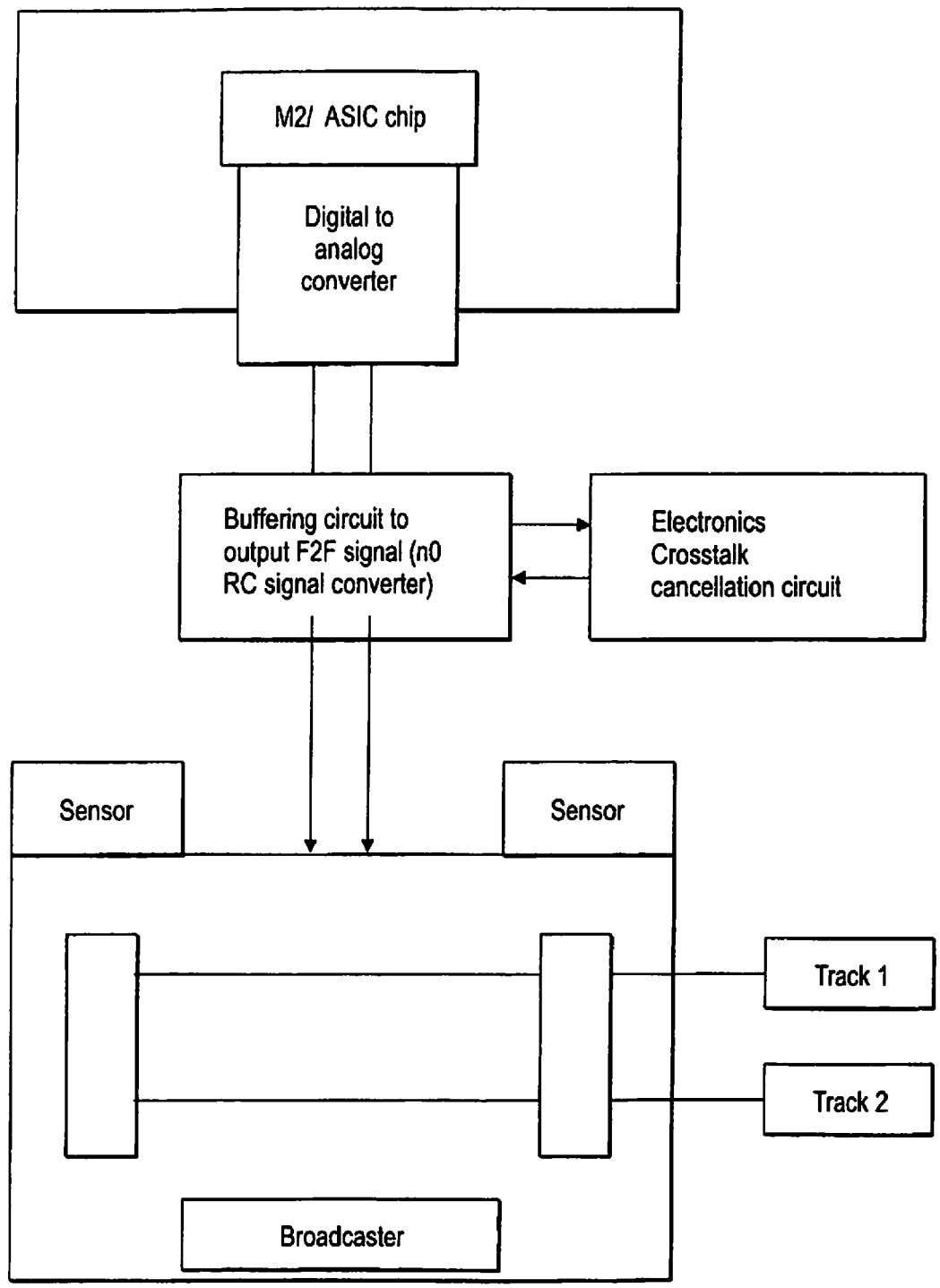
FIG. 36 is a block diagram of an exemplary ASIC embodiment.

FIG. 36 shows an alternative embodiment wherein an application specific integrated circuit (ASIC) referred to hereinafter as ASIC 596. ASIC 596 is used in place of general processor 52. In this embodiment, it is contemplated that ASIC 596 includes a digital to analog converter 598. The analog signal is output to a buffering circuit 66 which outputs an F2F signal; no RC network is needed. In one exemplary embodiment, the ASIC uses alternative means of shaping the broadcast not through a proximate broadcaster but either through a processor with a Digital to Analog converter or by a processor that could effect the wave shape through the circuit.

Figure 37B:
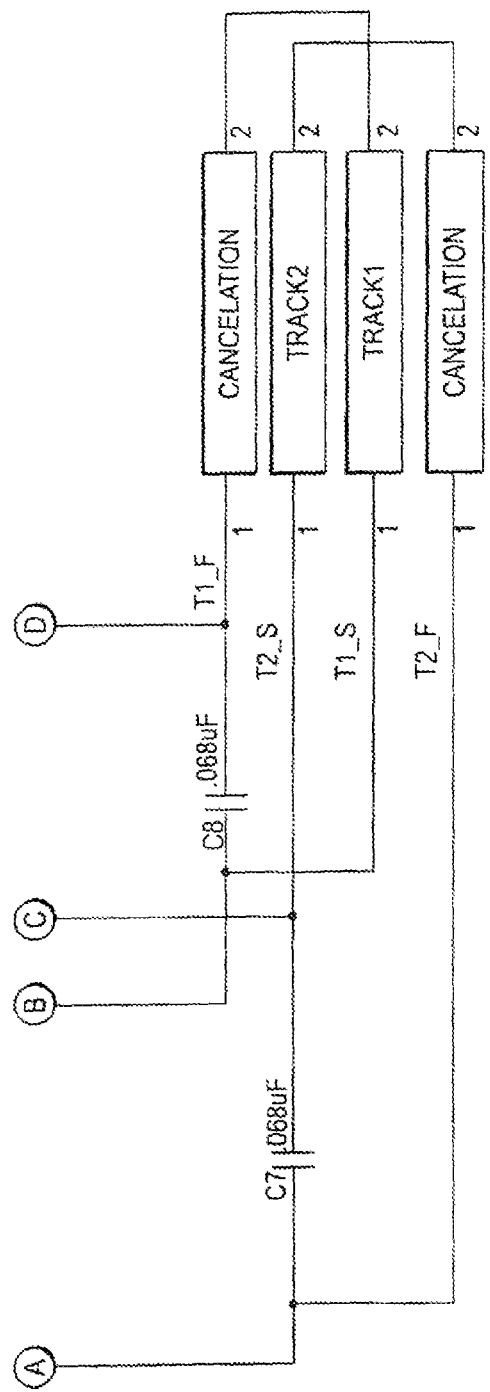
FIG. 37 is a schematic diagram of an exemplary RC network of buffering circuit 66.

FIG. 37 shows an exemplary RC network comprised of resistors and capacitors. RC networks are well known to those skilled in the art. An exemplary embodiment of the RC network enables the proximate broadcasters to send an emulated or simulated magnetic stripe message to the read head of a magnetic stripe reader.

Figure 38:
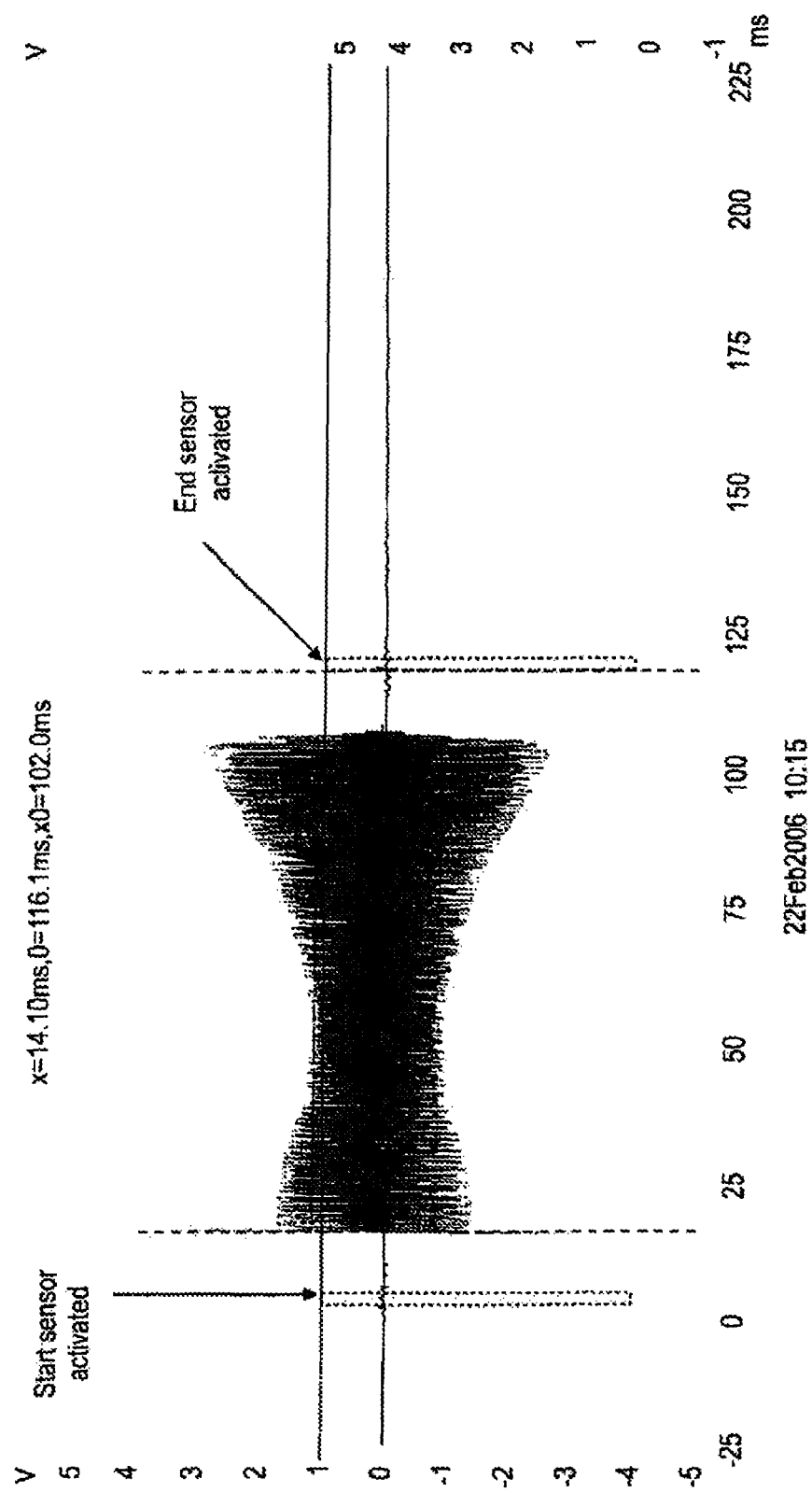
FIG. 38 is a graph of a waveform generated by an exemplary buffering circuit 66.
Figure 39A:
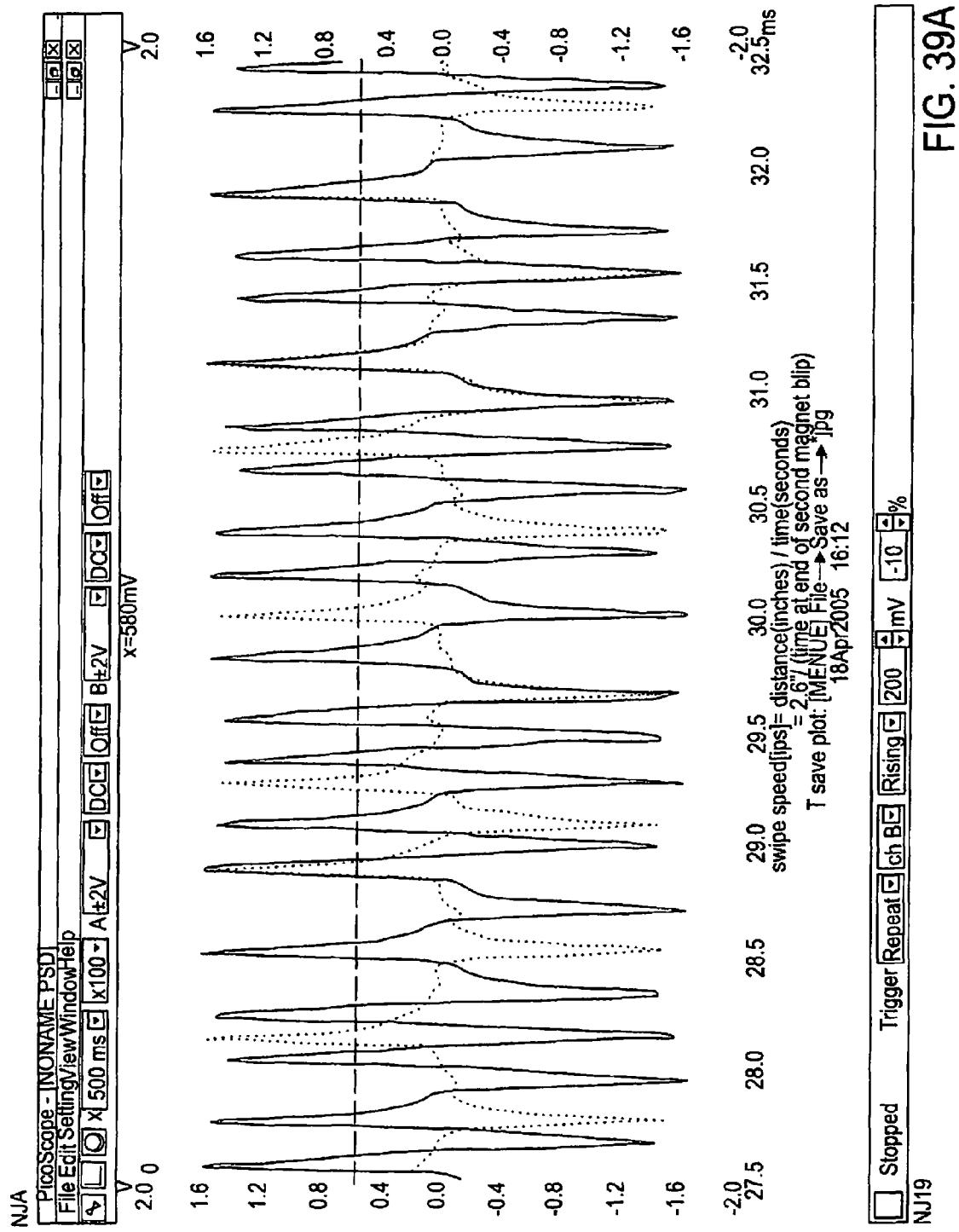
FIGS. 39A-39D are graphs of dual track waveforms generated by an exemplary buffering circuit 66.
Figure 39B:
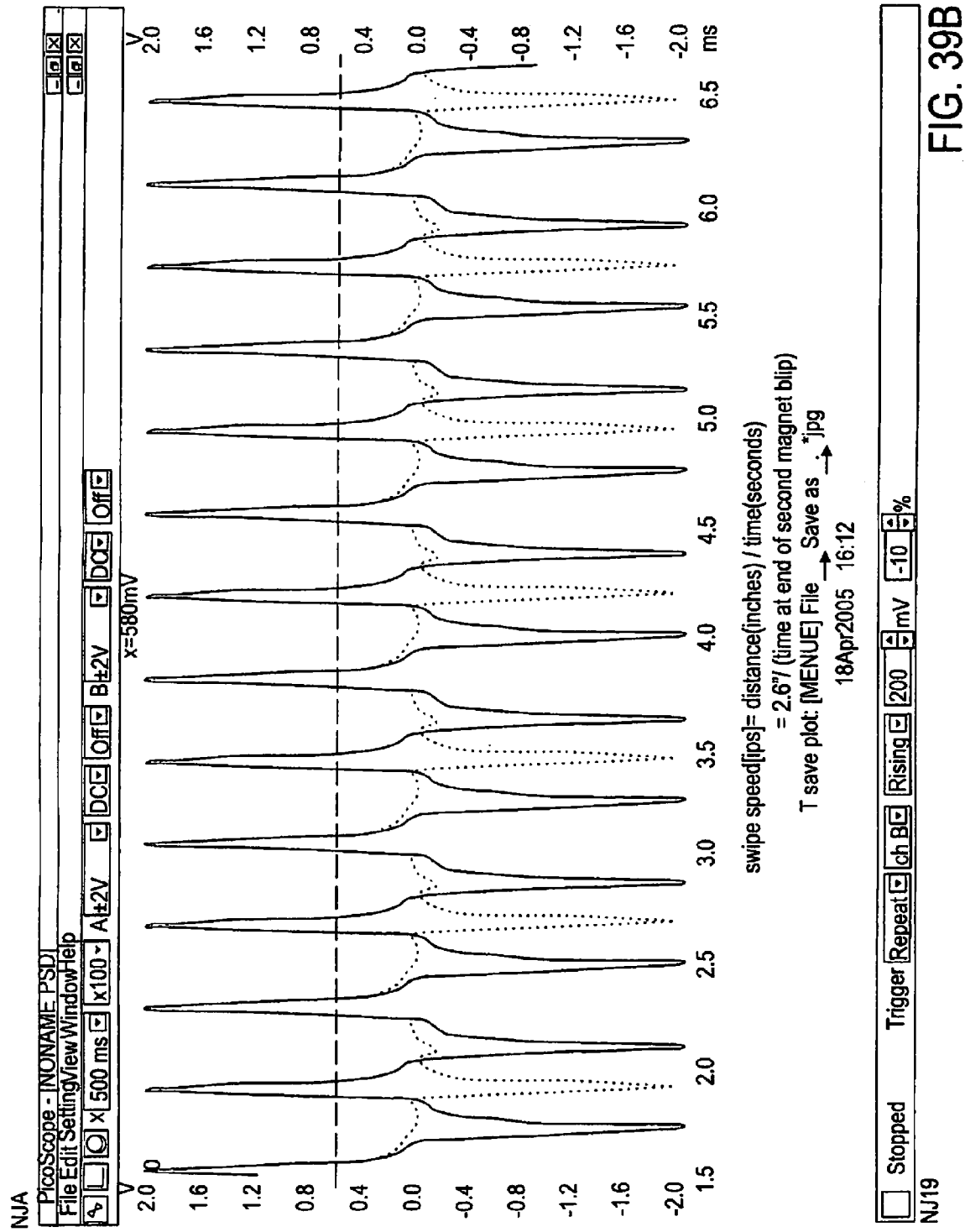
Figure 39C:
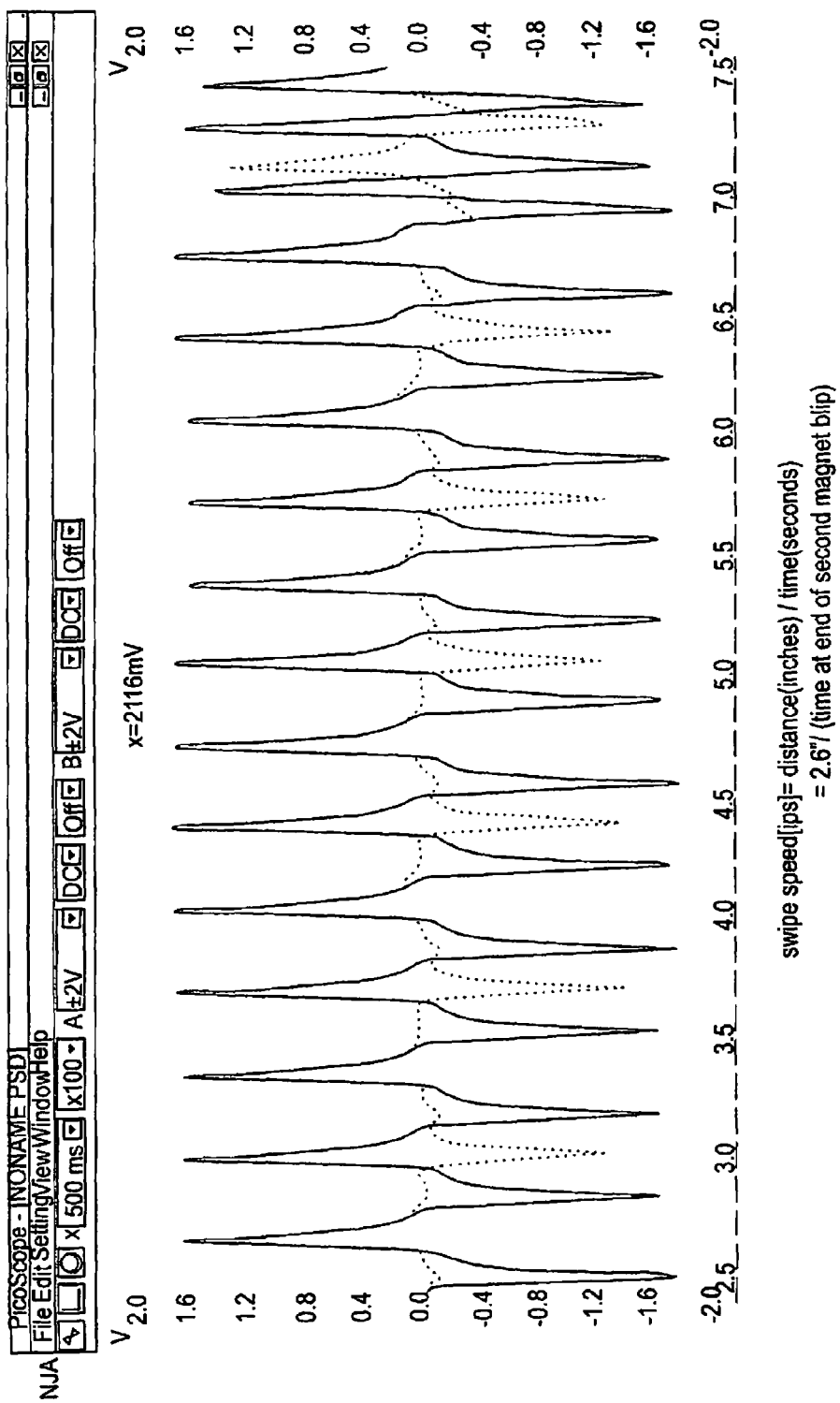
Figure 39D:
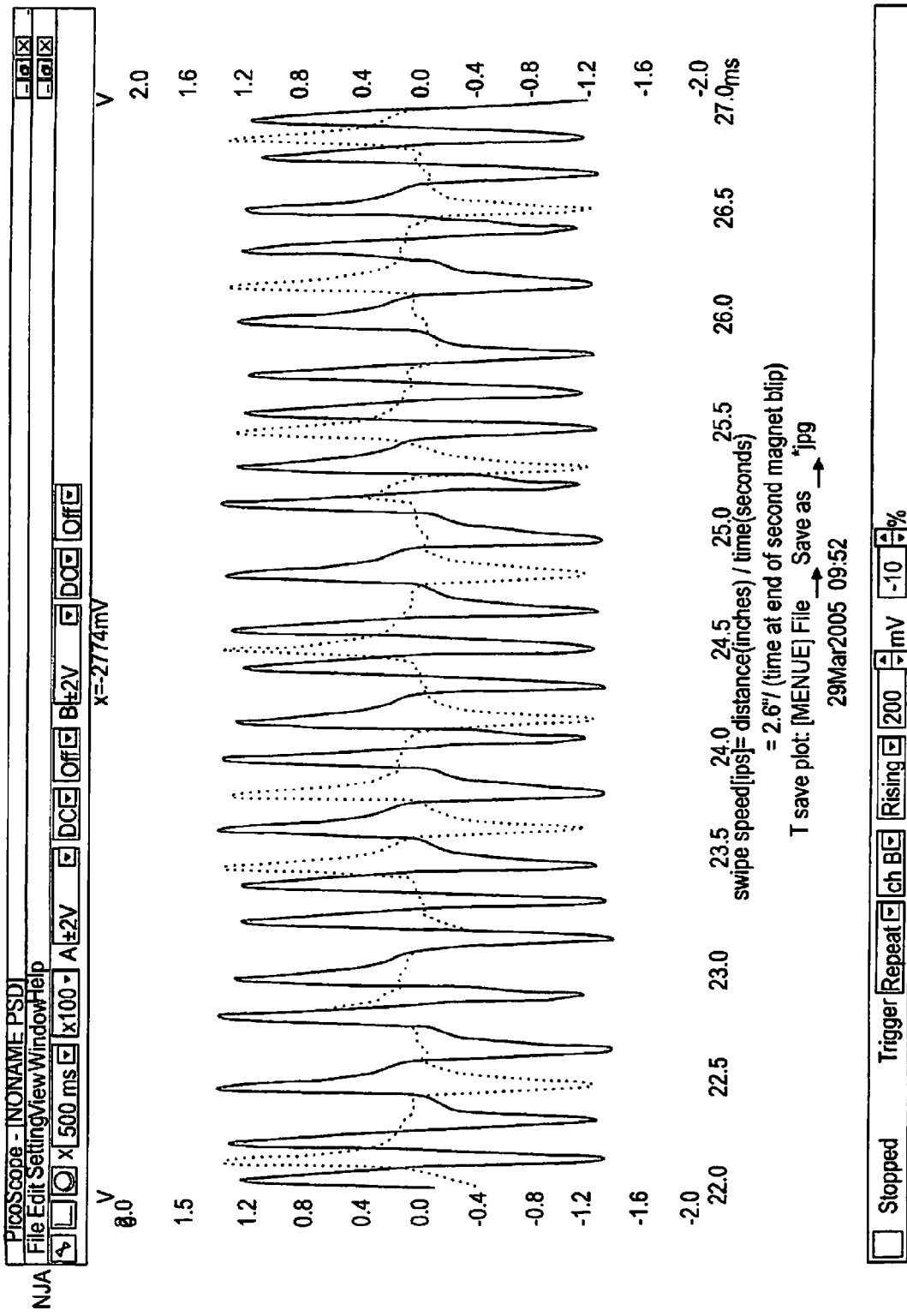

FIG. 38 shows a waveform of an exemplary broadcaster 68. The figure indicates the role of the sensor for creating the timing necessary to effect the broadcast in the proper temporal and spatial alignment to the read head so that it can be detected and used to close a financial transaction.

FIGS. 39A through 39D show exemplary waveforms from both track I and track 2 overlaid one upon the other. Alternative means of generating this wave form is either the Digital to Analog processor or the in-circuit cancellation as depicted in FIG. 36.

Accordingly, this disclosure includes for the following.

1. An enhanced Smart Card comprising a card body provided with an externally accessible card interface including a signal port, a power port, and a ground port; a secure processor carried by said card body and coupled to said signal port, said power port, and said ground port; and a general processor carried by said card body, said general processor being coupled to a power source and being operative to provide power to and communicate with said secure processor when said secure processor is being used in an enhanced Smart Card mode.

2. The enhanced Smart Card as recited in 1 wherein said card body includes a plastic material and wherein said externally accessible card interface includes contact pads.

3. The enhanced Smart Card as recited in 2 wherein said externally accessible card interface further includes a command port and a clock port.

4. The enhanced Smart Card as recited in 2 wherein said externally accessible card interface is an ISO 7816 interface.

5. The enhanced Smart Card as recited in 4 wherein said secure processor is an ISO 7816 compliant processor.

6. The enhanced Smart Card as recited in 5 wherein said general processor emulates an ISO 7816 compliant card reader.

7. The enhanced Smart Card as recited in 5 wherein said general processor communicates with said secure processor in a way that is not exactly the same as the communication of an ISO 7816 compliant card reader.

8. The enhanced Smart Card as recited in 1 wherein said general processor has a plurality of I/O ports.

9. The enhanced Smart Card as recited in I further comprising a display carried by said card body and coupled to at least one of said I/O ports of said general processor.

10. The enhanced Smart Card as recited in 9 wherein said display is at least one of a visual display, a tactile display, and an auditory display.

11. The enhanced Smart Card as recited in 9 wherein said display is a visual display and includes at least one of a flat-panel display and a light display.

12. The enhanced Smart Card as recited in 8 further comprising at least one switch carried by said body and coupled to at least one of said plurality of I/O ports of said general processor.

13. The enhanced Smart Card as recited in 12 wherein a plurality of switches are arranged as a keypad.

14. The enhanced Smart Card as recited in 8 further comprising a stripe emulator carried by said card body and coupled to at least one of said I/O ports of said general processor.

15. The enhanced Smart Card as recited in 14 wherein said stripe emulator includes an electromagnetic broadcaster.

16. The enhanced Smart Card as recited in 15 wherein said stripe emulator further includes a signal processor coupling said electromagnetic broadcaster to at least one of said I/O ports of said general processor.

17. A secure transaction card comprising: a card body; a secure processor carried by said card body; a stripe emulator carried by said card body; and a general processor carried by said card body and interposed between said secure processor and said stripe emulator.

18. The secure transaction card as recited in 17 wherein said general processor selectively powers the secure processor.

19. The secure transaction card as recited in 18 wherein said secure processor is an ISO 7816 compliant processor.

20. The secure transaction card as recited in 17 further comprising a visual display carried by said body and coupled to said general processor.

21. The secure transaction card as recited in 20 wherein said visual display includes at least one of a flat panel display and at least one LED.

22. The enhanced Smart Card as recited in 12 wherein said stripe emulator includes an electromagnetic broadcaster.

23. The enhanced Smart Card as recited in 13 wherein said stripe emulator further includes a signal processor coupling said electromagnetic broadcaster to at least one of said I/O ports of said general processor.

24. A companion processor system comprising: a secure processor having a signal port, a power port, and a ground port; and a general processor being operative to power up said secure processor by applying at least one of power and ground to said power port and said ground port, respectively, when it wishes to communicate with said secure processor via said signal port.

25. A method for providing secure transactions comprising: detecting an input with a general processor of the initiation of a desired transaction; powering up a secure processor under the direction of said general processor; and communicating between the general processor and the secure processor to provide at least one secure transaction.

Thus, the present invention discloses in an exemplary embodiment a companion processor system is provided which pairs a secure processor with a general processor. The secure processor can, for example, include a signal port, a power port and a ground port. The general processor is, in for example, operative to power up the secure processor by applying, directly or indirectly, at least one of power and ground to the power port and ground port, respectively of the secure processor when it wishes to communicate with the secure processor via the signal port. In another exemplary embodiment a method for providing secure transactions is disclosed includes: detecting an input with a general processor of the initiation of a desired transaction; powering up a secure processor under the direction of the general processor; and communicating between the general processor and the secure processor to provide at least one secure transaction.

Although various embodiments have been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged either in whole or in part. It is therefore intended that the claims be interpreted in accordance with the true spirit and scope of the invention without limitation or estoppel.

What is claimed is:

1. An electronic card having a card body, comprising:
   a power source;
   a general processor electrically coupled to the power source;
   a secure processor electrically coupled to the general processor;
   a broadcaster electrically coupled to the general processor; and
   at least one sensor for sending a signal to the general processor when a physical act of swiping the card body through a legacy magnetic stripe reader having a magnetic read head has commenced;
   wherein the electronic card is usable as a legacy mode Smart card;
   wherein the broadcaster is operable to broadcast a transaction specific data packet so that it is read by the magnetic stripe reader; wherein the secure processor is an ISO 7816 compliant processor; and wherein the secure processor is connected to an RC conversion circuit through at least two transmission lines.

2. The electronic card of claim 1 wherein the general processor is comprised of an ASIC chip.

3. The electronic card of claim 1 further comprising a display for indicating which of a plurality of account selections has been made for a transaction.

4. The electronic card of claim 1 wherein a Smart Card reader device can be used to program and personalize the secure processor with an initialization data packet so that the secure processor can function in an operational mode which no longer requires use of the Smart Card reader device.

5. The electronic card of claim 1 wherein power to the secure processor is turned on by the general processor.

6. The electronic card of claim 1 wherein the electronic card is operable to render itself unusable in response to a self-destruct command.

7. The electronic card of claim 6 wherein the self-destruct command is passed from the general processor to the secure processor.

8. The electronic card of claim 6 wherein the self-destruct command is generated by use of a fraud detection mechanism.

9. The electronic card of claim 1 wherein a unique serial number and a cryptographic component are stored in the secure processor.

10. The electronic card of claim 1 further comprising at least two broadcasting lines connected to output from the RC conversion circuit.

11. The electronic card of claim 1 further comprising an on/off button for turning the general processor from an off state to an on state.

12. The electronic card of claim 11 wherein activation of the on/off button to turn the general processor from the off state to the on state will not active the secure processor to a secure processor on state.

13. The electronic card of claim 1 further comprising a plurality of buttons that can produce a chord, by activation of a combination of the plurality of buttons, wherein the chord can be used to alter functionality of the electronic card.

14. The electronic card of claim 13 wherein the chord instructs the electronic card to enter a self-diagnostic mode.

15. The electronic card of claim 1 wherein power to the secure processor is turned off when the electronic card is in an operation mode and an error is detected.

16. The electronic card of claim 1 wherein the broadcaster is comprised of a core of material chosen for its magnetic permeability and the core is surrounded by at least one waveform circuit configuration made of another type of specialty material chosen for its electrical and magnetic properties.

17. The electronic card of claim 1 wherein the signal from the at least one sensor is used to effect the broadcast in a proper temporal and spatial alignment to the read head.

18. The electronic card of claim 1 wherein the electronic card includes a built-in self testing operation mode.

19. The electronic card of claim 18 wherein the built-in self testing operation mode is operable to generate an error code if an error is detected.

20. An electronic card having a card body, comprising:
    a power source;
    a general processor electrically coupled to the power source;
    a secure processor electrically coupled to the general processor;
    a broadcaster electrically coupled to the general processor; and
    at least one sensor for sending a signal to the general processor when a physical act of swiping the card body through a legacy magnetic stripe reader having a magnetic read head has commenced;
    an on/off button for turning the general processor from an off state to an on state;
    wherein the electronic card is usable as a legacy mode Smart card;
    wherein the broadcaster is operable to broadcast a transaction specific data packet so that it is read by the magnetic stripe reader; wherein the secure processor is an ISO 7816 compliant processor;
    and wherein activation of the on/off button to turn the general processor from the off state to the on state will not active the secure processor to a secure processor on state.

* * * * *